United States Patent
Pinto et al.

(10) Patent No.: US 12,552,833 B2
(45) Date of Patent: Feb. 17, 2026

(54) DYNAMICS WITHIN SUPRAMOLECUAR IKVAV MATRICES ENHANCE FUNCTIONAL MATURATION OF HUMAN IPSCS-DERIVED NEURONS AND REGENERATION

(71) Applicant: Northwestern University, Evanston, IL (US)

(72) Inventors: Zaida Alvarez Pinto, Chicago, IL (US); Kohei Sato, Yokohama (JP); Juan Alberto Ortega Cano, Chicago, IL (US); Evangelos Kiskinis, Chicago, IL (US); Samuel I. Stupp, Chicago, IL (US)

(73) Assignee: Northwestern University, Evanston, IL (US)

( * ) Notice: Subject to any disclaimer, the term of this patent is extended or adjusted under 35 U.S.C. 154(b) by 1017 days.

(21) Appl. No.: 17/425,757

(22) PCT Filed: Jan. 24, 2020

(86) PCT No.: PCT/US2020/015006
§ 371 (c)(1),
(2) Date: Jul. 26, 2021

(87) PCT Pub. No.: WO2020/154631
PCT Pub. Date: Jul. 30, 2020

(65) Prior Publication Data
US 2022/0213141 A1    Jul. 7, 2022

Related U.S. Application Data

(60) Provisional application No. 62/796,425, filed on Jan. 24, 2019.

(51) Int. Cl.
| | |
|---|---|
| C07K 7/06 | (2006.01) |
| A61K 35/30 | (2015.01) |
| A61K 38/00 | (2006.01) |
| A61P 25/00 | (2006.01) |
| C07K 14/78 | (2006.01) |
| C12N 5/00 | (2006.01) |
| C12N 5/0793 | (2010.01) |
| C12N 11/08 | (2020.01) |

(52) U.S. Cl.
CPC .......... *C07K 7/06* (2013.01); *A61K 35/30* (2013.01); *A61P 25/00* (2018.01); *C12N 5/0068* (2013.01); *C12N 5/0619* (2013.01); *A61K 38/00* (2013.01); *C07K 2319/00* (2013.01); *C12N 2506/45* (2013.01); *C12N 2533/30* (2013.01); *C12N 2533/50* (2013.01)

(58) Field of Classification Search
CPC ...... C07K 7/06; C07K 2319/00; A61K 35/30; A61K 38/00; A61P 25/00; C12N 5/0068; C12N 5/0619; C12N 2506/45; C12N 2533/30; C12N 2533/50
See application file for complete search history.

(56) References Cited

U.S. PATENT DOCUMENTS

| | | | |
|---|---|---|---|
| 7,030,167 B2 | 4/2006 | Gunther | |
| 7,371,719 B2 | 5/2008 | Stupp et al. | |
| 7,452,679 B2 | 11/2008 | Stupp et al. | |
| 7,491,690 B2 | 2/2009 | Stupp et al. | |
| 7,534,761 B1 | 5/2009 | Stupp et al. | |
| 7,544,661 B2 | 6/2009 | Stupp et al. | |
| 7,554,021 B2 | 6/2009 | Stupp et al. | |
| 7,683,025 B2 | 3/2010 | Stupp et al. | |
| 7,745,708 B2 | 6/2010 | Stupp et al. | |
| 7,838,491 B2 | 11/2010 | Stupp et al. | |
| 7,851,445 B2 | 12/2010 | Stupp et al. | |
| 8,063,014 B2 | 11/2011 | Stupp et al. | |
| 8,076,295 B2 | 12/2011 | Hulvat et al. | |
| 8,080,262 B2 | 12/2011 | Lee et al. | |
| 8,114,834 B2 | 2/2012 | Hsu et al. | |
| 8,114,835 B2 | 2/2012 | Mata et al. | |
| 8,124,583 B2 | 2/2012 | Stupp et al. | |
| 8,138,140 B2 | 3/2012 | Stupp et al. | |
| 8,236,800 B2 | 8/2012 | Degrado et al. | |
| 8,450,271 B2 | 5/2013 | Shah et al. | |
| 8,512,693 B2 | 8/2013 | Capito et al. | |
| 8,546,338 B2 | 10/2013 | Donners et al. | |
| 8,580,923 B2 | 11/2013 | Stupp et al. | |

(Continued)

FOREIGN PATENT DOCUMENTS

| | | |
|---|---|---|
| WO | WO 2013/047763 | 4/2013 |
| WO | WO 2017/082220 | 5/2017 |

OTHER PUBLICATIONS

Dehsorkhi A, et al. Self-assembling amphiphilic peptides. J Pept Sci. Apr. 13, 2014;20(7):453-67. doi: 10.1002/psc.2633 (Year: 2014).*
Missirlis D, Chworos A, Fu CJ, Khant HA, Krogstad DV, Tirrell M. Effect of the peptide secondary structure on the peptide amphiphile supramolecular structure and interactions. Langmuir, Apr. 13, 2011; 27(10):6163-70. doi: 10.1021/la200800e. (Year: 2011).*
Extended European Search Report for EP 20745509.8, mailed Feb. 17, 2023, 7 pages.
Silva et al. Selective Differentiation of Neural Progenitor Cells by High-Epitope Density Nanofibers. Science 303(5662), 2004; 1352-1355.
Mendes et al. Self-assembly in nature: using the principles of nature to create complex nanobiomaterials. Wiley Interdiscip Rev Nanomed Nanobiotechnol. Nov.-Dec. 2013;5(6):582-612.

(Continued)

*Primary Examiner* — Peter Paras, Jr.
*Assistant Examiner* — Gillian C. Reglas
(74) *Attorney, Agent, or Firm* — Casimir Jones, S.C.; Rikki A. Hullinger

(57) ABSTRACT

Provided herein are peptide amphiphiles (PAs) comprising a bioactive peptide, nanofibers displaying the bioactive PAs, and methods of use thereof. The disclosed peptide amphiphiles comprise a hydrophobic tail, a structural peptide segment, a charged peptide segment, and a bioactive IKVAV peptide. The disclosed PAs may be used in cell culture methods and in methods of treating central nervous system injury.

7 Claims, 47 Drawing Sheets

Specification includes a Sequence Listing.

(56) References Cited

U.S. PATENT DOCUMENTS

| | | | |
|---|---|---|---|
| 8,748,569 | B2 | 6/2014 | Stupp et al. |
| 8,772,228 | B2 | 7/2014 | Stupp et al. |
| 9,011,914 | B2 | 4/2015 | Wong Po Foo et al. |
| 9,040,626 | B2 | 5/2015 | Chien et al. |
| 9,044,514 | B2 | 6/2015 | Xu et al. |
| 2003/0077665 | A1 | 4/2003 | Villa et al. |
| 2008/0160244 | A1 | 7/2008 | Wang et al. |
| 2009/0042804 | A1 | 2/2009 | Hulvat et al. |
| 2012/0294902 | A1 | 11/2012 | Stupp et al. |
| 2015/0159133 | A1 | 6/2015 | Yang et al. |
| 2017/0021056 | A1* | 1/2017 | Stupp ............... A61L 27/18 |

OTHER PUBLICATIONS

International Search Report and Written Opinion for PCT/US20/15006. Mailed Jun. 10, 2020. 18 pages.

Boulting et al., A functionally characterized test set of human induced pluripotent stem cells. Nat Biotechnol. Mar. 2011;29(3):279-86.

Carrascal et al., Changes during the postnatal development in physiological and anatomical characteristics of rat motoneurons studied in vitro. Brain Res Brain Res Rev. Sep. 2005;49(2):377-87.

Colognato et al., Glia unglued: how signals from the extracellular matrix regulate the development of myelinating glia. Dev Neurobiol. Nov. 2011;71(11):924-55.

Fujiwara et al., Dependence of a-helical and β-sheet amino acid propensities on the overall protein fold type. BMC Struct Biol. Aug. 2, 2012;12:18. 1-15.

Gardiner. Integrins and the extracellular matrix: key mediators of development and regeneration of the sensory nervous system. Dev Neurobiol. Nov. 2011;71(11):1054-72.

Ho et al., ALS disrupts spinal motor neuron maturation and aging pathways within gene co-expression networks. Nat Neurosci. Sep. 2016;19(9):1256-67.

Israelachvili. Intermolecular and surface forces; 2nd ed.; Academic: London San Diego, 1992; TOC only. 2 pages.

Kam et al., Selective adhesion of astrocytes to surfaces modified with immobilized peptides. Biomaterials. Jan. 2002;23(2):511-5.

Kazanis et al., Extracellular matrix and the neural stem cell niche. Dev Neurobiol. Nov. 2011;71(11):1006-17.

Keller et al., Empirical statistical model to estimate the accuracy of peptide identifications made by MS/MS and database search. Anal Chem. Oct. 15, 2002;74(20):5383-92.

Lakowicz, in Principles of Fluorescence Spectroscopy, Springer Science+Business Media, New York, ed. 3, 2006, pp. 353-382.

Mayo et al., A recipe for designing water-soluble, beta-sheet-forming peptides. Protein Sci. Jul. 1996;5(7):1301-15.

Miyazaki et al., Laminin E8 fragments support efficient adhesion and expansion of dissociated human pluripotent stem cells. Nat Commun. 2012;3:1236. 1-10.

Myers et al., Regulation of axonal outgrowth and pathfinding by integrin-ECM interactions. Dev Neurobiol. Nov. 2011;71(11):901-23.

Nakagawa et al., A novel efficient feeder-free culture system for the derivation of human induced pluripotent stem cells. Sci Rep. Jan. 8, 2014;4:3594. 1-7.

Nakashima et al., What Kind of Signaling Maintains Pluripotency and Viability in Human-Induced Pluripotent Stem Cells Cultured on Laminin-511 with Serum-Free Medium? Biores Open Access. Apr. 1, 2016;5(1):84-93.

Nesvizhskii et al., A statistical model for identifying proteins by tandem mass spectrometry. Anal Chem. Sep. 1, 2003;75(17):4646-58.

Neugirg et al., AFM-based mechanical characterization of single nanofibres. Nanoscale. Apr. 28, 2016;8(16):8414-26.

Olbrich et al., Surfaces modified with covalently-immobilized adhesive peptides affect fibroblast population motility. Biomaterials. Apr. 1996;17(8):759-64.

Tadros et al., Electrical maturation of spinal neurons in the human fetus: comparison of ventral and dorsal horn. J Neurophysiol. Nov. 2015;114(5):2661-71.

Zhang et al., Rapid single-step induction of functional neurons from human pluripotent stem cells. Neuron. Jun. 5, 2013;78(5):785-98.

Ziller et al., Dissecting the Functional Consequences of De Novo DNA Methylation Dynamics in Human Motor Neuron Differentiation and Physiology. Cell Stem Cell. Apr. 5, 2018;22(4):559-574.e9.

\* cited by examiner

FIG. 2A     FIG. 2B                                    FIG. 2C
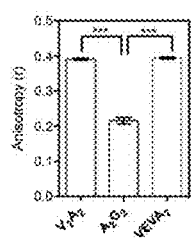 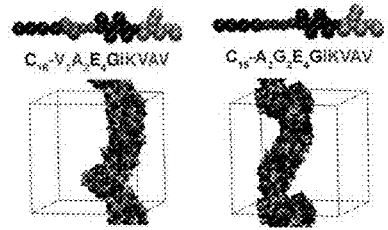 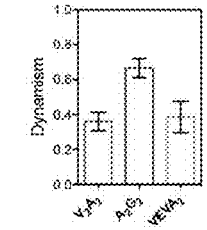
FIG. 2D     FIG. 2E                FIG. 2F
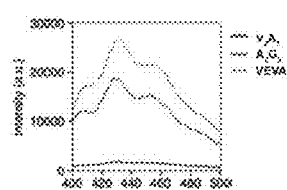 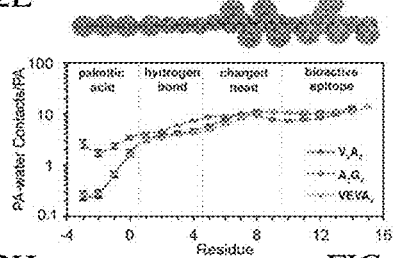 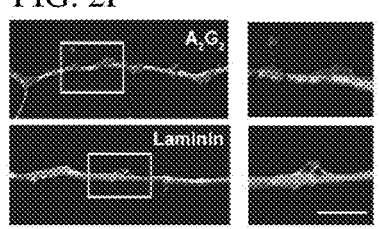
                    FIG. 2H     FIG. 2I
FIG. 2G
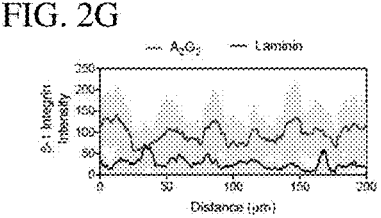 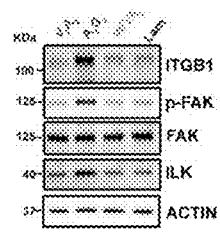 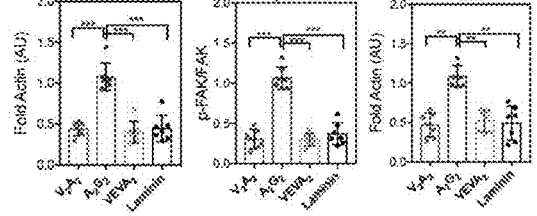

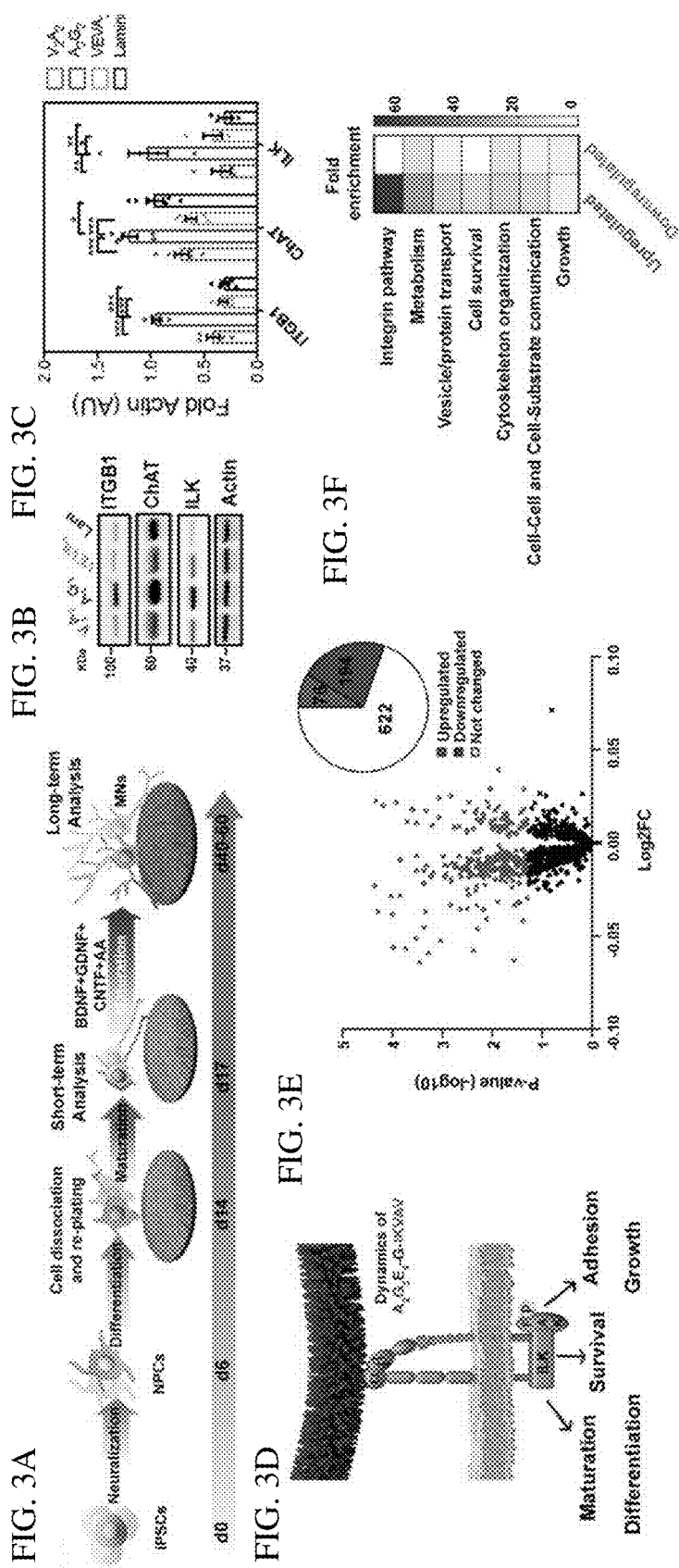

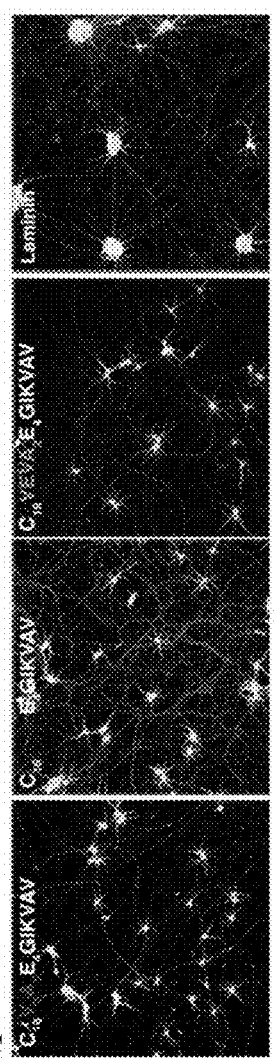
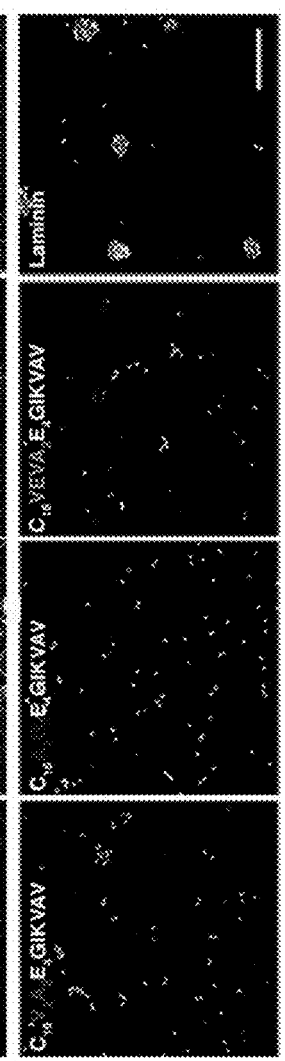
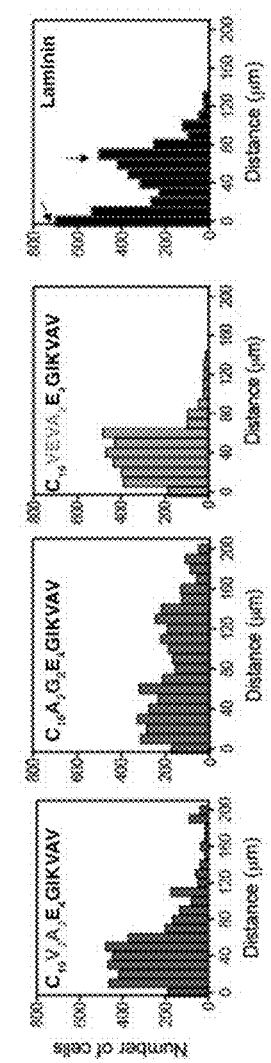
FIG. 3G
FIG. 3H
FIG. 3I
FIG. 3J
FIG. 3K
FIG. 3L
FIG. 3M
FIG. 3N
FIG. 3O

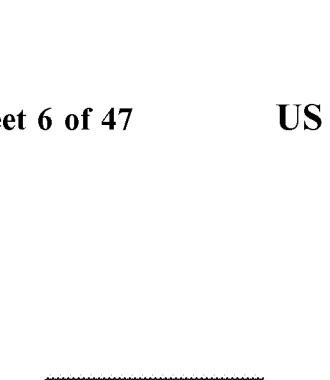
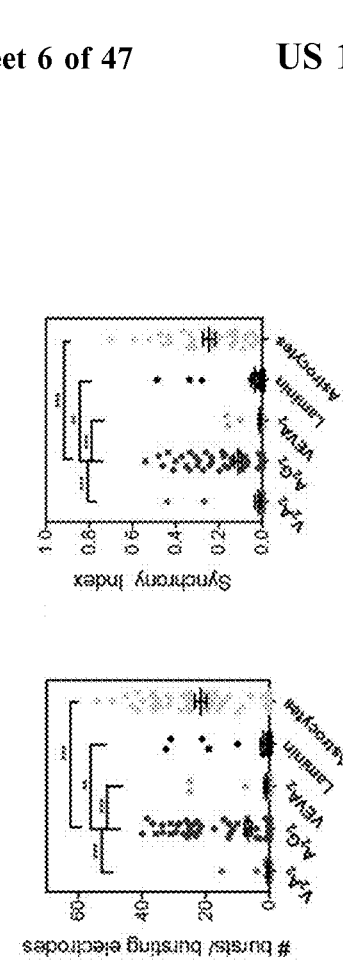
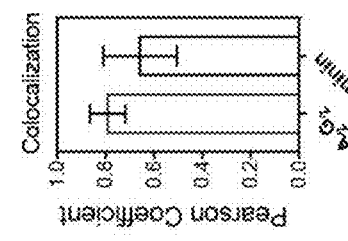
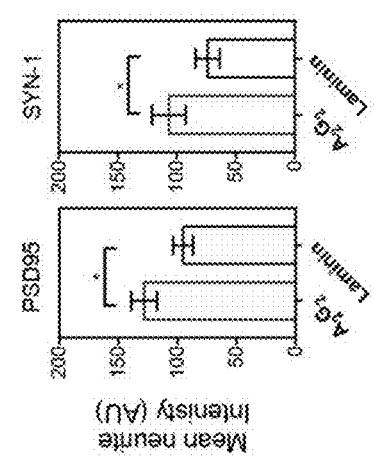
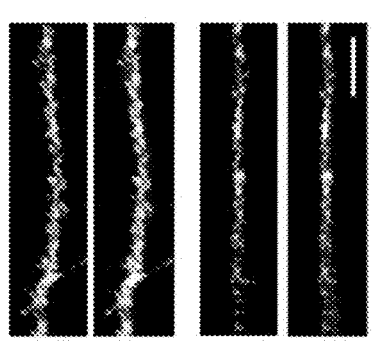
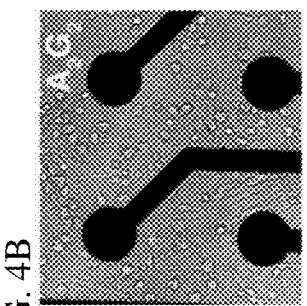
FIG. 4A   FIG. 4B   FIG. 4C   FIG. 4D   FIG. 4E   FIG. 4F   FIG. 4G   FIG. 4H   FIG. 4I

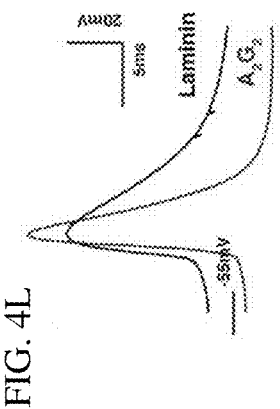
FIG. 4L
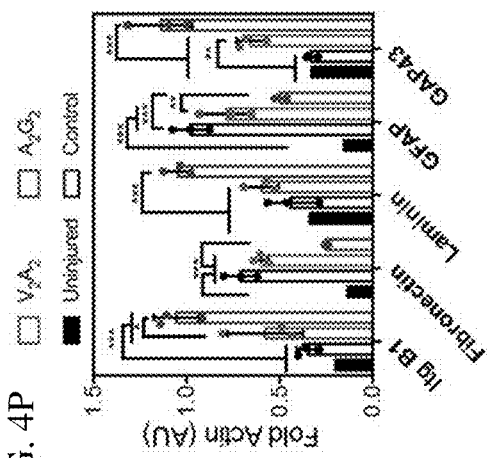
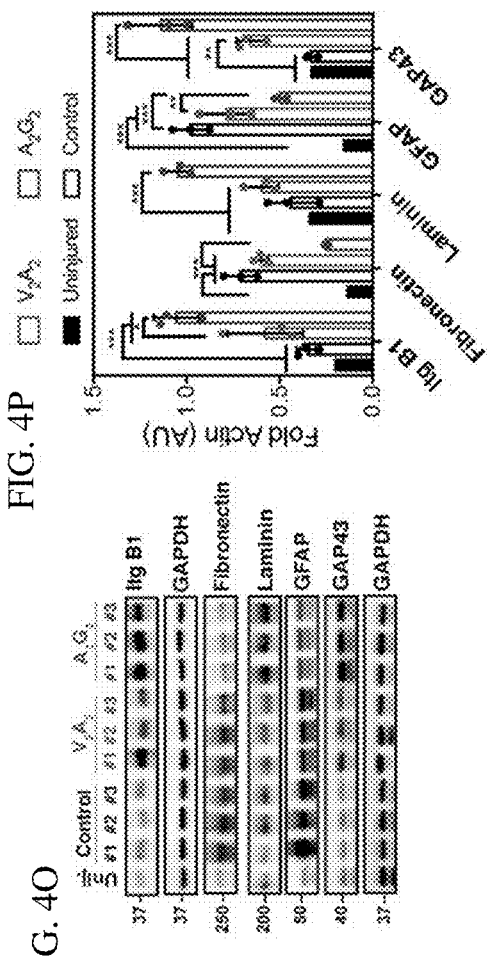
FIG. 4P
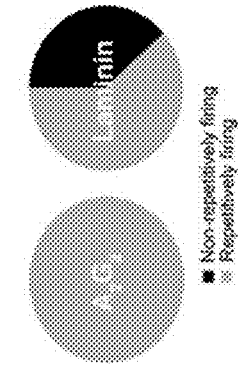
FIG. 4K
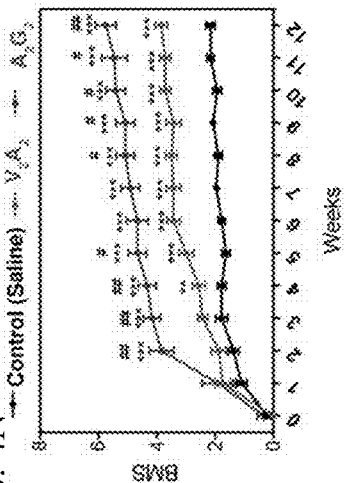
FIG. 4O
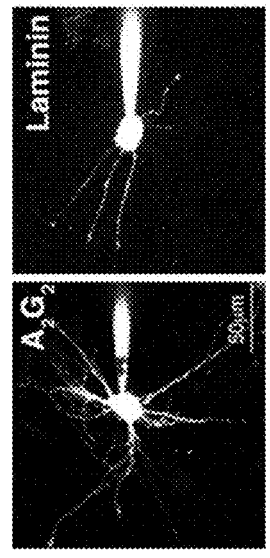
FIG. 4J
FIG. 4N  FIG. 4M
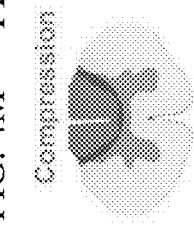

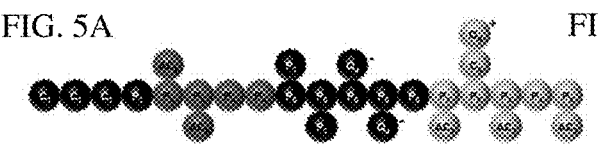
FIG. 5A
FIG. 5B
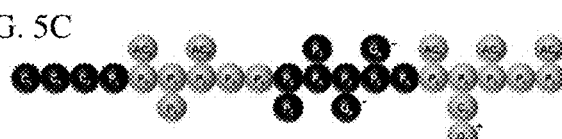
FIG. 5C
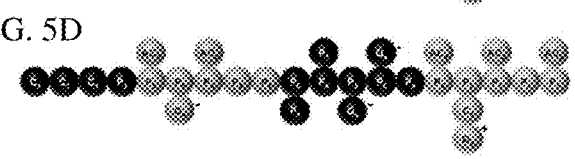
FIG. 5D
FIG. 5E
| PA | Charges | | |
|---|---|---|---|
| | + | − | Total |
| VVAA | 1 | 2 | −1 |
| AAGG | 1 | 2 | −1 |
| VEVAA | 1 | 2 | −1 |
| VE(-)VA | 1 | 3 | −2 |
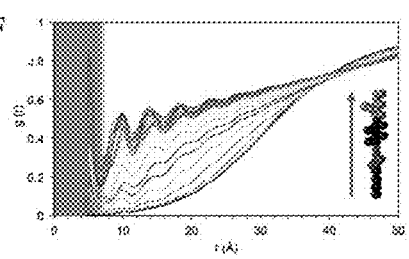
FIG. 5F FIG. 7A  FIG. 7B  FIG. 7C
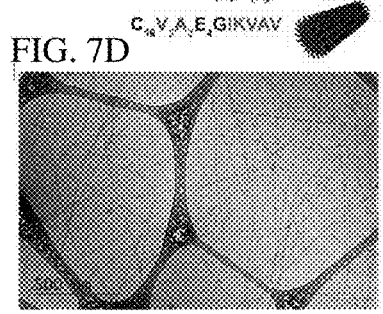
FIG. 7D
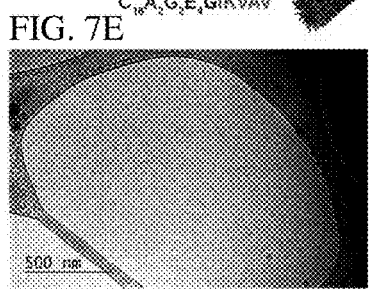
FIG. 7E
FIG. 7F
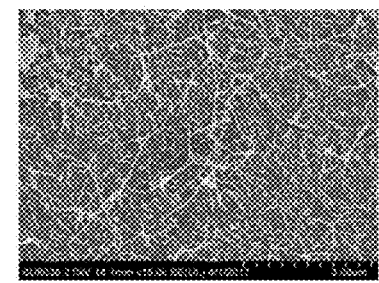
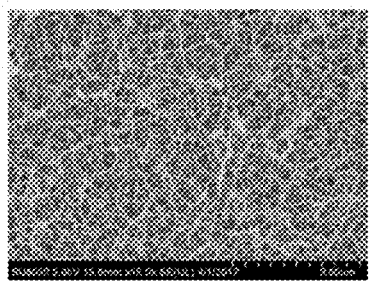
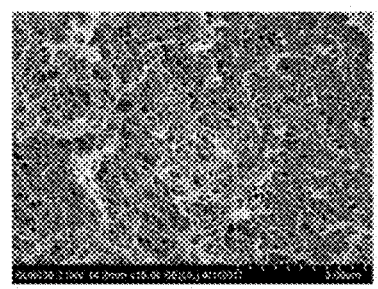
FIG. 7G  FIG. 7H  FIG. 7I FIG. 8A
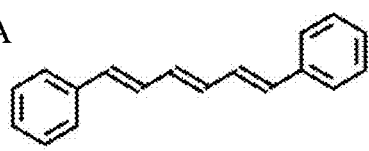
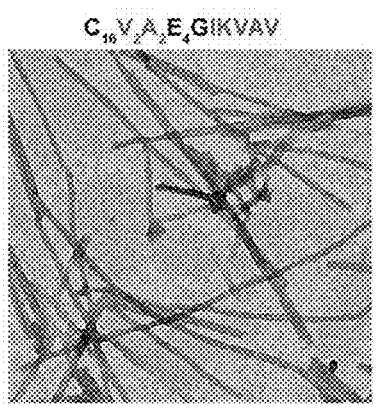
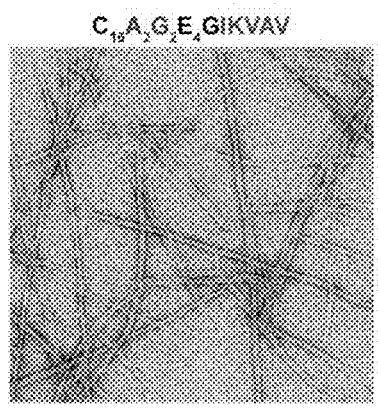
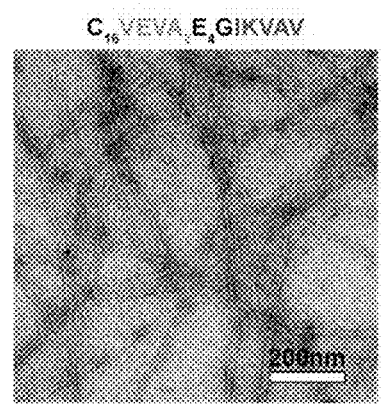
FIG. 8B
FIG. 8C
FIG. 8D FIG. 9A
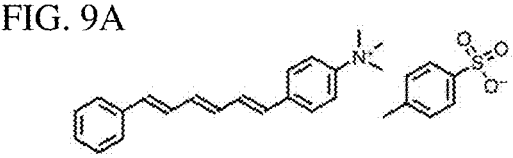
FIG. 9B
$C_{16}V_2A_2E_4GIKVAV$
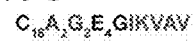
FIG. 9C
$C_{16}A_2G_2E_4GIKVAV$
FIG. 9D
$C_{16}VEVA_2E_4GIKVAV$
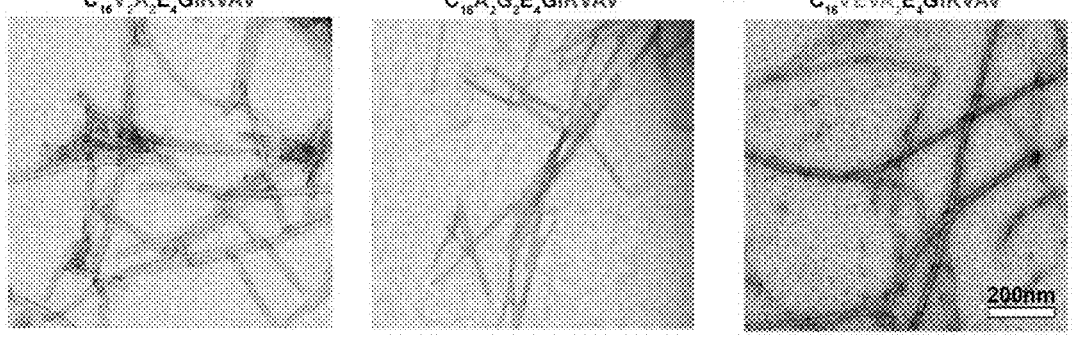
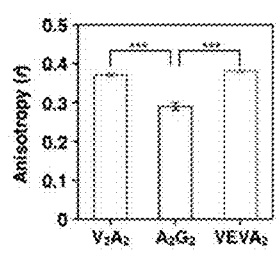
FIG. 9E
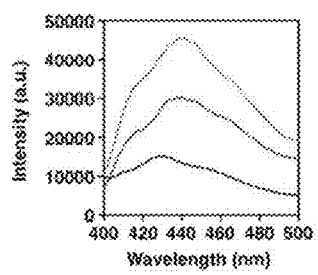
FIG. 9F FIG. 12A    FIG. 12B           FIG. 12C
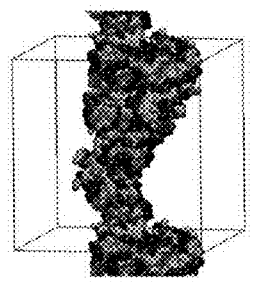 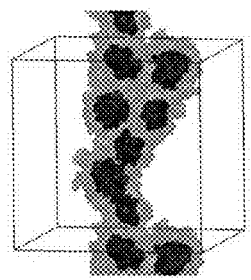 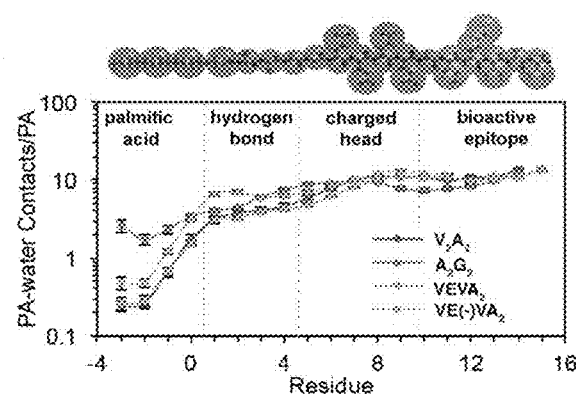
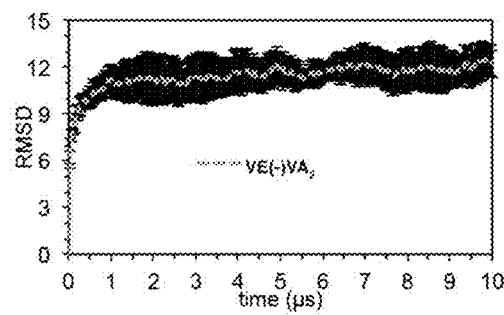 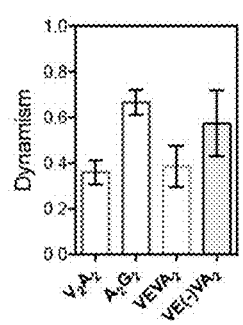
FIG. 12D    FIG. 12E

FIG. 14A
FIG. 14C
FIG. 14E
FIG. 14B
FIG. 14D
FIG. 14F
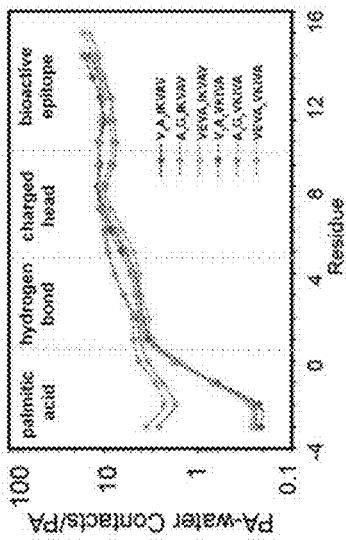
FIG. 14G
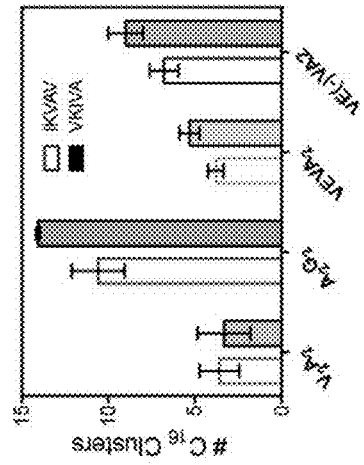
FIG. 14H FIG. 15A
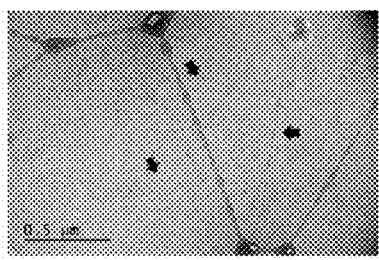
FIG. 15B
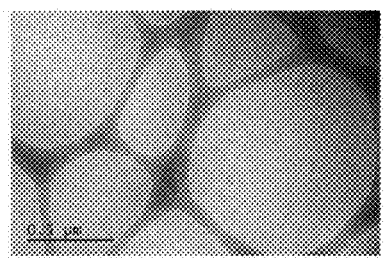
FIG. 15C
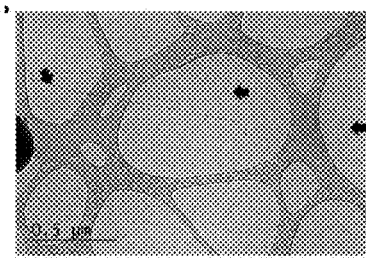
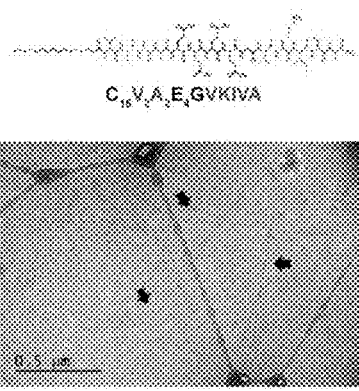
FIG. 15D
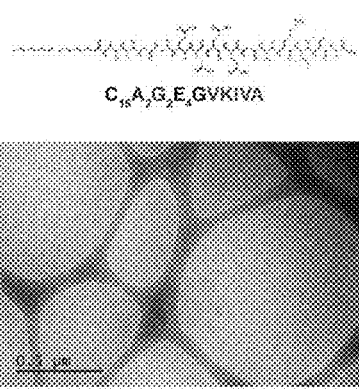
FIG. 15E
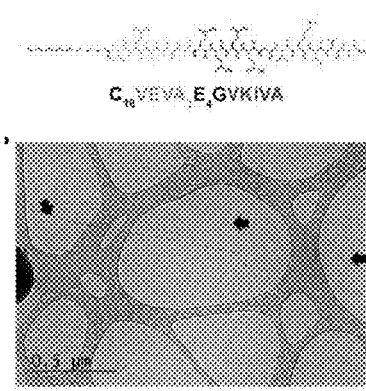
FIG. 15F FIG. 17A
FIG. 17B
FIG. 17C
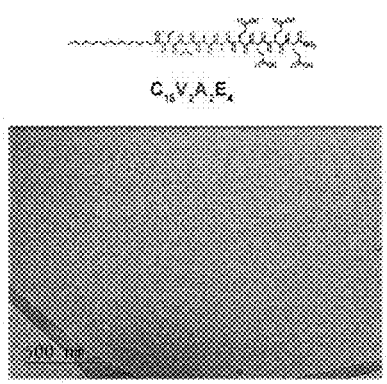
$C_{16}V_2A_2E_4$
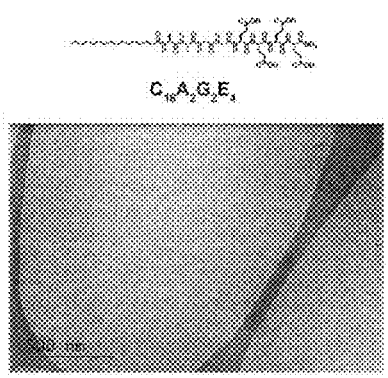
$C_{16}A_2G_2E_4$
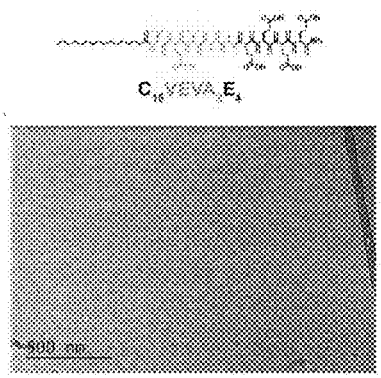
$C_{16}VEVA_2E_4$
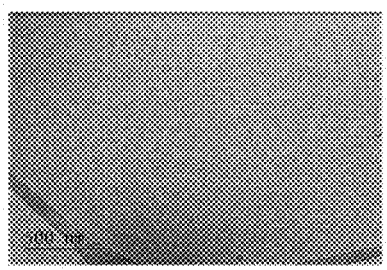
FIG. 17D
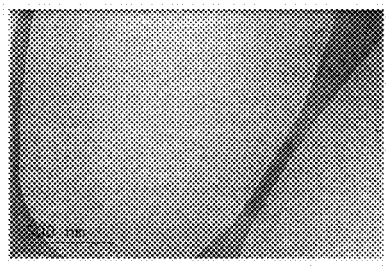
FIG. 17E
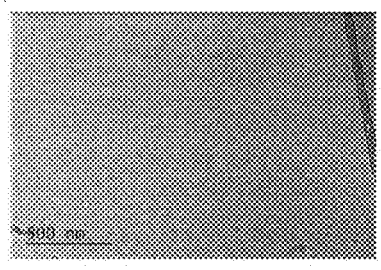
FIG. 17F FIG. 18A  FIG. 18B  FIG. 18G  FIG. 18H
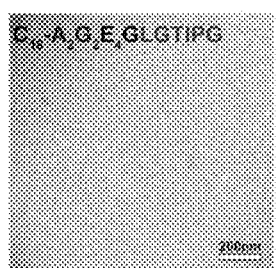 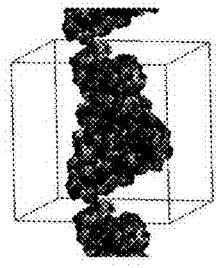 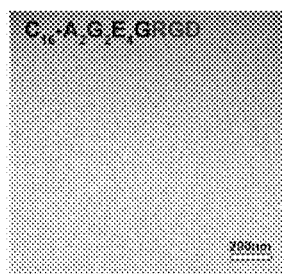 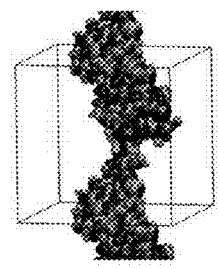
FIG. 18C  FIG. 18D  FIG. 18J
 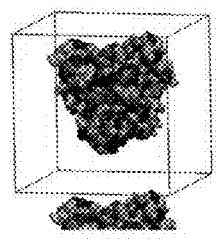 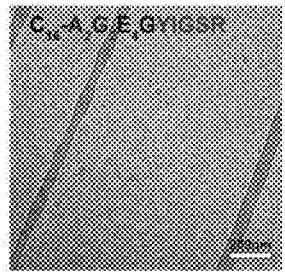 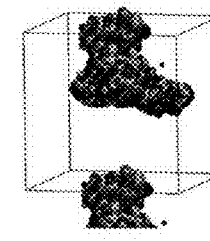
FIG. 18I
 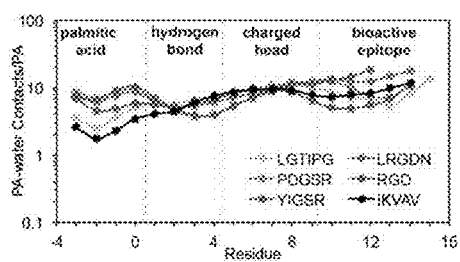
FIG. 18E  FIG. 18F  FIG. 18K

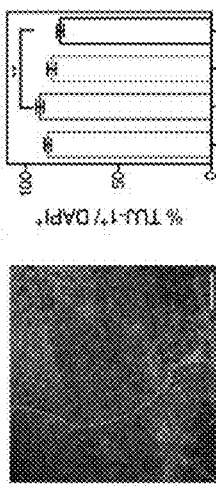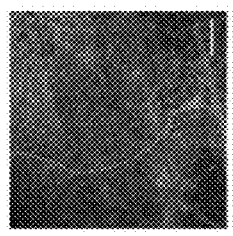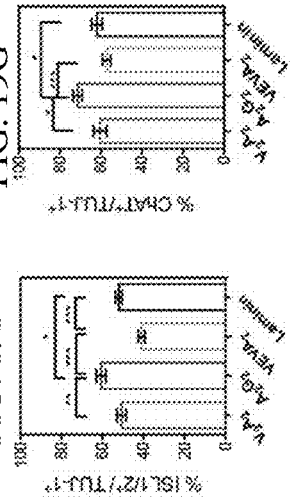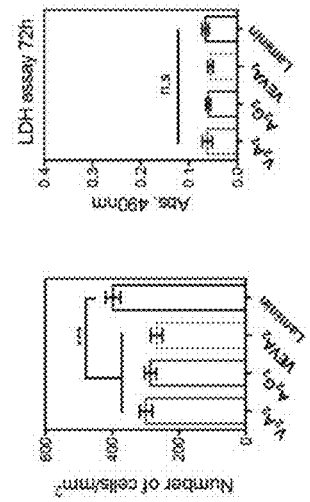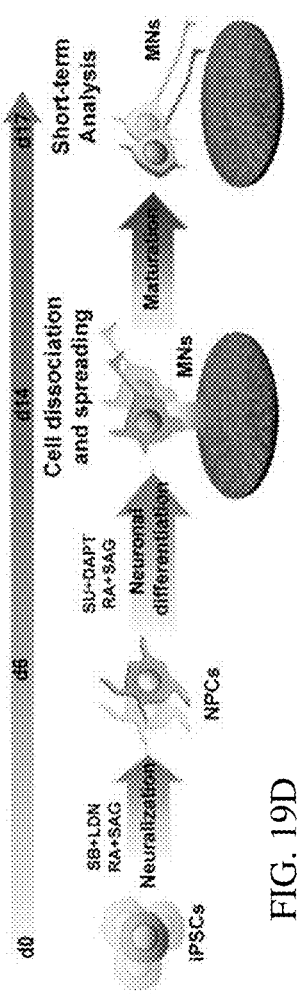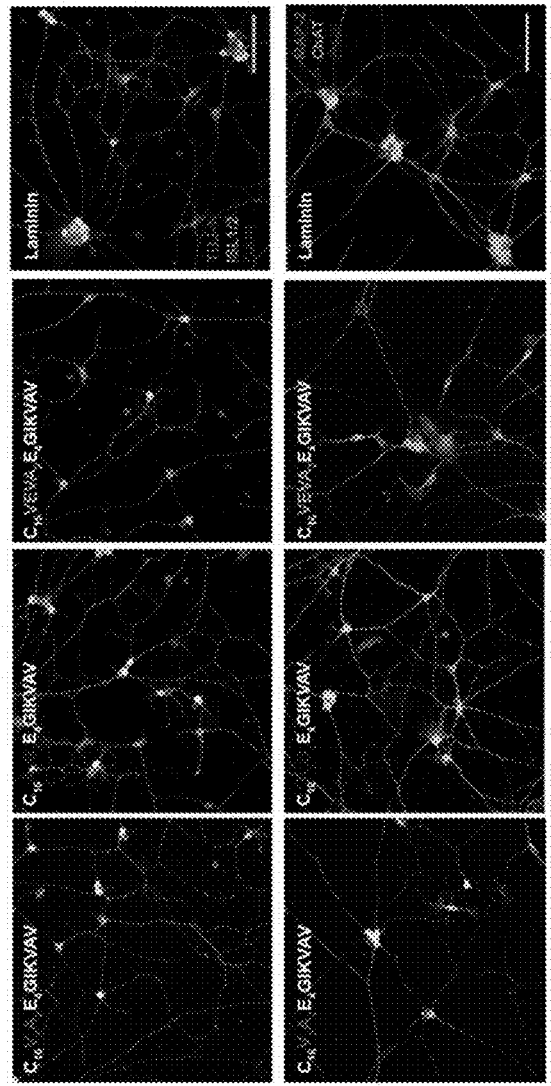
FIG. 19A FIG. 19B FIG. 19C FIG. 19D FIG. 19E FIG. 19F FIG. 19G FIG. 19H FIG. 19I FIG. 20A
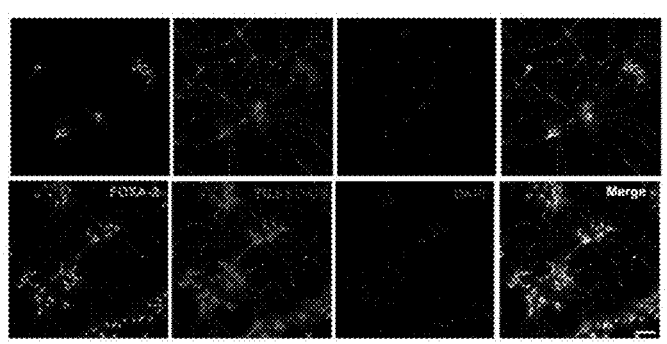
FIG. 20E  FIG. 20F
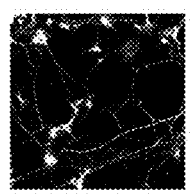 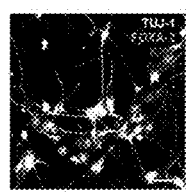
FIG. 20B
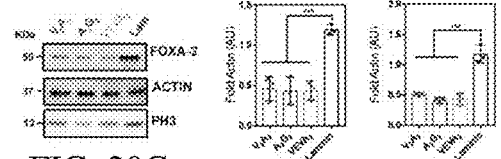
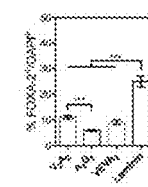 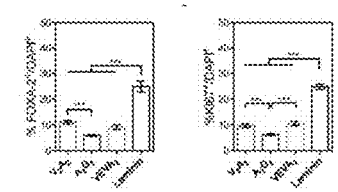 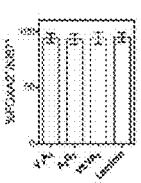
FIG. 20C  FIG. 20D
FIG. 20G  FIG. 20H  FIG. 20I FIG. 21A
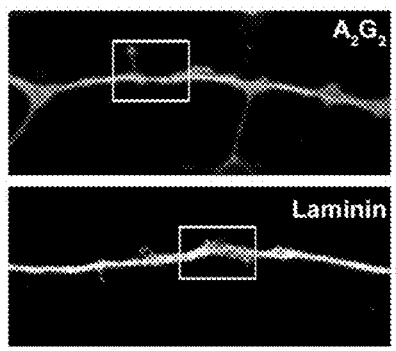
FIG. 21B
FIG. 21C
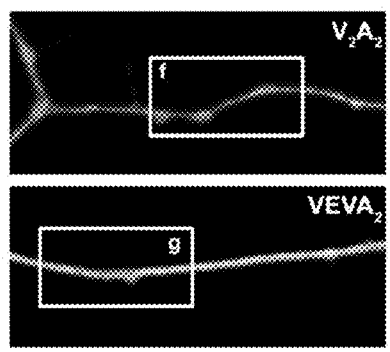
FIG. 21D
FIG. 21F
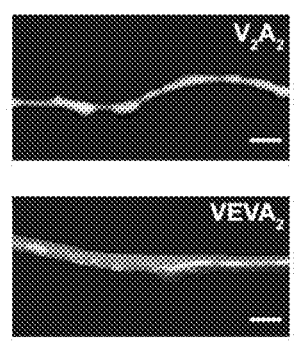
FIG. 21G
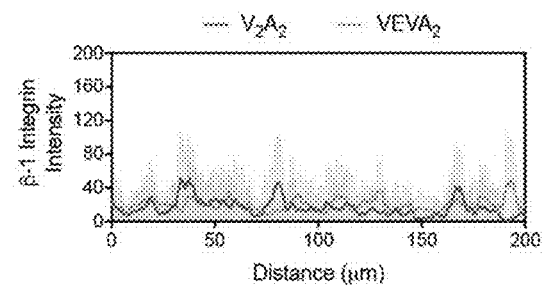
FIG. 21E

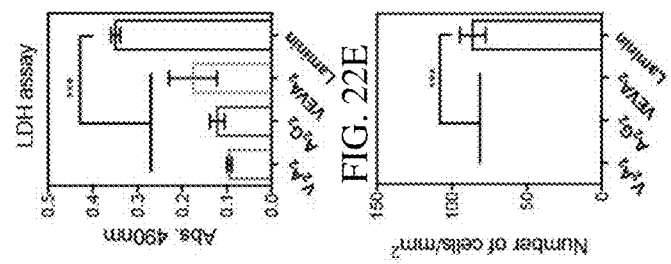
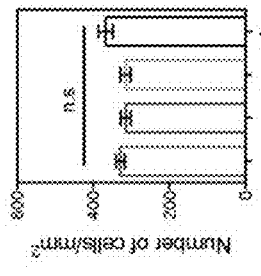
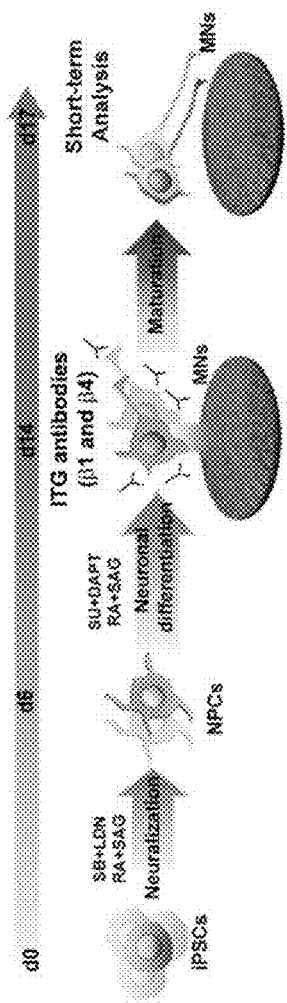
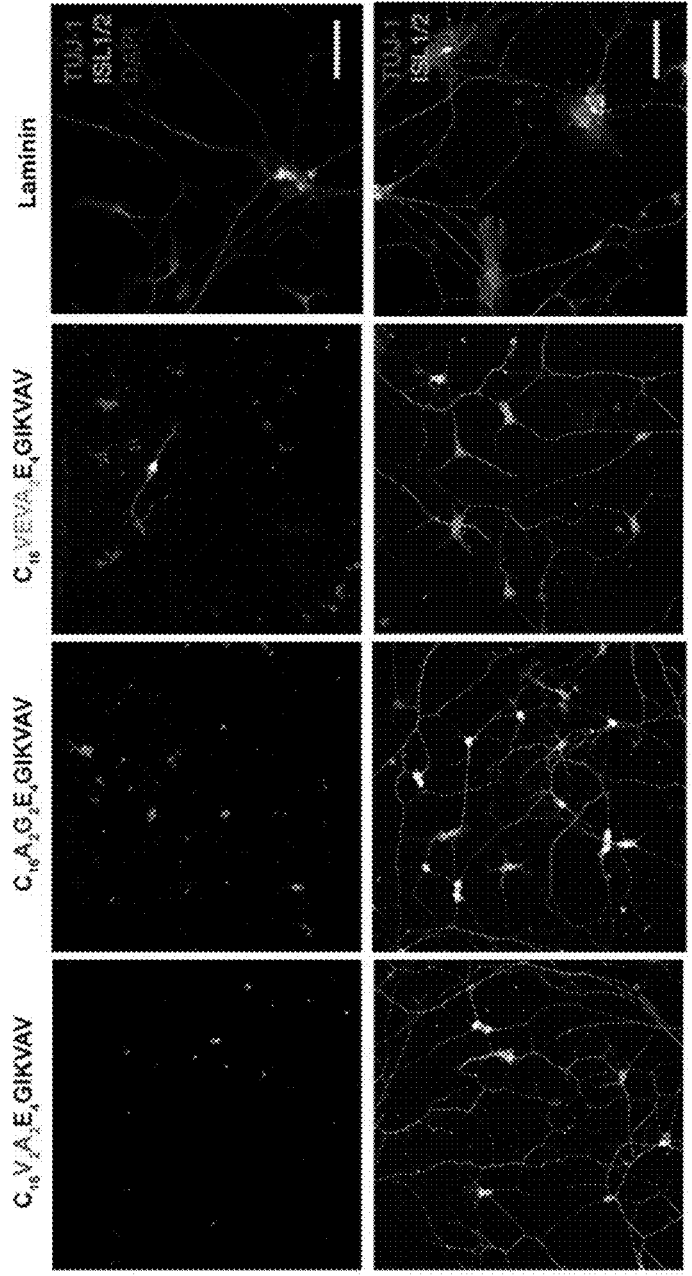
FIG. 22A
FIG. 22B
FIG. 22C
FIG. 22D
FIG. 22E
FIG. 22F

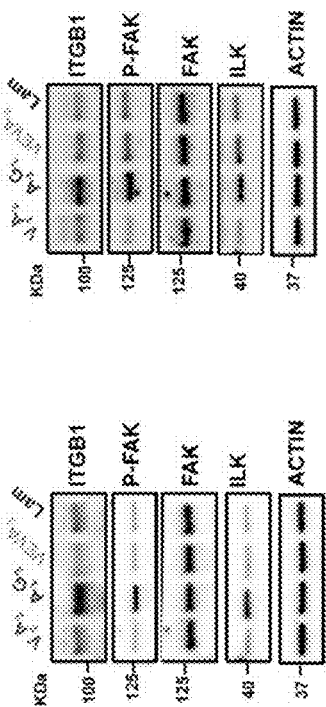
FIG. 23A
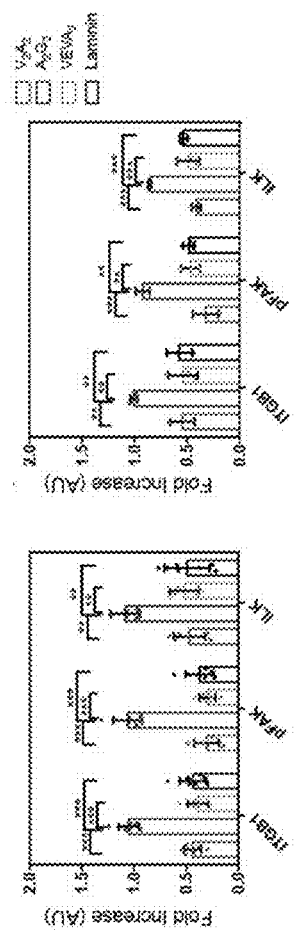
FIG. 23C
FIG. 23E
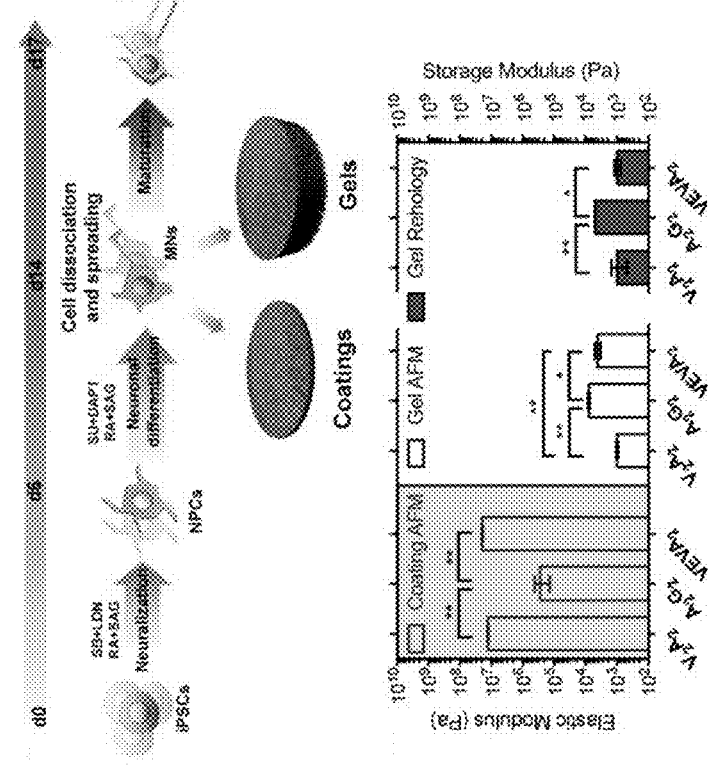
FIG. 23B
FIG. 23D
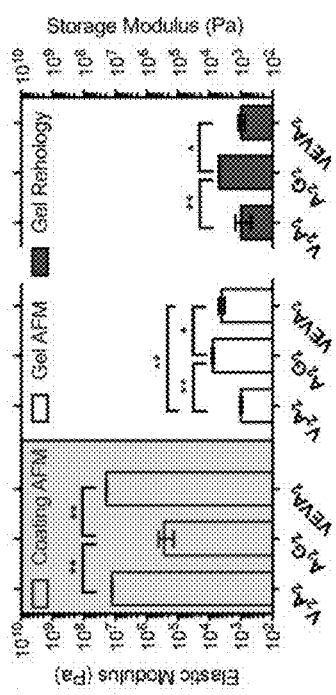
FIG. 23F FIG. 24A
$C_{16}V_2A_2E_4GIKVAV$
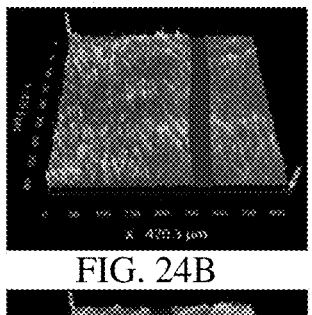
FIG. 24B
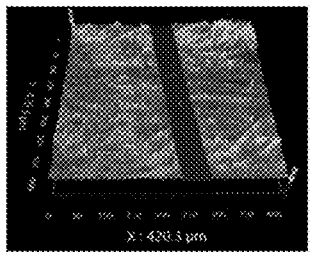
FIG. 24C
$C_{16}A_2G_2E_4GIKVAV$
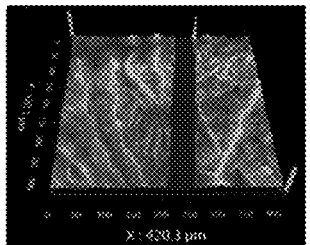
FIG. 24D
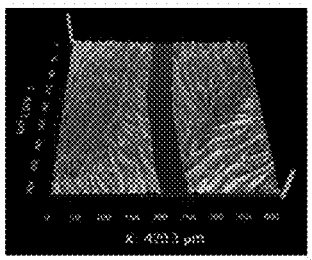
FIG. 24I
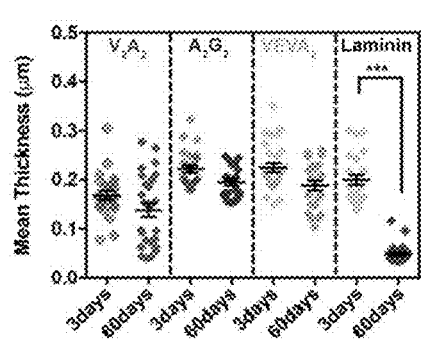
$C_{16}VEVA_2E_4GIKVAV$
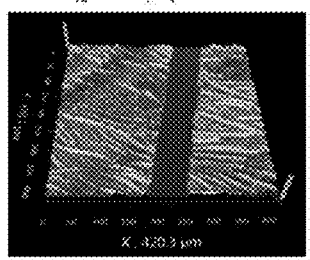
FIG. 24E
Laminin
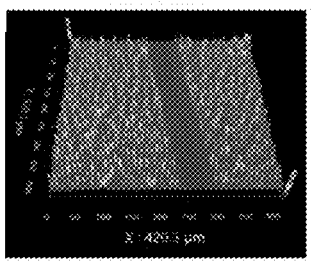
FIG. 24G
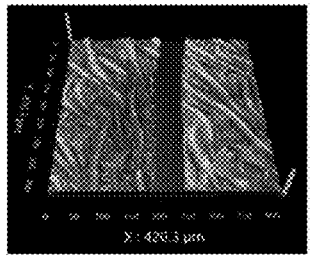
FIG. 24F
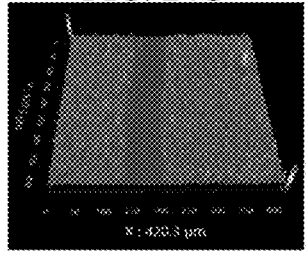
FIG. 24H

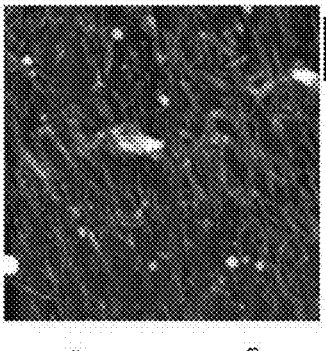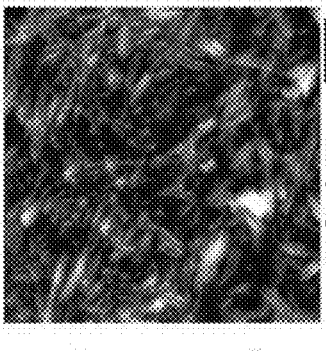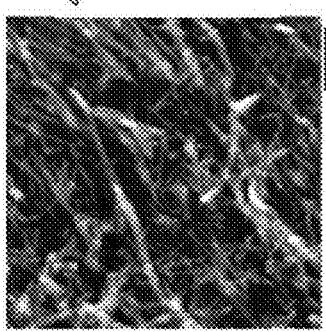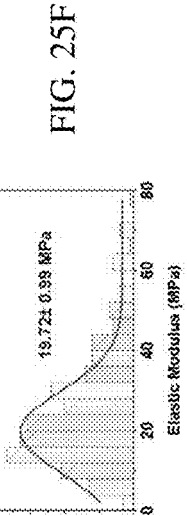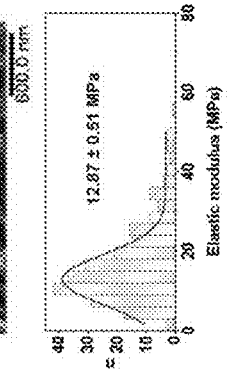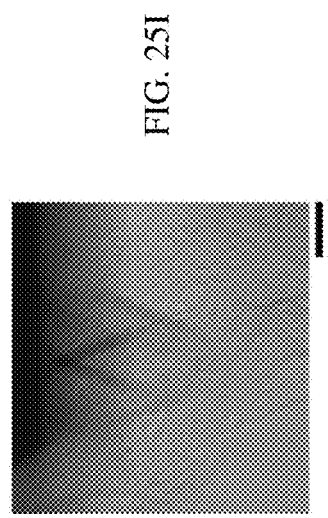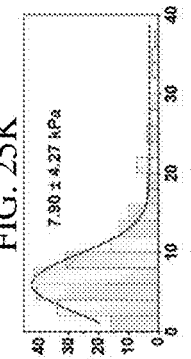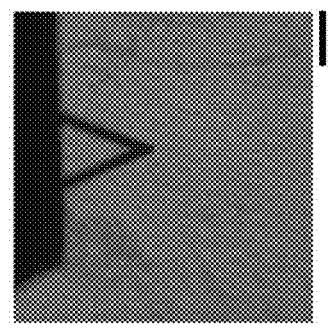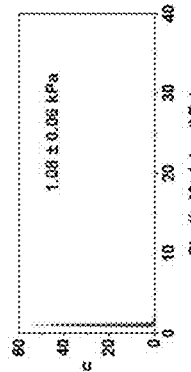
FIG. 25A — FIG. 25L FIG. 26A
FIG. 26B
FIG. 26C
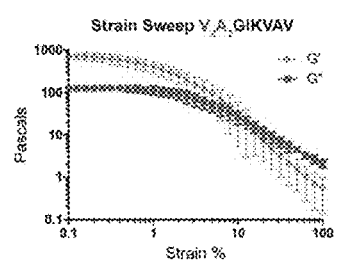
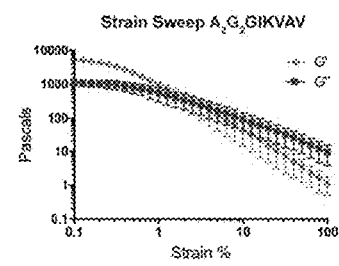
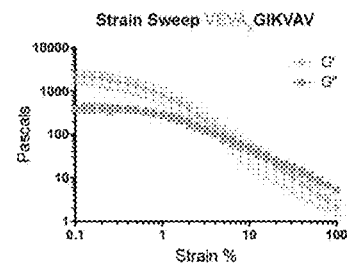
FIG. 26D
FIG. 26E
FIG. 26F
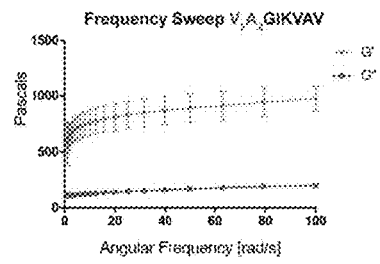
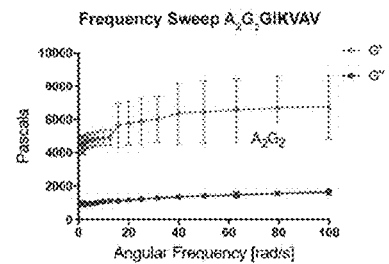
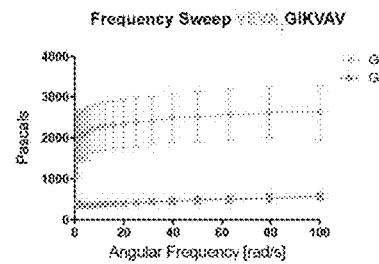

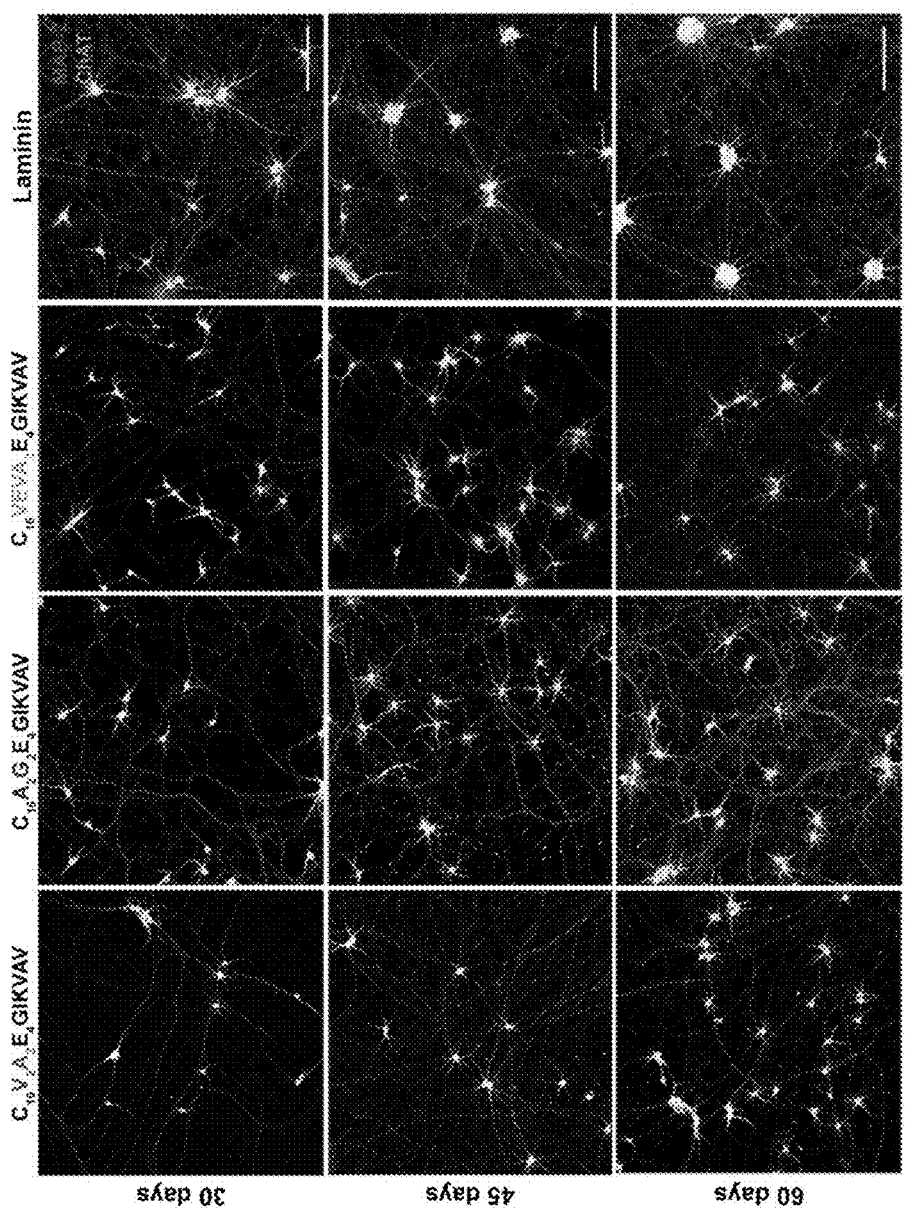

FIG. 29A
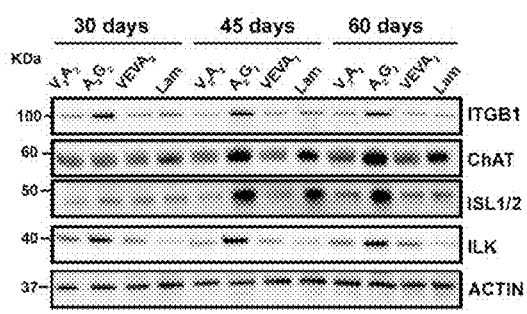
FIG. 29B
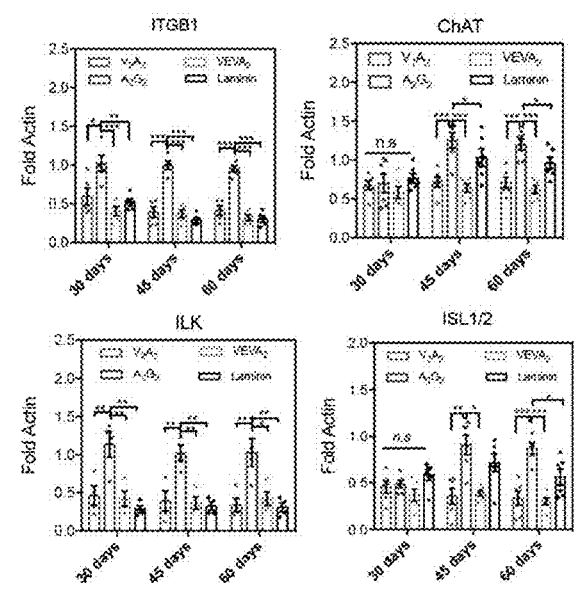
FIG. 29C
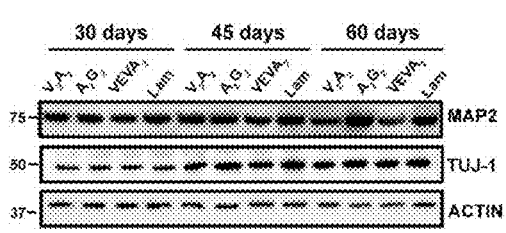
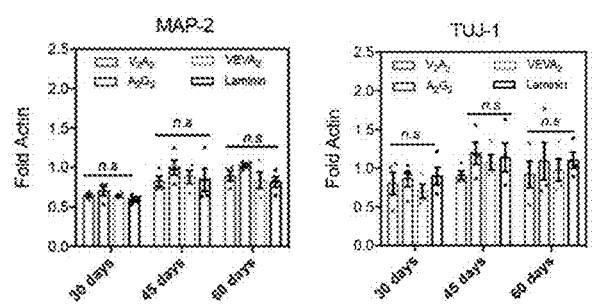
FIG. 29D FIG. 30A
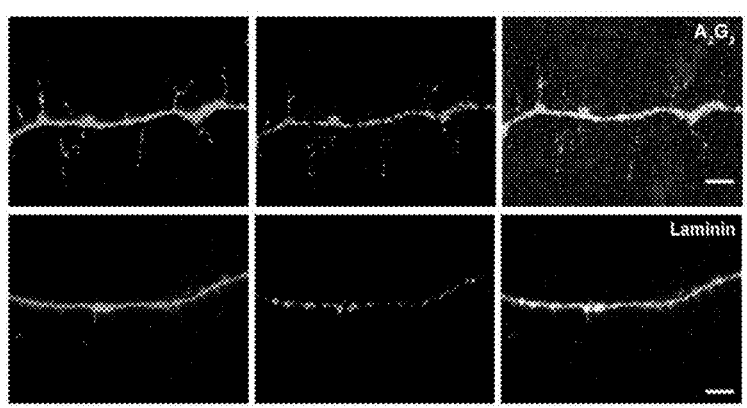
FIG. 30B
FIG. 30C
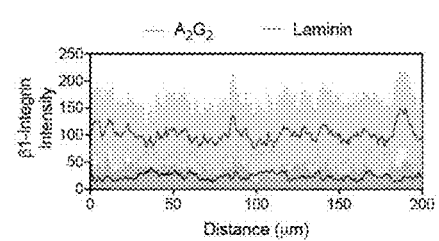

FIG. 32A
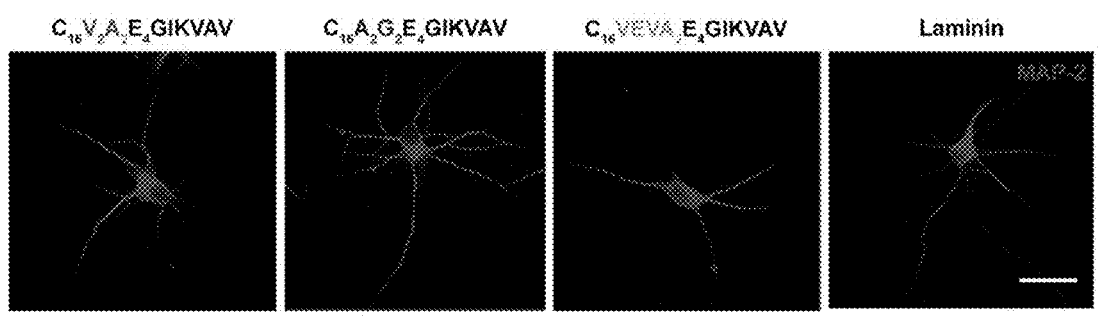
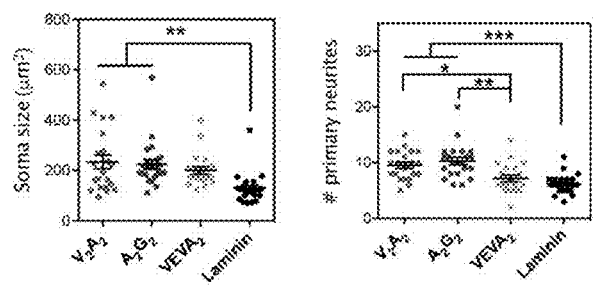
FIG. 32B  FIG. 32C

FIG. 33A
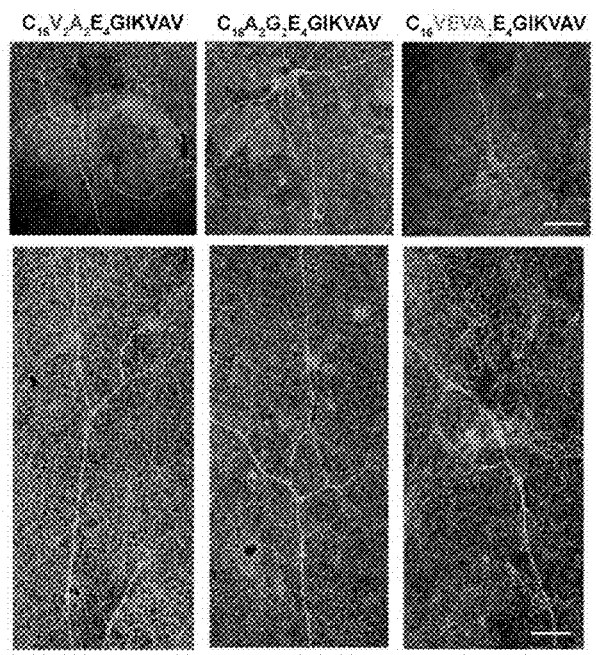
FIG. 33C
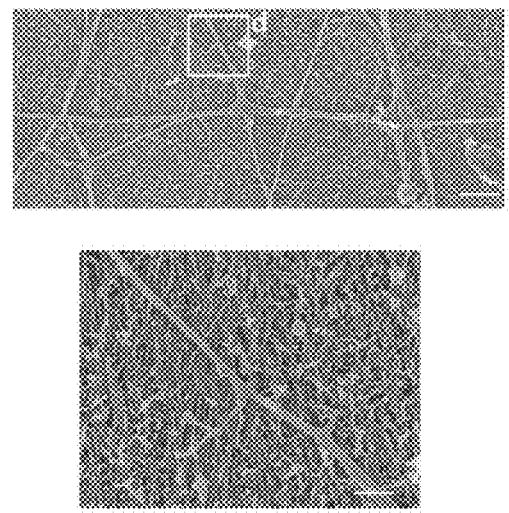
FIG. 33D
FIG. 33B

FIG. 34A
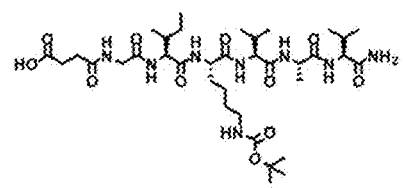
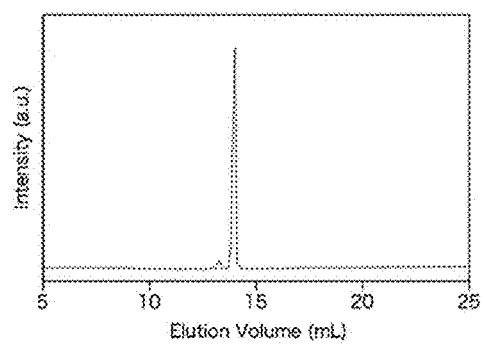
FIG. 34B
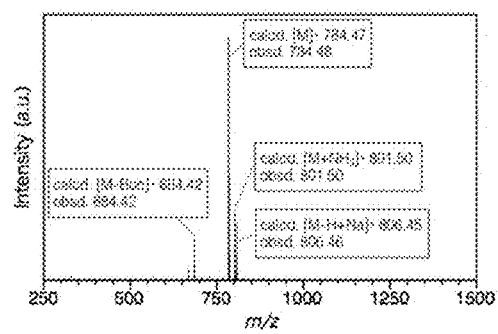
FIG. 34C

FIG. 35A
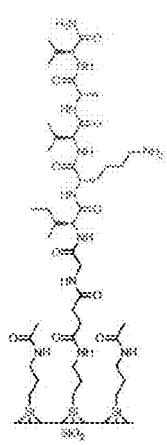
FIG. 35B
FIG. 35C
FIG. 35D
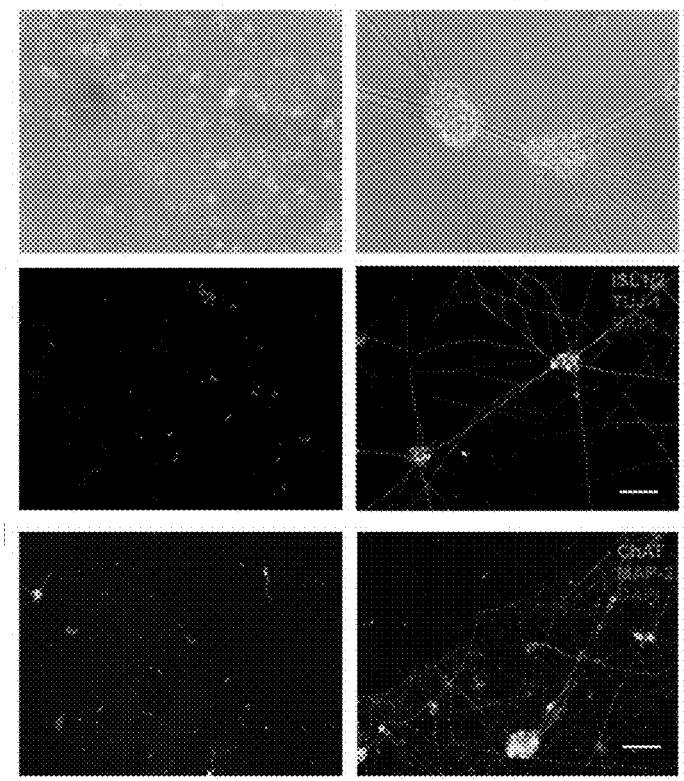
FIG. 35E
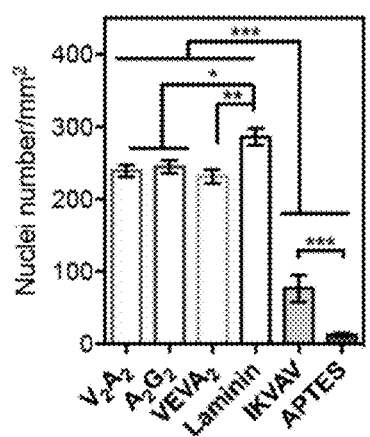

FIG. 36A
FIG. 36C
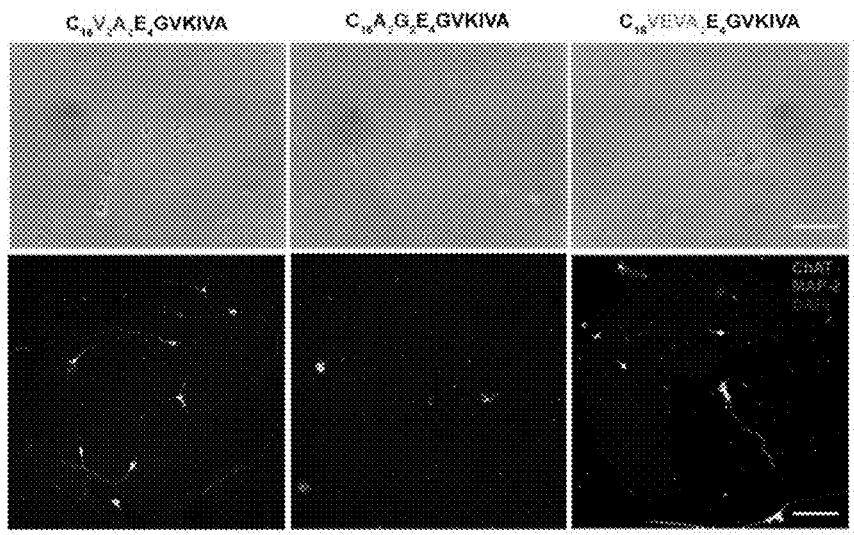
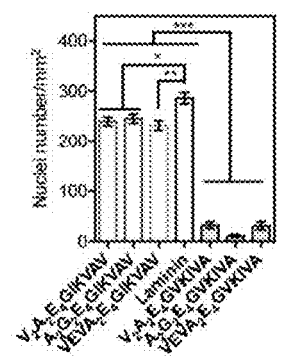
FIG. 36B

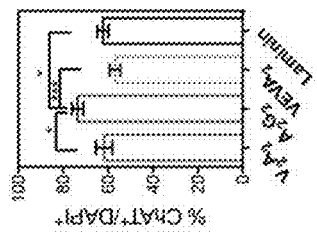
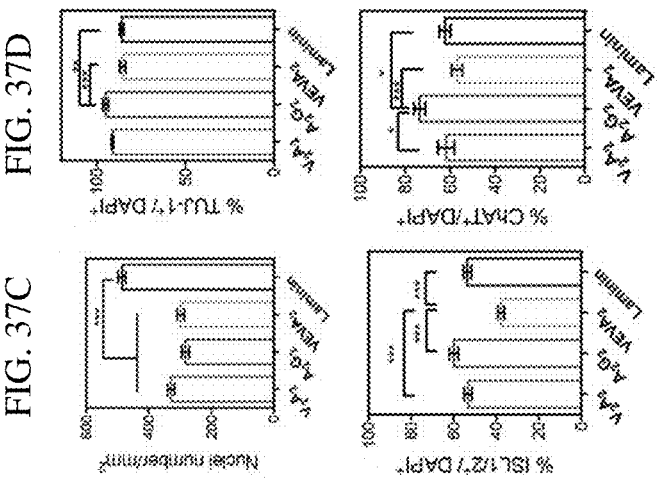
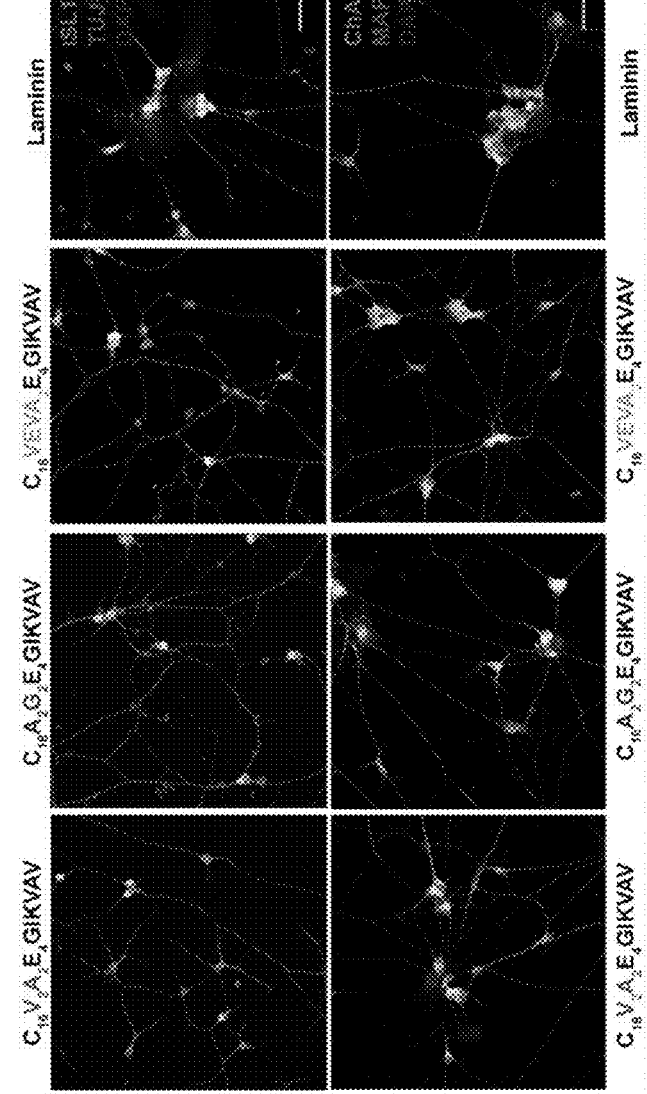
FIG. 37A  FIG. 37B  FIG. 37C  FIG. 37D  FIG. 37E  FIG. 37F

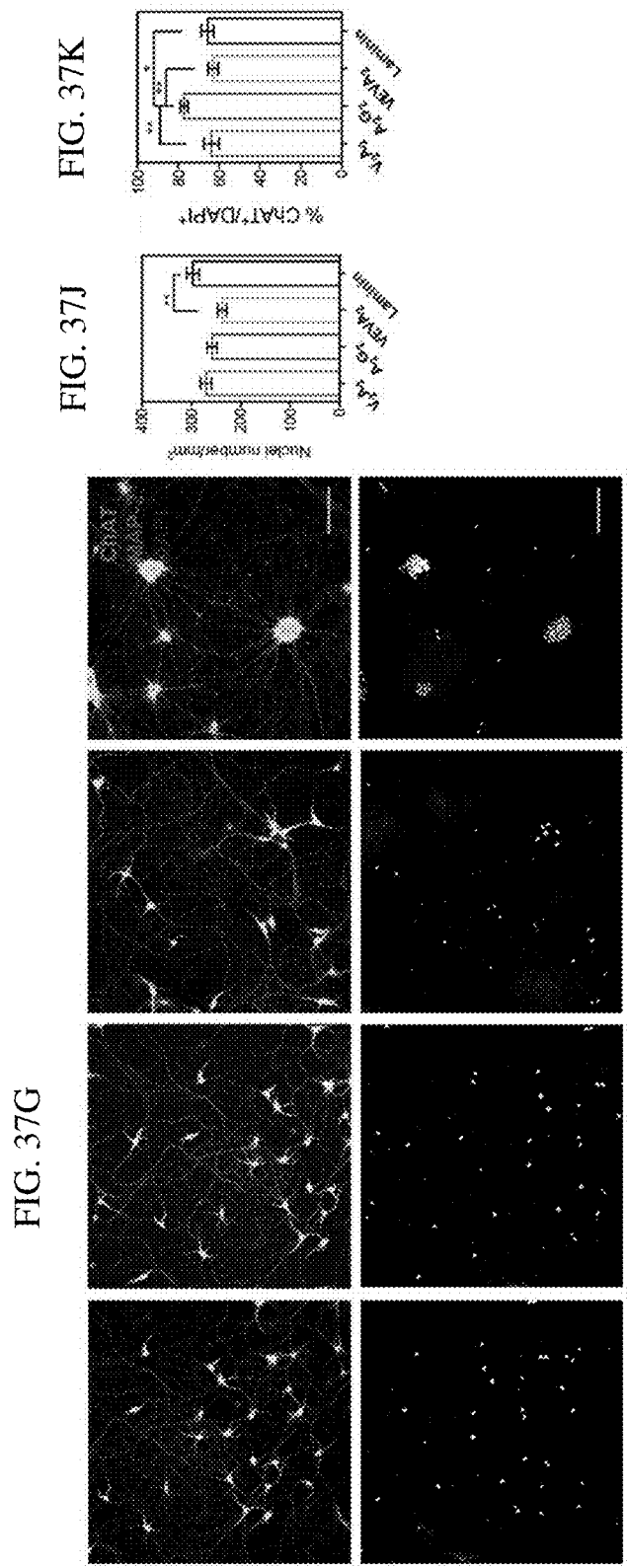

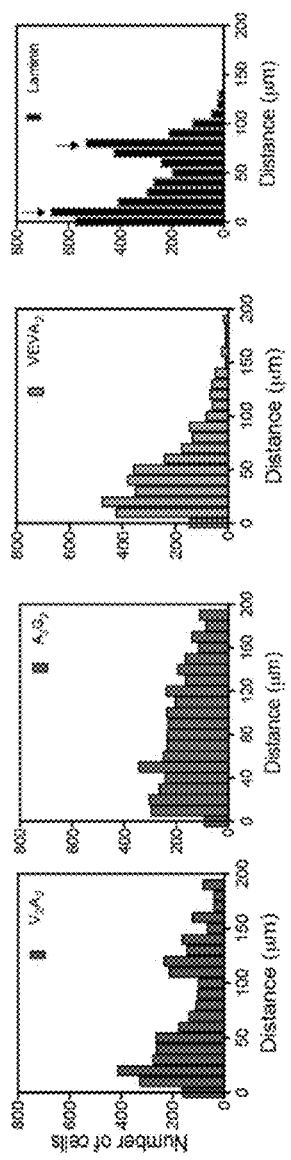
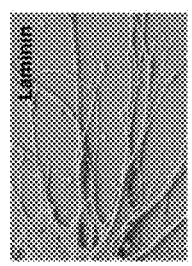
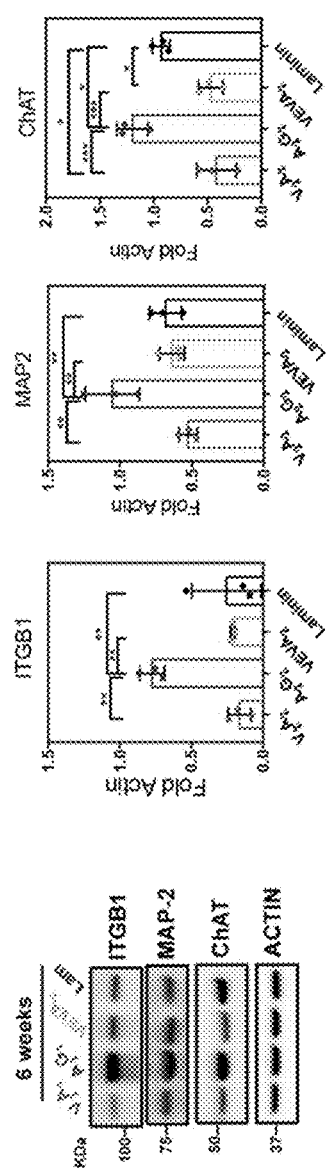
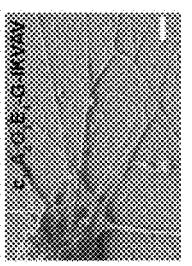
FIG. 37L, FIG. 37M, FIG. 37I, FIG. 37N, FIG. 37O

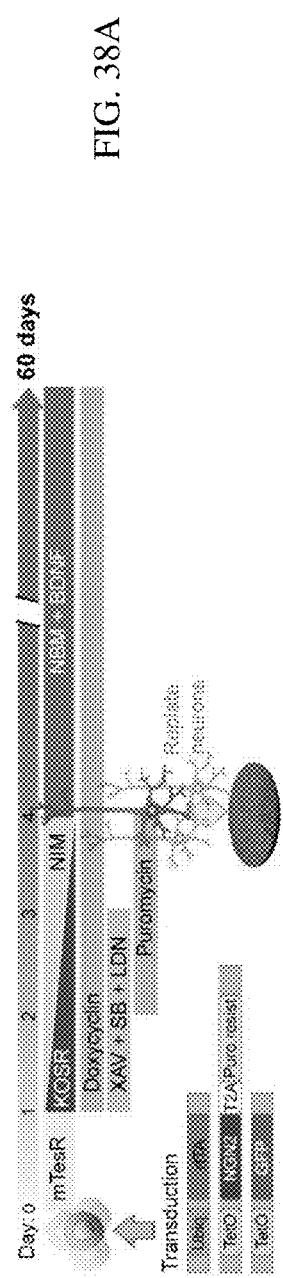
FIG. 38A
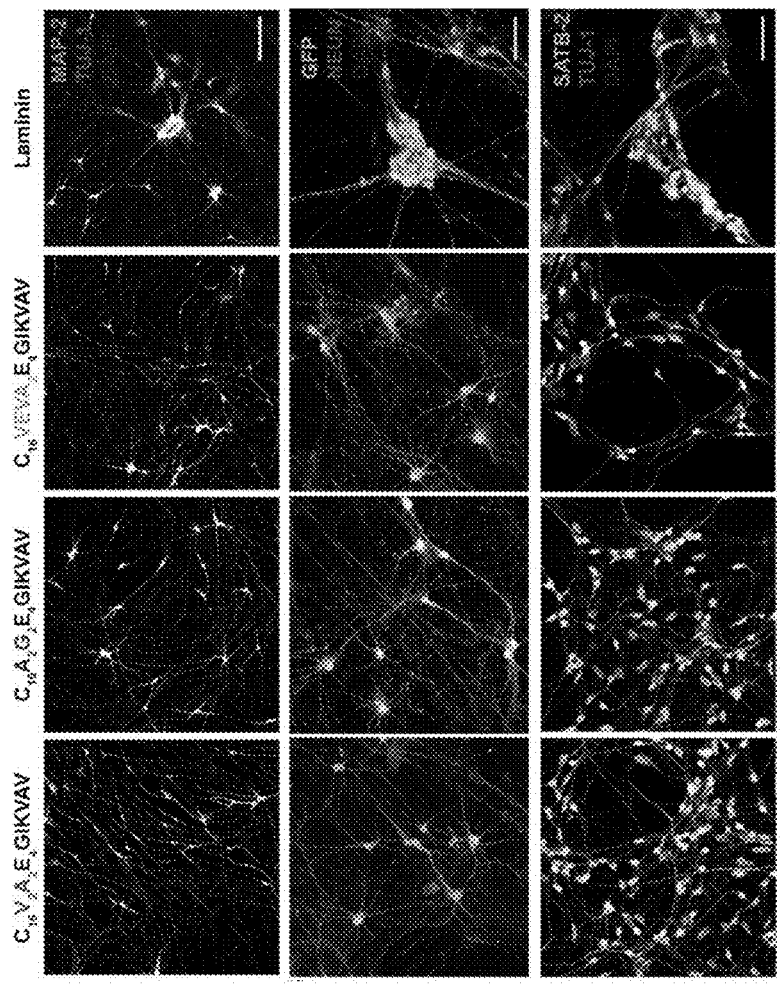
FIG. 38B
FIG. 38C
FIG. 38D

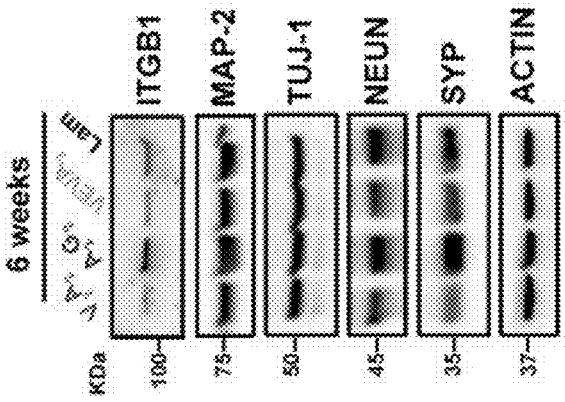
FIG. 38K
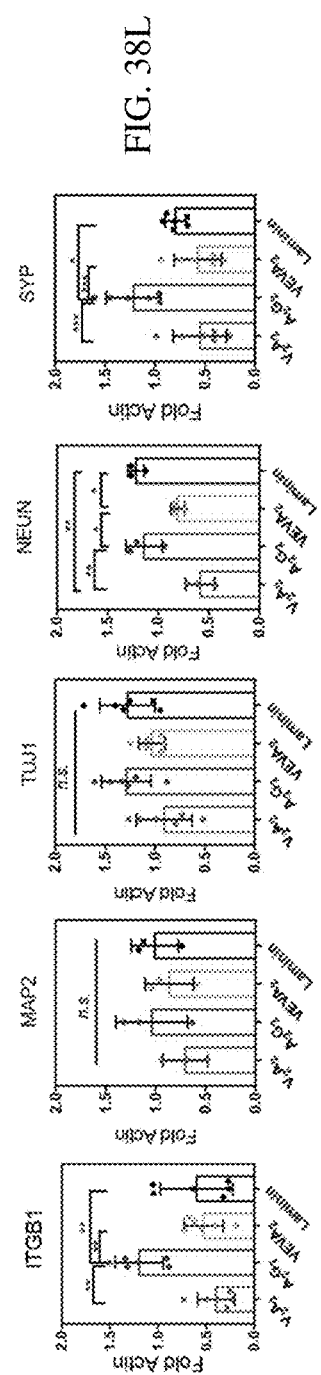
FIG. 38L
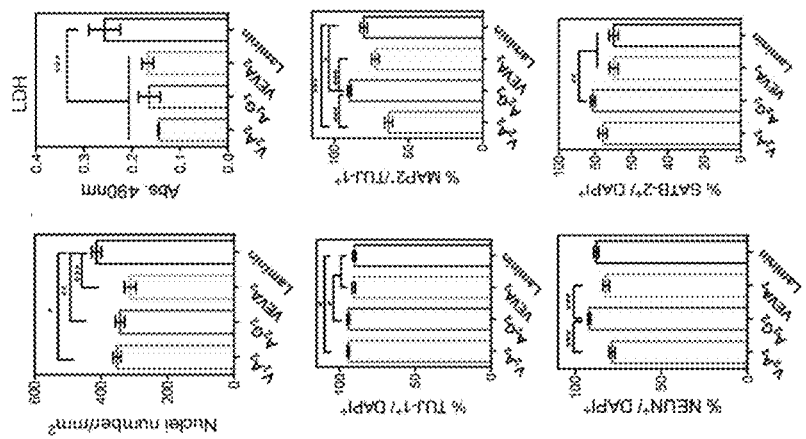
FIG. 38F
FIG. 38H
FIG. 38J
FIG. 38E
FIG. 38G
FIG. 38I

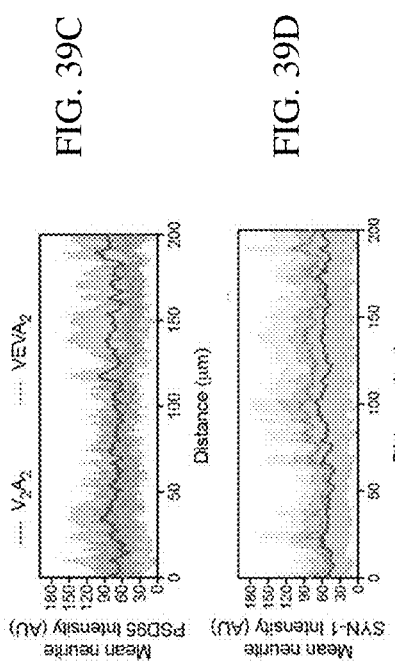
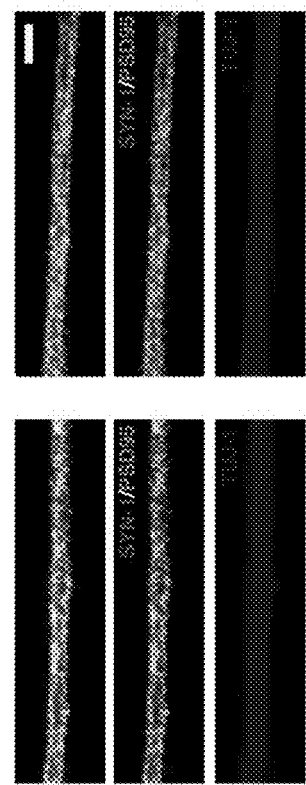
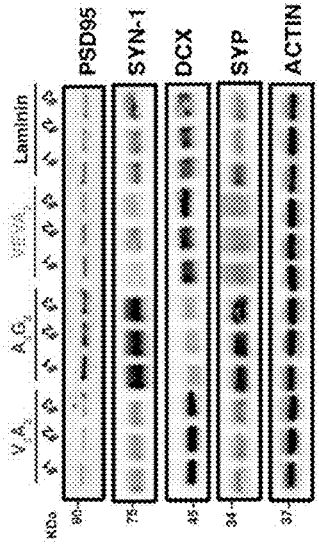

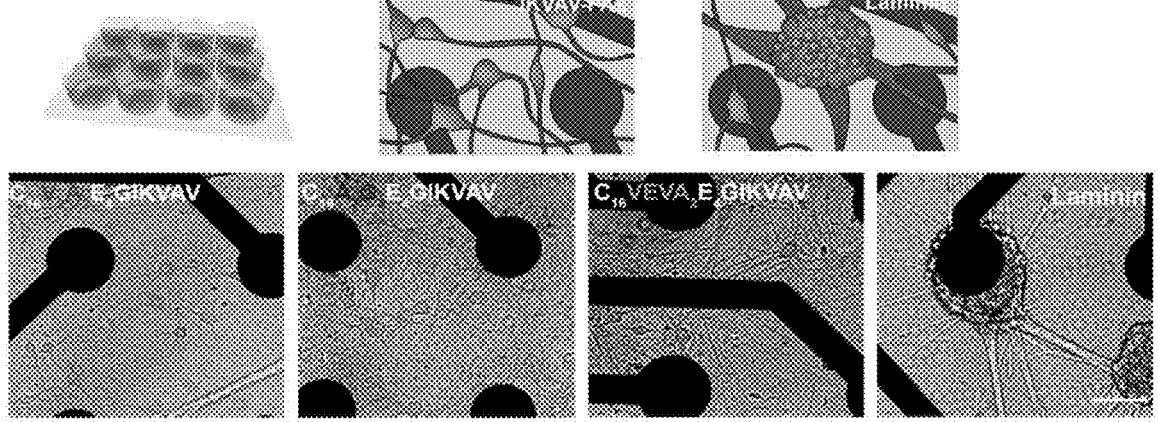
FIG. 40A  FIG. 40B  FIG. 40C
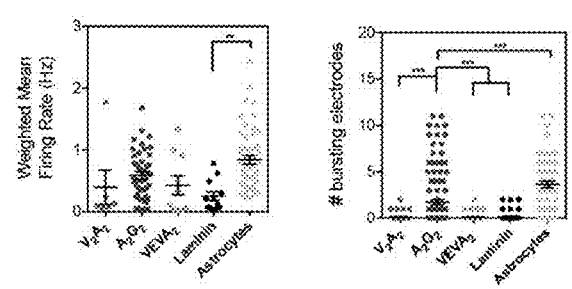
FIG. 40D
FIG. 40E  FIG. 40F

DYNAMICS WITHIN SUPRAMOLECUAR IKVAV MATRICES ENHANCE FUNCTIONAL MATURATION OF HUMAN IPSCS-DERIVED NEURONS AND REGENERATION

CROSS-REFERENCE TO RELATED APPLICATION

This is a national phase 35 U.S.C. § 371 application of PCT International Application No. PCT/US2020/015006, filed Jan. 24, 2020, which claims priority to U.S. Provisional Patent Application Ser. No. 62/796,425, filed Jan. 24, 2019, which are hereby incorporated by reference in its entirety.

SEQUENCE LISTING

The text of the computer readable sequence listing filed herewith, titled "37433.252_SQL-ST25-corrected", created Oct. 24, 2025, having a file size of 4,810 bytes, is hereby incorporated by reference in its entirety.

FIELD

Provided herein are peptide amphiphiles (PAs) comprising a bioactive peptide, nanofibers displaying the bioactive PAs, and methods of use thereof. In some embodiments, provided herein are peptide amphiphiles for use in cell culture methods. In other embodiments, provided herein are peptide amphiphiles for use in methods of treating nervous system injury.

BACKGROUND

The extracellular matrix (ECM) is a hierarchical milieu of water, matrix proteins, and other chemical factors that provides a microenvironment that orchestrates cell behavior and plays essential roles in the developing and adult central nervous system (CNS) as well as in injury and disease. The molecular complexity and dynamic organization of the ECM allow spatiotemporal binding to many specific transmembrane receptors, which in turn triggers multiple and vital cellular responses through a process known as signal transduction. The rapid evolution of synthetic materials in recent years has allowed to recapitulate facets of the ECM that have substantially improved in vitro cell culture platforms and tissue engineering approaches. Traditional synthetic substrates and matrices have proven to be of limited utility, in large part because of their failure to capture the dynamic characteristics of ECM in different in vivo contexts such as development, maturation, progression of diseases, and even the maintenance of homeostasis. The design of synthetic materials able to more efficiently mimic the structure and function of biological matrices still remains a challenging objective.

SUMMARY

Provided herein are peptide amphiphiles (PAs) comprising a bioactive peptide, nanofibers displaying the bioactive PAs, and methods of use thereof. In some embodiments, the peptide amphiphiles may be used in methods of generating neuronal cells. In other embodiments, the peptide amphiphiles may be used in methods of treating central nervous system injury, such as spinal cord injury.

In some embodiments, provided herein are peptide amphiphiles. The peptide amphiphiles comprise a hydrophobic tail, a structural peptide segment, a charged peptide segment, and a bioactive peptide. Further described herein are nanofibers comprising a peptide amphiphile as described herein. The nanofibers may further comprise one or more filler peptide amphiphiles. The filler peptide amphiphiles comprise a hydrophobic tail, a structural peptide segment, and a charged peptide segment. The filler peptide amphiphiles do not comprise a bioactive moiety.

In some embodiments, the hydrophobic tail may comprise an 8-24 carbon alkyl chain ($C_{8-24}$). In some embodiments, the hydrophobic tail comprises a 16 carbon alkyl chain ($C_{16}$).

In some embodiments, the structural peptide segment comprises $V_2A_2$ (SEQ ID NO: 3), $A_2G_2$ (SEQ ID NO: 1), or $VEVA_2$ (SEQ ID NO: 4). In some embodiments, the structural peptide segment has a propensity to form β-sheet-like structures or other stabilizing interactions (e.g., that promote self-assembly of adjacent nanofibers) with adjacent structural peptide segments. In some embodiments, the structural peptide segment has a total propensity for forming β-sheet conformations of 4 or less.

In some embodiments, the charged peptide segment comprises an acidic, basic, or zwitterionic peptide segment. In some embodiments, the charged peptide segment comprises 2-4 glutamic acid (E) residues. For example, the charged peptide segment may comprise EE, EEE, or EEEE (SEQ ID NO: 5).

In some embodiments, the bioactive peptide comprises IKVAV (SEQ ID NO: 25). The bioactive peptide may be attached to the charged peptide segment by a linker. For example, the linker may be a single glycine (G) residue.

In some embodiments, the peptide amphiphiles comprise $C_{8-24}$-$V_2A_2E_4$GIKVAV (SEQ ID NO: 6). In other embodiments, the peptide amphiphiles comprise $C_{8-24}$-$A_2G_2E_4$GIKVAV (SEQ ID NO: 7). In some other embodiments, the peptide amphiphiles comprise $C_{8-24}$-$VEVA_2E_4$GIKVAV (SEQ ID NO: 8).

In some embodiments, the filler peptide amphiphiles comprise $C_{8-24}$-$V_2A_2E_4$ (SEQ ID NO: 9). In some embodiments, the filler peptide amphiphiles comprise $C_{8-24}$-$A_2G_2E_4$ (SEQ ID NO: 10). In some other embodiments, the filler peptide amphiphiles comprise $C_{8-24}$-$VEVA_2E_4$ (SEQ ID NO: 11).

In some embodiments, the disclosed peptide amphiphiles or peptide amphiphile nanofibers may be used in cell culture methods. For example, the disclosed peptide amphiphiles or peptide amphiphile nanofibers may be used in neuronal cell culture methods. In some embodiments, the disclosed peptide amphiphiles or peptide amphiphile nanofibers may be used for culture of motor neurons.

In some embodiments, provided herein are methods of treating a central nervous system (CNS) injury comprising administering a pharmaceutical composition comprising a peptide amphiphile disclosed herein to a subject suffering from a CNS injury. In some embodiments, the CNS injury is a spinal cord injury. In some embodiments, the pharmaceutical composition is administered parenterally.

BRIEF DESCRIPTION OF THE DRAWINGS

(FIG. 1A) Schematic molecular structures of IKVAV PAs containing (FIG. 1B) $V_2A_2$ (SEQ ID NO: 3), (FIG. 1C) $A_2G_2$ (SEQ ID NO: 1), and (FIG. 1D) $VEVA_2$ (SEQ ID NO: 4). (FIGS. 1E-1G) Cryogenic TEM micrographs of (FIG. 1E) $V_2A_2$, (FIG. 1F) $A_2G_2$, and (FIG. 1G) $VEVA_2$ in aqueous KCl and NaCl ([PA]=0.01 wt %, [KCl]=3 mM, [NaCl]=150 mM).

(FIGS. 1H-1J) SEM micrographs of (FIG. 1H) $V_2A_2$, (FIG. 1I) $A_2G_2$, and (FIG. 1J) $VEVA_2$. (FIG. 1K) FT-IR spectra (1500-1800 cm$^{-1}$) of film samples of $V_2A_2$, $A_2G_2$, and $VEVA_2$. (FIG. 1L) WAXS profiles of $V_2A_2$, $A_2G_2$, and $VEVA_2$ in aqueous KCl and NaCl ([PA]=5.3 mM, [KCl]=3 mM, [NaCl]=150 mM).

FIGS. 2A-2I. Dynamic within supramolecular IKVAV PAs induce differential effect on human motor neuron (MN) signaling. (FIG. 2A) Fluorescent depolarization profiles ($\lambda_{ex}$=336 nm, $\lambda_{em}$=450 nm) at 25° C. of DPH (2.8 μM), embedded in IKVAV PAs containing $V_2A_2$ (SEQ ID NO: 3), $A_2G_2$ (SEQ ID NO: 1), and $VEVA_2$ in aqueous KCl and NaCl ([PA]=100 μM, [KCl]=3 mM, [NaCl]=150 mM). (FIG. 2B) Self-assembled structures and coarse grained representation of single IKVAV PA fibers containing $V_2A_2$ (SEQ ID NO: 3), $A_2G_2$ (SEQ ID NO: 1), and $VEVA_2$ PAs after 10 μs. Micrographs include partial periodic images through the fiber formation axis in the simulation box. Water and ions are omitted for clarity. (FIG. 2C) Dynamism analysis of IKVAV PAs containing $V_2A_2$ (SEQ ID NO: 3), $A_2G_2$ (SEQ ID NO: 1), and $VEVA_2$ (SEQ ID NO: 4) structures formed in B. (FIG. 2D) Fluorescence emission spectra ($\lambda_{ex}$=336 nm) at 25° C. of DPH (2.8 μM), embedded in IKVAV PAs containing $V_2A_2$ (SEQ ID NO: 3), $A_2G_2$ (SEQ ID NO: 1), $VEVA_2$ (SEQ ID NO: 4) in aqueous KCl and NaCl ([PA]=100 μM, [KCl]=3 mM, [NaCl]=150 mM). (FIG. 2E) Water content analysis of IKVAV PAs containing $V_2A_2$ (SEQ ID NO: 3), $A_2G_2$ (SEQ ID NO: 1), and $VEVA_2$ (SEQ ID NO: 4). (FIG. 2F) Representative three-dimensional SIM micrographs (left) and shadow reconstructions (right) of MN neurites (TUJ-1, green) containing b-1 Integrin (ITGB1) cultured on $A_2G_2$ and laminin. (FIG. 2G) Intensity analysis of ITGB1 in MNs cultured on $A_2G_2$ and laminin matrices at 72 h. (FIG. 2H) Western blot analysis and (FIG. 2I) normalized protein levels of ITGB1 and downstream kinases (ILK, pFAK, FAK) in MN cultured on supramolecular IKVAV matrices containing $V_2A_2$ (SEQ ID NO: 3), $A_2G_2$ (SEQ ID NO: 1), $VEVA_2$ (SEQ ID NO: 4) at 72 h. Scale bar: 10 mm. The data are means of at least 4 independent differentiations. All the values are presented as the mean±SD; ANOVA (*P<0.05, P<0.01 and *P<0.001).

FIGS. 3A-3O. The effect of intermolecular cohesive forces of IKVAV PA containing $A_2G_2$ on human motor neurons (MNs) maturation. (FIG. 3A) Schematic representation of human MN differentiation and its culture on supramolecular matrices. (FIG. 3B) Western blot and (FIG. 3C) normalized protein expression levels related to integrin activation (ITGB1), signal transduction pathway (ILK) and motor neurons maturation (ChAT) in MNs after 60 days cultured on supramolecular IKVAV matrices containing $V_2A_2$ (SEQ ID NO: 3), $A_2G_2$ (SEQ ID NO: 1), $VEVA_2$ (SEQ ID NO: 4) and Laminin. All values were normalized to actin. (FIG. 3D) Schematic of integrin and signal transduction pathways that mediate cellular behavior upon dynamic presentation of IKVAV containing $A_2G_2$ (SEQ ID NO: 1). All values were normalized to actin or total FAK expression. (FIG. 3E) Volcano plot displaying proteomic changes of MNs cultured on $A_2G_2$ vs. laminin. Average log 2 (fold change) versus P-value ($-\log_{10}$) is shown. Proteins up-regulated and down-regulated by 2-fold change and FDR<0.05 are labeled. (FIG. 3F) Subset of the most significant GO terms enriched in the up-regulated and down-regulated group of proteins identified in MN cultured in $A_2G_2$ vs. laminin coatings. (FIG. 3G) Cell viability assessed by LDH levels released in the cell media at day 60. (FIG. 3H) Quantification of ChAT$^+$ cells in MN cultured on IKVAV PAs containing $V_2A_2$ (SEQ ID NO: 3), $A_2G_2$ (SEQ ID NO: 1), $VEVA_2$ (SEQ ID NO: 4) and laminin matrices after 60 days. (FIGS. 3I-3J) Confocal microscopy images of human MNs cultured on (FIG. 3I) $A_2G_2$ and (FIG. 3J) laminin matrices. (FIG. 3K) Analysis of total neurite processes of human MNs cultured on IKVAV PAs containing $V_2A_2$ (SEQ ID NO: 3), $A_2G_2$ (SEQ ID NO: 1), $VEVA_2$ (SEQ ID NO: 4) and laminin matrices after 60 days. (FIG. 3L) Sholl analysis of dendritic arborization of MN cultured on $V_2A_2$, $A_2G_2$, and $VEVA_2$ (SEQ ID NO: 4) and laminin for 60 days in vitro. (FIG. 3M) Representative confocal micrographs of human MN cultured on IKVAV PAs containing $V_2A_2$ (SEQ ID NO: 3), $A_2G_2$ (SEQ ID NO: 1), $VEVA_2$ (SEQ ID NO: 4) and laminin matrices after 60 days. Cells were stained with the motor neuron marker ChAT, microtubule associated protein-2 (MAP-2, and nuclei (DAPI). (FIG. 3N) DAPI channel micrographs of images shown in FIG. 3M. (FIG. 3O) Histogram analysis of cell distribution on the different matrices referred in FIG. 3M and FIG. 3N. Scale bars: (FIGS. 3M-3N) 100 μm. The data are means of at least 3 independent differentiations. All the values are presented as the mean±SD; ANOVA (*P<0.05, P<0.01 and *P<0.001).

FIGS. 4A-4P. The effect of molecular dynamics within the supramolecular assemblies on functional maturation and regeneration. (FIGS. 4A-4B) Representative confocal micrographs of synaptic vesicles (post-synaptic PS95 and pre-synaptic SYN-1) distributed along the human MN neurites cultured on (FIG. 4A) $A_2G_2$ and (FIG. 4B) laminin matrices at day 50. (FIG. 4C) Intensity analysis of PSD95 and SYN-1 on MNs cultured on $A_2G_2$ and laminin coatings. (FIG. 4D) Western blot and (FIG. 4E) normalized protein levels of pre- and post-synaptic markers, SYN-1 and PS95 respectively in human MNs cultured on $A_2G_2$ and laminin. All values were normalized to actin. (FIG. 4F) Bright field image of human MNs cultured on an MEA plate coated with $A_2G_2$ supramolecular peptide amphiphile for 40 days. Plots representing (FIG. 4G) differences in number of spikes and (FIG. 4H) number of burst per electrode and (FIG. 4I) the synchrony index in MNs cultures in the various IKVAV PAs, laminin or in glial coatings. (FIG. 4J) 2-photon microscopy images of human MNs cultured on $A_2G_2$ and laminin matrices at day 48-49, and filled with Texas Red dextran through the patch electrode. (FIG. 4K) Percentage of neurons grown on $A_2G_2$ and laminin matrices that were capable of repetitively firing action potentials. (FIG. 4L) Representative examples of action potentials from MNs grown on $A_2G_2$ and laminin matrices. MNs grown on $A_2G_2$ had significantly larger amplitude, and faster rates of rise and fall (FIG. 4M) Schematic of dorsoventral contusion in mouse spinal cord. (FIG. 4N) Basso Mouse Scale (BMS) score of animals treated with saline solution (control), $V_2A_2$ and $A_2G_2$. (FIG. 4O) Western blot and (FIG. 4P) normalized protein levels of beta-1 integrin receptor (ITGB1), various ECM proteins (fibronectin and laminin), astroglial GFAP and neuronal GAP43 markers in spinal cords treated with saline solution (control), $V_2A_2$ and $A_2G_2$. All values were normalized to GAPDH. The in vivo data are means of at least 8 animals. All the values are presented as the mean±SD; ANOVA (*P<0.05, P<0.01 and *P<0.001).

FIGS. 5A-5F. MARTINI bead types and charges for (FIG. 5A) $V_2A_2$, (FIG. 5B) $A_2G_2$, (FIG. 5C) $VEVA_2$ and (FIG. 5D) $VE(-)VA_2$. (FIG. 5E) Charge content of the PAs. (FIG. 5F) Raw radial distribution function for each backbone bead of a $V_2A_2$ (inset) showing the region integrated to give the water contacts for the first solvation sphere.

(FIGS. 6A-6C) Analytical high-performance liquid chromatography (analytical HPLC) traces of purified (FIG. 6A) $C_{16}$-$V_2A_2E_4$GIKVAV (SEQ ID NO: 6), (FIG. 6B) $C_1$-$A_2G_2E_4$GIKVAV (SEQ ID NO: 7) (FIG. 6C) $C_1$-VEVA$_2$E$_4$GIKVAV (SEQ ID NO: 8). (FIGS. 6D-6F) Electrospray ionization mass spectrometry (ESI-MS) of (FIG. 6D) $C_1$-$V_2A_2E_4$-GIKVAV (SEQ ID NO: 6), (FIG. 6E) $C_{16}$-$A_2G_2E_4$GIKVAV (SEQ ID NO: 7), and (FIG. 6F) $C_1$-VEVA$_2$E$_4$GIKVAV (SEQ ID NO: 8).

FIGS. 7A-7I. Cryogenic-TEM and SEM images of IKVAV PAs. (FIGS. 7A-7C) Schematic molecular structures, (FIGS. 7D-7F) Cryogenic-TEM and (FIGS. 7G-7I) SEM micrographs of (FIGS. 7A, 7D, and 7G) $C_1$-$V_2A_2E_4$GIKVAV (SEQ ID NO: 6), (FIGS. 7B, 7E, and 7H) $C_{16}$-$A_2G_2E_4$GIKVAV (SEQ ID NO: 7) (FIGS. 7C, 7F, and 7I) $C_1$-VEVA$_2$E$_4$GIKVAV (SEQ ID NO: 8).

FIGS. 8A-8D. TEM images of DPH-embedded IKVAV PAs. (FIG. 8A) A schematic molecular structure of 1,6-diphenyl-1,3,5-hexatriene (DPH). (FIGS. 8B-8D) TEM micrographs of DPH-embedded PAs (FIG. 8B) $C_1$-$V_2A_2E_4$GIKVAV (SEQ ID NO: 6), (FIG. 8C) $C_{16}$-$A_2G_2E_4$GIKVAV (SEQ ID NO: 7) and (FIG. 8D) $C_1$-VEVA$_2$E$_4$GIKVAV (SEQ ID NO: 8) ([PA]=100 µM, [DPH]=2.8 µM in aqueous KCl and NaCl ([KCl]=3 mM, [NaCl]150 mM)), stained with uranyl acetate.

FIGS. 9A-9F. TEM images of TMA-DPH-embedded IKVAV PAs. (FIG. 9A) Schematic molecular structure of 1-(4-trimethylammoniumphenyl)-6-phenyl-1,3,5-hexatriene p-toluenesulfonate (TMA-DPH). (FIGS. 9B-9D) TEM micrographs of TMA-DPH-embedded PAs (FIG. 9B) $C_{16}V_2A_2E_4$GIKVAV (SEQ ID NO: 6) ($V_2A_2$), (FIG. 9C) $C_{16}A_2G_2E_4$GIKVAV (SEQ ID NO: 7) ($A_2G_2$) and (FIG. 9D) $C_{16}$VEVA$_2$GIKVAV (SEQ ID NO: 8) (VEVA$_2$) ([PA]=100 µM, [TMA-DPH]=2.8 µM in aqueous KCl and NaCl ([KCl]=3 mM, [NaCl]=150 mM)), stained with uranyl acetate. (FIG. 9E) Fluorescent depolarization profiles ($\lambda_{ex}$=336 nm, $\lambda_{em}$=450 nm) at 25° C. of TMA-DPH (2.8 µM), embedded in $V_2A_2$, $A_2G_2$, and VEVA$_2$ in aqueous KCl and NaCl ([PA]=100 µM, [KCl]=3 mM, [NaCl]=150 mM). (FIG. 9F) Fluorescence emission spectra ($\lambda_{ex}$=336 nm) at 25° C. of TMA-DPH (2.8 µM), embedded in $V_2A_2$, $A_2G_2$ and VEVA$_2$ in aqueous KCl and NaCl ([PA]=100 µM, [KCl]=3 mM, [NaCl]=150 mM).

(FIGS. 11A-11C) Self-assembled structures and coarse-grained representation of single fibers of (FIG. 11A) $V_2A_2$, (FIG. 11B) $A_2G_2$, and (FIG. 11C) VEVA$_2$ IKVAV PAs after 10 µs. The fibers are represented with all transparent but the $C_{16}$ tail to show the patchy core. The micrographs include partial periodic images through the fiber formation axis. The simulation box is shown. Water and ions are omitted for clarity. (FIGS. 11D-11F) Graphs representing the root mean square deviation (RMSD) vs. time of (FIG. 11D) $V_2A_2$, (e) $A_2G_2$ and (FIG. 11F) VEVA$_2$. The RMSD plots are the average of 5 independent simulations.

FIGS. 12A-12E. Simulations results of VE(−)VA$_2$ PA charged on the E placed of the β-sheet region. (FIGS. 12A-12B) Self-assembled structures of VE(−)VA$_2$ fibers after 10 ps. (FIG. 12A) The β-sheet region is represented in orange, the IKVAV in green and the rest of the fiber in black. (FIG. 12B) The fiber is represented with all transparent but the $C_{16}$ tail to show the patchy core. Micrographs include partial periodic images through the fiber formation axis. The simulation box is shown. Water and ions are omitted for clarity. (FIG. 12C) Water contact graph of VE(−)VA$_2$ compared to $V_2A_2$, $A_2G_2$, VEVA$_2$. (FIG. 12D) Graph representing the root mean square deviation (RMSD) vs. time of (FIGS. 12A-12B) Dynamism analysis of VE(−)VA$_2$ compared to $V_2A_2$, $A_2G_2$, VEVA$_2$. The analysis in FIGS. 12C-12D are the result of 5 independent simulations.

(FIGS. 13A-13C) Analytical high-performance liquid chromatography (analytical HPLC) traces of purified (FIG. 13A) $C_1$-$V_2A_2E_4$-GVKIVA (SEQ ID NO: 13), (FIG. 13B) $C_{16}A_2G_2E_4$GVKIVA (SEQ ID NO: 14) (FIG. 13C) $C_1$-VEVA$_2$E$_4$GVKIVA (SEQ ID NO: 15). (FIGS. 13D-13F) Electrospray ionization mass spectrometry (ESI-MS) of (FIG. 13D) $C_{16}$-$V_2A_2E_4$-GIKVAV (SEQ ID NO: 13), (FIG. 13E) $C_{16}A_2G_2E_4$GVKIVA (SEQ ID No: 14), and (FIG. 13F) $C_{16}$VEVA$_2$E$_4$GVKIVA (SEQ ID NO: 15).

FIGS. 14A-14F. Simulations results of scramble VKIVA-PAs. (FIGS. 14A-14F) Self-assembled structures and coarse-grained representation of single fibers of (FIGS. 14A-14B) $V_2A_2$, (FIGS. 14C-14D) $A_2G_2$, and (FIGS. 14E-14F) VEVA$_2$ VKIVA after 10 psec. The color code is shown in the PA sequence. The micrographs include partial periodic images through the fiber formation axis. The simulation box is shown. Water and ions are omitted for clarity. (FIGS. 14B, 14D, and 14F) The fibers are shown with all transparent but the $C_{16}$ tail to show its patchy nature. $A_2G_2$ equilibrated structure differs from typical fiber structure. (FIG. 14G) water contact graph of IKVAV and VKIVA-PAs. (FIG. 14H) $C_{16}$ cluster analysis of scramble VKIVA and IKVAV PAs. The quantification of the number of $C_{16}$ clusters has been used as a qualitative measure of disorder.

FIGS. 15A-15F. Cryo-TEM micrographs of scramble VKIVA-PAs. (FIGS. 15A-15C) Schematic molecular structures and (FIGS. 15D-15F) Cryo-TEM micrographs of scramble IKVAV sequences (FIGS. 15A and 15D) $C_1$-$V_2A_2E_4$GVKIVA (SEQ ID NO: 13), (FIGS. 15B and 15E) $C_{16}A_2G_2E_4$GVKIVA (SEQ ID NO: 14) (FIGS. 15C and 15F) $C_{16}$VEVA$_2$E$_4$GVKIVA (SEQ ID NO: 15). Scale bar: 500 nm FIGS. 16A-16F. Liquid chromatography-mass spectrometry of backbone PAs.

FIGS. 17A-17F. Cryo-TEM micrographs of Backbone-PAs. (FIGS. 17A-17C) Schematic molecular structures and (FIGS. 17D-17F) Cryo-TEM micrographs of backbone sequences (FIGS. 17A and 17D) $C_{16}V_2A_2E_4$ (SEQ ID NO: 9), (FIGS. 17B and 17E) $C_{16}A_2G_2E_4$ (SEQ ID NO: 10) (FIGS. 17C and 17F) $C_{16}$VEVA$_2$E$_4$ (SEQ ID NO: 11).

FIGS. 18A-18K. Analysis of other laminin mimetic sequences. (FIGS. 18A, 18C, 18E, 18G, and 18I) Cryogenic TEM micrographs and (FIGS. 18B, 18D, 18F, 18H, and 18J) Self-assembled structure micrographs of $C_{16}A_2G_2E_4$G (SEQ ID NO: 16) fibers with the bioactive epitope (FIGS. 18A-18B) LGTIPG (SEQ ID NO: 17), (FIGS. 18C-18D) LRGDN (SEQ ID NO: 18), (FIGS. 18E-18F) PDGSR (SEQ ID NO: 19), (FIGS. 18G-18H) RGD, (FIGS. 18I-18J) YIGSR (SEQ ID NO: 20) sequences after 10 psec. The simulated micrographs include partial periodic images through the fiber formation axis. The simulation box is shown. Water and ions are omitted for clarity. (FIG. 18K) Water contacts analysis for LGTIPG (SEQ ID NO: 17), LRGDN (SEQ ID NO: 18), PDGSR (SEQ ID NO: 19), RGD, YIGSR (SEQ ID NO: 20) sequences. IKVAV was used as a reference.

FIGS. 19A-19I. Short-term analysis of hiPSC-derived MNs on IKVAV PA matrices (72 h). (FIG. 19A) Schematic representation of the experimental paradigm. (FIG. 19B) Spectral illumination microscopy micrograph of a MN labeled with TUJ-1 on $A_2G_2$ IKVAV PA covalently linked to alexa-488 dye after 72 h. (FIG. 19C) Quantification of number of cells/mm² in the various conditions at 72 h. (FIGS. 19D-19E) Representative confocal micrographs of MNs cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin coatings at 72 h. (FIGS. 19D-19E) Cells were consistently stained with neuronal (TUJ-1 and MAP-2, in red) and motor neurons (ISL1/2 and ChAT, in green) markers. Nuclear DNA was stained with DAPI. (FIGS. 19F-19H) Quantification of (FIG. 19F) ISL1/$2^+$ and (FIG. 19G) ChAT$^+$ (FIG. 19H) TUJ-1$^+$ MN percentages cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin (black) coatings at 72 h. (FIG. 19I) Cell viability assessed by LDH assay at 72 h. Scale bars: 50 μm. The data are means of at least 4 independent differentiations. All the values are presented as the mean±SD; ANOVA (*P<0.05, P<0.01 and *P<0.001), n.s: not significant.

FIGS. 20A-20I. Short-term analysis of FOXA2 population on IKVAV PA matrices. (FIGS. 20A-20B) Representative confocal micrographs of MNs cultured on (FIG. 20A) $A_2G_2$ IKVAV PA and (FIG. 20B) laminin matrices at 72 h. Cells were stained with the floor plate marker FOXA-2, neuronal marker TUJ-1 and nuclei marker DAPI. (FIG. 20C) Western blot and (FIG. 20D) normalized levels of protein expression related to floor plate marker FOXA-2 and the proliferative marker PH3 in MNs cultured on IKVAV PAs containing $V_2A_2$, $A_2G_2$, $VEVA_2$ supramolecular fibers and laminin (black) at 72 h. (FIGS. 20E-20F) Representative confocal micrographs of MNs culture cultured on (FIG. 20E) $A_2G_2$ IKVAV PA and (FIG. 20F) laminin matrices at 72 h. Cells were stained with the floor plate marker FOXA-2, neuronal marker TUJ-1, proliferative marker KI67 and nuclei marker DAPI. (FIGS. 20G-20I) Quantification of (FIG. 20G) FOXA2$^+$, (FIG. 20H) KI67$^+$ and (FIG. 20I) FOXA2$^+$/KI67$^+$ MN percentages cultured on IKVAV PAs containing $V_2A_2$, $A_2G_2$, $VEVA_2$ supramolecular fibers and laminin matrices at 72 h. All values were normalized to actin. Scale bars: 25 μm. The data are means of at least 3 independent differentiations. All the values are presented as the mean±SD; ANOVA (*P<0.05, P<0.01 and *P<0.001).

FIGS. 21A-21G. ITGB1 expression in human MNs cultured on IKVAV PAs. (FIGS. 21A-21D) Representative three-dimensional confocal micrographs of the expression of ITGB1 receptor in neurites of MNs (labeled with TUJ-1 in green) cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin coatings at 72 h. (FIGS. 21F-21G) Three-dimensional shadow reconstructions of confocal images conditions referred in FIGS. 21C and 21D. (FIG. 21E) Intensity analysis of ITGB1 in MNs cultured on $V_2A_2$ and $VEVA_2$ matrices at 72 h. Scale bar: 2 μm.

FIGS. 22A-22F. Effect of αITGB1-blocking antibody on attachment and survival MNs on IKVAV PAs. (FIG. 22A) Schematic of hiPSC-derived MN differentiation and subsequent culture on supramolecular matrices in the presence of αbeta-1 or beta-4 ITG antibodies for 72 h. (FIG. 22B) Cell viability of MNs treated with ITGB1 assessed by LDH levels released in the cell media at 72 h. (FIGS. 22C-22D) Representative confocal micrographs of MNs treated with (FIG. 22C) beta-1 integrin- or (FIG. 22D) beta-4 integrin-blocking antibody cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin (black) matrices during 72 h. Cells were stained with neuronal markers TUJ-1, motor neuronal marker ISL1/2 and nuclei were stained with DAPI. (FIGS. 22E-22F) Quantification of number of cells/mm² of conditions referred in FIGS. 22C and 22D respectively. Scale bars: 50 μm. The data are means of 3 independent differentiations. All the values are presented as the mean±SD; ANOVA (*P<0.05, P<0.01 and *P<0.001), n.s: not significant.

FIGS. 23A-23F. Effect of mechanical properties on laminin-associated signaling. (FIG. 23A) Schematic representation of hiPSC-derived MN differentiation and its culture on different supramolecular matrices thickness. (FIG. 23B) Elastic modulus (grey and white graphs) and Storage modulus (dark grey graph) of thin coatings and thick gels of supramolecular IKVAV matrices containing $V_2A_2$ (SEQ ID NO: 3), $A_2G_2$ (SEQ ID NO: 1), and $VEVA_2$ (SEQ ID NO: 4). (FIGS. 23C and 23E) Western blot analysis and (FIGS. 23D-23F) normalized expression levels of ITGB1 receptor activation and signal transduction pathways (ILK, p-FAK, FAK) in human MN cultured on (FIGS. 23C-23D) thin coatings or (FIGS. 23E-23F) thick coatings of supramolecular IKVAV matrices containing $V_2A_2$ (SEQ ID NO: 3), $A_2G_2$ (SEQ ID NO: 1), $VEVA_2$ (SEQ ID NO: 4) at 72 h. Coatings of laminin were used as controls. The data are means of at least 3 independent experiments or differentiations. All the values are presented as the mean±SD; ANOVA (*P<0.05, P<0.01 and *P<0.001).

FIGS. 24A-24I. Profilometry of IKVAV PAs and laminin coatings. (FIGS. 24A-24H) Representative images of IKVAV PA containing (FIGS. 24A-24B) $V_2A_2$ (SEQ ID NO: 3), (FIGS. 24C-24D) $A_2G_2$ (SEQ ID NO: 1), (FIGS. 24E-24F) $VEVA_2$ (SEQ ID NO: 4) and (FIGS. 24G-24H) laminin coatings after 3 (top image) and 60 days in vitro (bottom image). (FIG. 24I) Thickness analysis of IKVAV PA and laminin coatings referred in FIGS. 24A-24H. The data are means of 4 independent experiments. All the values are presented as mean±SD; ANOVA (***P<0.001).

FIGS. 25A-25L. FM characterization of thin and thick IKVAV PA gels. (FIGS. 25A-25C) AFM topography images of thin coatings of IKVAV PAs containing (FIG. 25A) $V_2A_2$ (SEQ ID NO: 3), (FIG. 25B) $A_2G_2$ (SEQ ID NO: 1), and FIG. 25C) $VEVA_2$ (SEQ ID NO: 4); (FIGS. 25D-25F) Elastic modulus distributions of thin coatings derived from a-c; (FIGS. 25G-25I) Optical microscopy images of thick gels of IKVAV PAs containing $V_2A_2$, $A_2G_2$ and $VEVA_2$ indentations experiments; (FIGS. 25J-25L) Elastic modulus distributions of thick gels of conditions referred in FIGS. 25G-25I.

FIGS. 26A-26F. Rheological measurements of IKVAV PA gels. (FIGS. 26A-26C) Strain sweep showing the storage modulus, G', and loss modulus, G", at shear strain ranging from 0-100 of supramolecular IKVAV PAs containing (FIG. 26A) $V_2A_2$ (SEQ ID NO: 3), (FIG. 26B) $A_2G_2$ (SEQ ID NO: 1), and (FIG. 26C) $VEVA_2$ (SEQ ID NO: 4). (FIGS. 26D-26F) Frequency sweep showing the storage modulus, G', for angular frequencies ranging from 0-100 rad/s of conditions referred in FIGS. 26A-26C. The data are means of n=3 gels. All the values are presented as the mean±SD.

FIGS. 27A-27C. Time course of human MNs cultured on IKVAV PA matrices. Representative confocal micrographs of MNs cultured on IKVAV PAs containing $V_2A_2$, $A_2G_2$, $VEVA_2$ supramolecular fibers and laminin (black) matrices at (FIG. 27A) 30, (FIG. 27B) 45 and (FIG. 27C) 60 days in vitro. Cells were stained with the neuronal marker MAP-2, the motor neuron marker ChAT, and nuclei were stained with DAPI. Scale bars: 100 µm.

(FIGS. 28A, 28C, and 28E) Representative bright field images and (FIGS. 28B, 28D, and 28F) confocal micrographs of MNs cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin matrices at (FIGS. 28A-28B) 30, (FIGS. 28C-28D) 45 and (FIGS. 28E-28F) 60 days in vitro. Cells were stained with neuronal marker MAP-2, motor neuronal marker ChAT and nuclei were stained with DAPI. Scale bars: 25 µm. The data are means of 6 independent differentiations.

FIGS. 29A-29D. Characterization of human MNs on IKVAV PA at different time points. (FIGS. 29A and 29C) Western blot analysis and (FIGS. 29B and 29D) normalized protein levels of (FIGS. 29A-29B) ITGB1 receptor activation, motor neuronal marker ChAT and ISL1/2 and (ILK-1) and (FIGS. 29C-29D) neuronal markers MAP-2 and TUJ-1 in human MN cultured on supramolecular IKVAV matrices containing $V_2A_2$ (SEQ ID NO: 3), $A_2G_2$ (SEQ ID NO: 1), $VEVA_2$ (SEQ ID NO: 4). The data are means of at least 3 independent differentiations. All the values are presented as the mean±SD; ANOVA (*$P<0.05$, $P<0.01$ and *$P<0.001$), n.s: not significant.

FIGS. 30A-30C. Differential ITGB1 expression in human MNs cultured on $A_2G_2$ IKVAV PA and laminin. (FIGS. 30A-30B) Representative three-dimensional SIM micrographs of MNs neurites (TUJ-1, green) and ITGB1 receptor expression cultured on (FIG. 30A) $A_2G_2$ and (FIG. 30B) laminin matrices at 60 days. (FIG. 30C) Intensity analysis of ITGB1 in MNs cultured on $A_2G_2$ and laminin matrices at 60 days in vitro. Scale bar: 10 µm.

(FIG. 31A) From the differentially expressed proteins in $A_2G_2$ condition, 21 out of the 58 (36%) GO terms associated with maturation of human MNs were identified. MN maturation related terms were also identified from the list of proteins that were upregulated (FIG. 31B) and downregulated (FIG. 31C) in cultures plated on A2G2 IKVAV PA vs. laminin coated surfaces. Horizontal bar plots display the p-values of the MN maturation related GO terms identified in the protein data set. Pie charts represent the percentage of GO terms obtained in this study compared to the previously described GO terms associated with MN maturation (Ho et al., 2016).

FIGS. 32A-32C. Morphometric analysis of human motor neurons (MNs) on IKVAV PAs matrices. (FIGS. 32A-32B) Representative confocal micrographs of single human MNs cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin matrices at 60 days in vitro with (FIG. 32A) neuronal marker MAP-2. (FIGS. 32B-32C) Analysis of (FIG. 32B) soma size and (FIG. 32C) number of primary neurites of MNs cultures at day 60. Scale bars: 25 µm. The data are means of at least 3 independent differentiations. All the values are presented as the mean±SD; ANOVA (*$P<0.05$, $P<0.01$ and *$P<0.001$).

FIGS. 33A-33D. IKVAV PAs coatings after 60 days in vitro. (FIGS. 33A-33B) Representative structural illumination microscopy (SIM) micrographs of human MNs cultured on IKVAV PAs containing $V_2A_2$ (SEQ ID NO: 3), $A_2G_2$ (SEQ ID NO: 1), $VEVA_2$ (SEQ ID NO: 4). MNs were stained with TUJ-1 and IKVAV PAs were covalently linked with alexa-488 dye. (FIGS. 33C-33D) Scanning electron micrographs displaying the neurites of MNs cultured on IKVAV PA containing $A_2G_2$. Scale bar: (FIG. 33C) 5 µm, (FIG. 33D) 2 µm.

FIGS. 34A-34C. Synthesis and Liquid chromatography-mass spectrometry of IKVAV peptide for modification of a glass coverslip. (FIG. 34A) Schematic molecular structure of IKVAV peptide. (FIG. 34B) Analytical high-performance liquid chromatography (analytical HPLC) trace of purified IKVAV peptide. (FIG. 34C) Electrospray ionization mass spectrometry (ESI-MS) of IKVAV peptide.

FIGS. 35A-35E. Effect of immobilized IKVAV on MNs attachment. (FIG. 35A) Schematic representation of immobilized IKVAV peptide on coverslip surfaces. (FIG. 35B) Bright field images (FIGS. 35C-35D) representative confocal micrographs of MNs cultured on APTES and IKVAV peptide coatings. Cells were stained with neuronal markers (FIG. 35C) ISL1/2 and TUJ-1 (and (FIG. 35D) ChAT and MAP-2. Nuclei were stained with DAPI. (FIG. 35E) Quantification of number of cells per $mm^2$ cultured on APTES and immobilized peptide (IKVAV). IKVAV PAs containing $V_2A_2$ (SEQ ID NO: 3), $A_2G_2$ (SEQ ID NO: 1), $VEVA_2$ (SEQ ID NO: 4) and laminin matrices were used as controls. Scale bars: 100 µm. The data are means of 3 independent differentiations. All the values are presented as the mean±SD; ANOVA (*$P<0.05$, $P<0.01$ and *$P<0.001$).

FIGS. 36A-36C. Human MNs attachment on scramble VKIVA PAs. (FIG. 36A) Representative bright field images and (FIG. 36B) confocal images of MNs cultured on scramble VKIVA PAs sequence containing $V_2A_2$ (SEQ ID NO: 3), $A_2G_2$ (SEQ ID NO: 1), and $VEVA_2$ (SEQ ID NO: 4). Cells were stained with ChAT, MAP-2 and DAPI in FIG. 36B. (FIG. 36C) Quantification of number of cells per $mm^2$ cultured of conditions referred in FIGS. 36A-36B. IKVAV PAs containing $V_2A_2$ (SEQ ID NO: 3), $A_2G_2$ (SEQ ID NO: 1), $VEVA_2$ (SEQ ID NO: 4) and laminin matrices were used as controls. Scale bars: 100 µm. The data are means of 3 independent differentiations. All the values are presented as the mean±SD; ANOVA (*$P<0.05$, $P<0.01$ and *$P<0.001$).

FIGS. 37A-37O. Effect of IKVAV PAs on other human iPSC-derived motor neurons (11a cell line). (FIGS. 37A-37B) Representative micrographs of MNs-11a cultured on $V_2A_2$, $A_2G_2$, $VEVA_2$ IKVAV PA supramolecular fibers and laminin matrices for 72 h. Cells were stained with the neuronal and motor neuronal markers TUJ-1 and ISL1/2 in (FIG. 37A); (FIG. 37B) MAP-2 and ChAT respectively. Nuclei were stained with DAPI. (FIG. 37C) Quantification of number of cells per $mm^2$ at 72 h. (FIGS. 37C-37F) Quantification of (FIG. 37C) TUJ-1$^+$, (FIG. 37D) ISL1/2$^+$ (FIG. 37F) ChAT$^+$ MN percentages cultured on IKVAV PAs containing $V_2A_2$ (SEQ ID NO: 3), $A_2G_2$ (SEQ ID NO: 1), $VEVA_2$ (SEQ ID NO: 4) supramolecular fibers and laminin coatings at 72 h. (FIG. 37G) Representative confocal micrographs of human MN11a cultured on IKVAV PAs containing $V_2A_2$, $A_2G_2$, $VEVA_2$ and laminin matrices at 60 days. Cells were stained with the MN marker ChAT, microtubule associated protein-2 (MAP-2) and nuclei (DAPI). (FIG. 37H)

DAPI channel micrographs of images shown in FIG. 37G. (FIG. 37I) Histogram analysis of cell distribution on the different matrices referred in FIGS. 37G-37H. (FIG. 37J) Quantification of number of cells per mm$^2$ at 60 days and (FIG. 37K) Quantification of ChAT$^+$ MN percentages cultured on IKVAV PAs containing $V_2A_2$ (SEQ ID NO: 3), $A_2G_2$ (SEQ ID NO: 1), VEVA$_2$ (SEQ ID NO: 4) supramolecular fibers and laminin (black) coatings at 60 days. (FIGS. 37L-37M) Scanning electron microscopy (SEM) micrographs of MNs cultured on (FIG. 37L) IKVAV PA containing $A_2G_2$ (SEQ ID NO: 1) and (FIG. 37M) laminin. (FIG. 37N) Western blot and (FIG. 37O) normalized protein levels of ITGB1 receptor activation, neuronal marker MAP-2 and motor neuronal marker ChAT. All values were normalized to actin. The data are means of 3 independent differentiations Scale bar: (FIGS. 37A-37B) 50 µm, (FIGS. 37G-37H) 100 µm, (FIGS. 37L-37M) 5 µm. The data are means of 3 independent differentiations. All the values are presented as the mean±SD; ANOVA (*P<0.05, P<0.01 and *P<0.001).

FIGS. 38A-38L. Effect of IKVAV PAs on human iPSC-derived cortical neurons (C×N). (FIG. 38A) Schematic representation of hiPSC-derived C×N differentiation and its culture on supramolecular matrices (FIGS. 38B-38D) Representative micrographs of C×N cultured on $V_2A_2$, $A_2G_2$, VEVA$_2$ IKVAV PA supramolecular fibers and laminin matrices at (FIG. 38B) 72 h and (FIGS. 38C-38D) 60 days. Cells were stained with the neuronal markers TUJ-1, MAP-2 and NEUN, and the cortical marker SATB-2. Nuclei were stained with DAPI. (FIG. 38E) Quantification of number of cells per mm$^2$ at 72 h. (FIG. 38F) Cell viability assessed by release of LDH in the cell media at day 60. (FIGS. 38AG-38J) Quantification of (FIG. 38G) TUJ-1$^+$, (FIG. 38H) MAP2$^+$, (FIG. 38I) NEUN$^+$ and (FIG. 38J) SATB-2$^+$ neurons percentages cultured on IKVAV PAs containing $V_2A_2$ (SEQ ID NO: 3), $A_2G_2$ (SEQ ID NO: 1), VEVA$_2$ (SEQ ID NO: 4) supramolecular fibers and laminin (black) coatings at 60 days. (FIG. 38K) Western blot and (FIG. 38L) normalized protein levels of ITGB1 receptor activation, neuronal marker MAP-2, TUJ-1 and NEUN and the presynaptic marker SYP. All values were normalized to actin. The data are means of 3 independent differentiations Scale bar: (FIG. 38B) 100 µm, (FIGS. 38C-38D) 50 µm. The data are means of 3 independent differentiations. All the values are presented as the mean±SD; ANOVA (*P<0.05, P<0.01 and *P<0.001)

FIGS. 39A-F. Expression of functional markers in human motor neurons (MNs) cultured on $V_2A_2$ and VEVA$_2$ IKVAV PA. (FIGS. 39A-B) Representative confocal micrographs of synaptic vesicles (SYN-1, pre-synaptic, and PS95, post-synaptic) distributed along the neurites of MNs cultured on (FIG. 39A) IKVAV containing $A_2G_2$ (SEQ ID NO: 1) and (FIG. 39B) laminin matrices after 40 days in vitro. (FIGS. 39C-D) Mean intensity analysis of (FIG. 39C) PSD95 and (FIG. 39D) SYN-1 in MNs cultured on $V_2A_2$ and VEVA$_2$. (FIG. 39E) Western blot analysis and (FIG. 39F) normalized protein levels of synaptic marker PSD95, SYN-1 and SYP, and the neuronal marker DCX in human MN cultured on supramolecular IKVAV matrices containing $V_2A_2$ (SEQ ID NO: 3), $A_2G_2$ (SEQ ID NO: 1), VEVA$_2$ (SEQ ID NO: 4) and laminin coatings. Scale bar: The data are means of at least 3 independent differentiations. All the values are presented as the mean±SD; ANOVA (*P<0.05, P<0.01 and *P<0.001).

FIGS. 40A-40F. Electrophysiological study of human MNs cultured on IKVAV PAs. (FIG. 40A) Schematic of multi-electrode array plates (MEA plates) for neural cultures recordings. (FIGS. 40B-40V) Schematic of neurons plated on MEA plate coated with (FIG. 40B) IKVAV PA and (FIG. 40C) laminin. (FIG. 40D) Bright field images of MNs cultured on MEA plates coated with IKVAV PAs containing $V_2A_2$ (SEQ ID NO: 3), $A_2G_2$ (SEQ ID NO: 1), VEVA$_2$ (SEQ ID NO: 4) and laminin. (FIG. 40E) Weighted Mean firing rate and (FIG. 40F) number of bursting electrodes on the same conditions referred in FIG. 40D. Scale bar: 100 µm. The data are means of 2 independent differentiations. All the values are presented as the mean±SD; ANOVA (*P<0.05, P<0.01 and *P<0.001).

(FIG. 41A) Schematic of spinal cord injury in T10/11 in mouse model. (FIG. 41B) Impact force graph of animals treated with $V_2A_2$, $A_2G_2$, $V_2A_2E_2$ and saline solution (control). (FIG. 41C) Basso Mouse Scale (BMS) of the conditions mentioned in (FIG. 41B).

DEFINITIONS

Figure 1A:
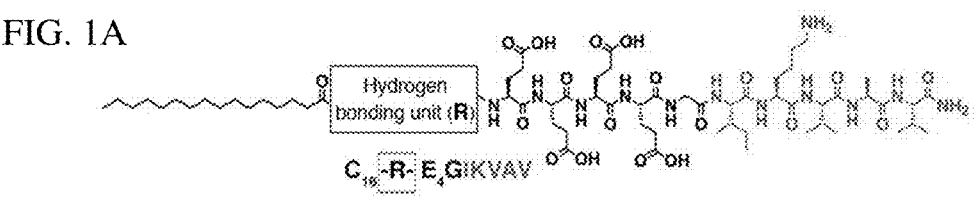
FIGS. 1A-1L. Characterization of supramolecular nanofibers formed by peptide amphiphiles (PAs).
Figure 1B:
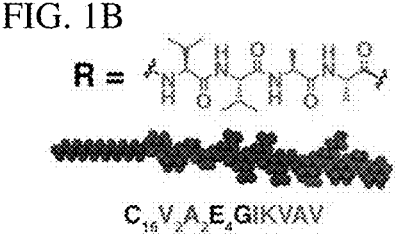
Figure 1C:
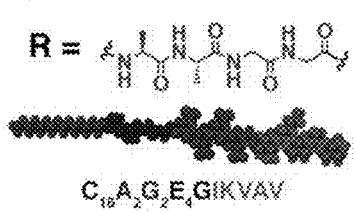
Figure 1D:
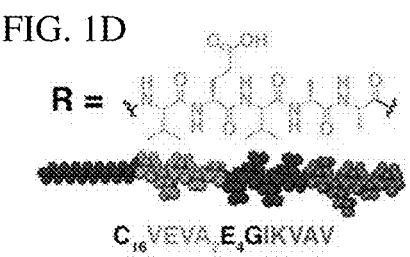
Figure 1E:
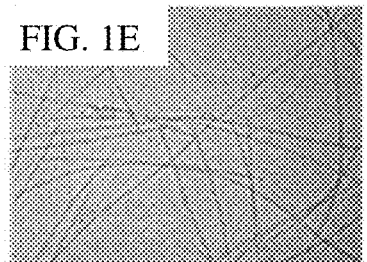
Figure 1H:
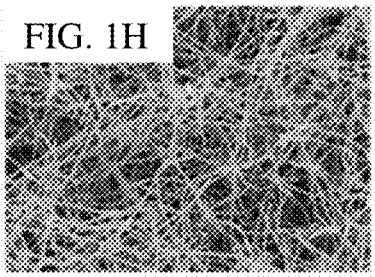
Figure 1F:
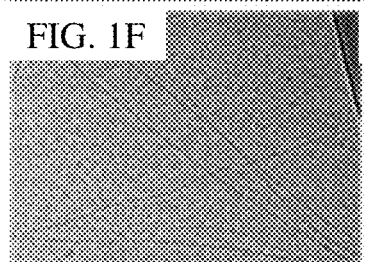
Figure 1I:
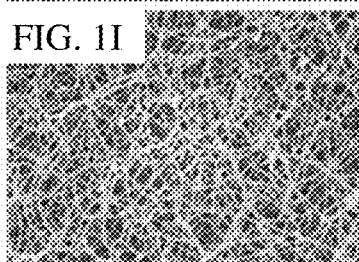
Figure 1G:
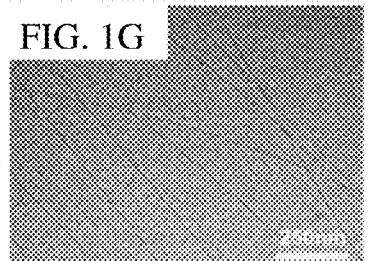
Figure 1J:
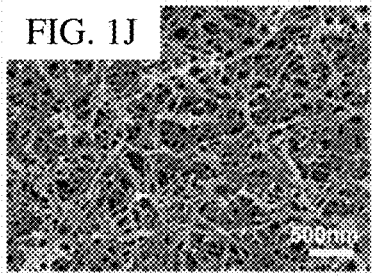
Figure 1L:
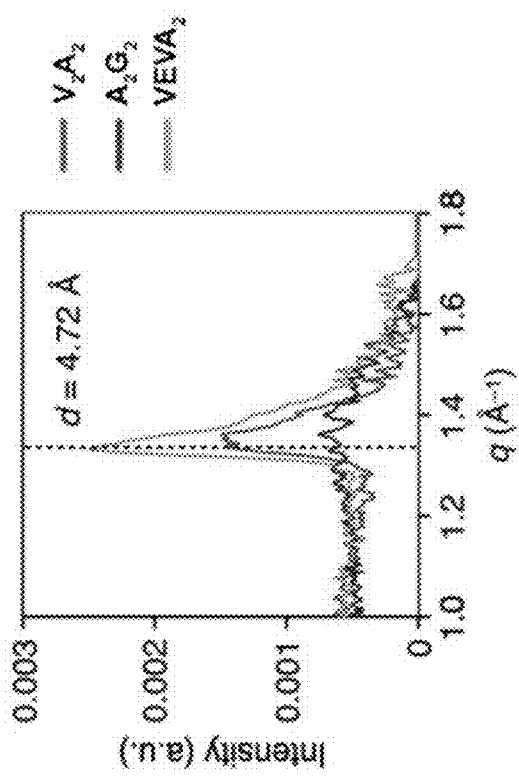
Figure 1K:
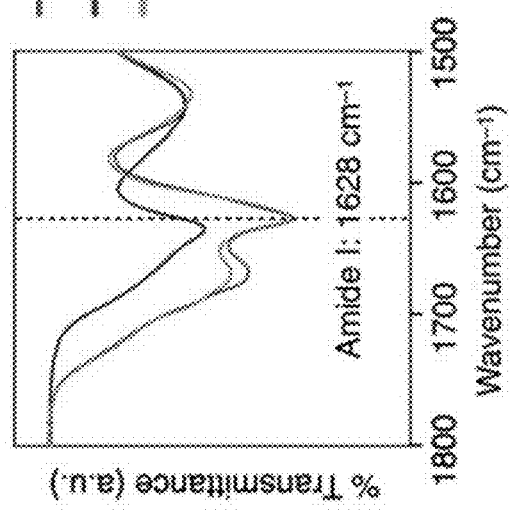
Figure 6A:
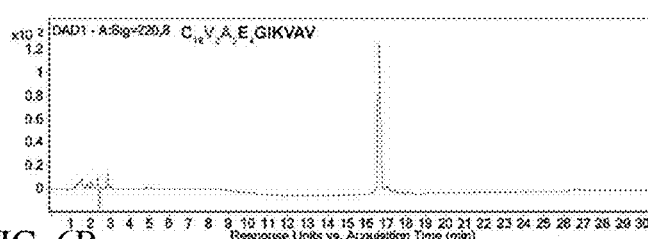
FIGS. 6A-6F. Liquid chromatography-mass spectrometry of IKVAV PAs.
Figure 6B:
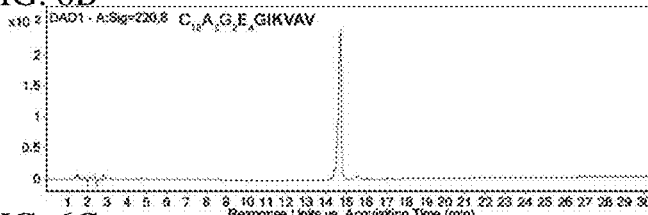
Figure 6C:
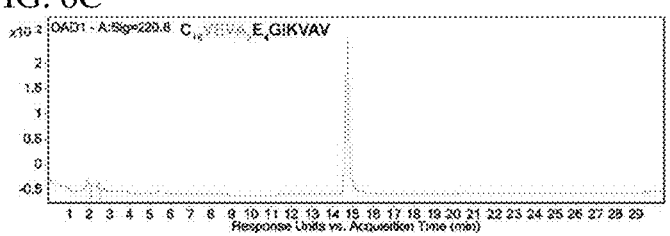
Figure 6D:
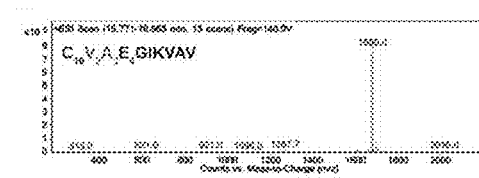
Figure 6E:
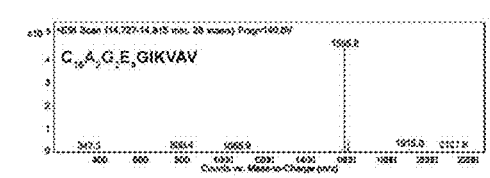
Figure 6F:
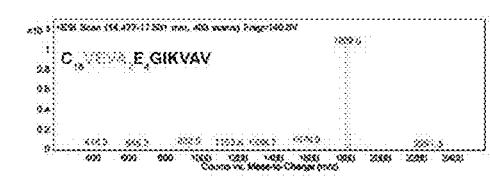
Figure 10:
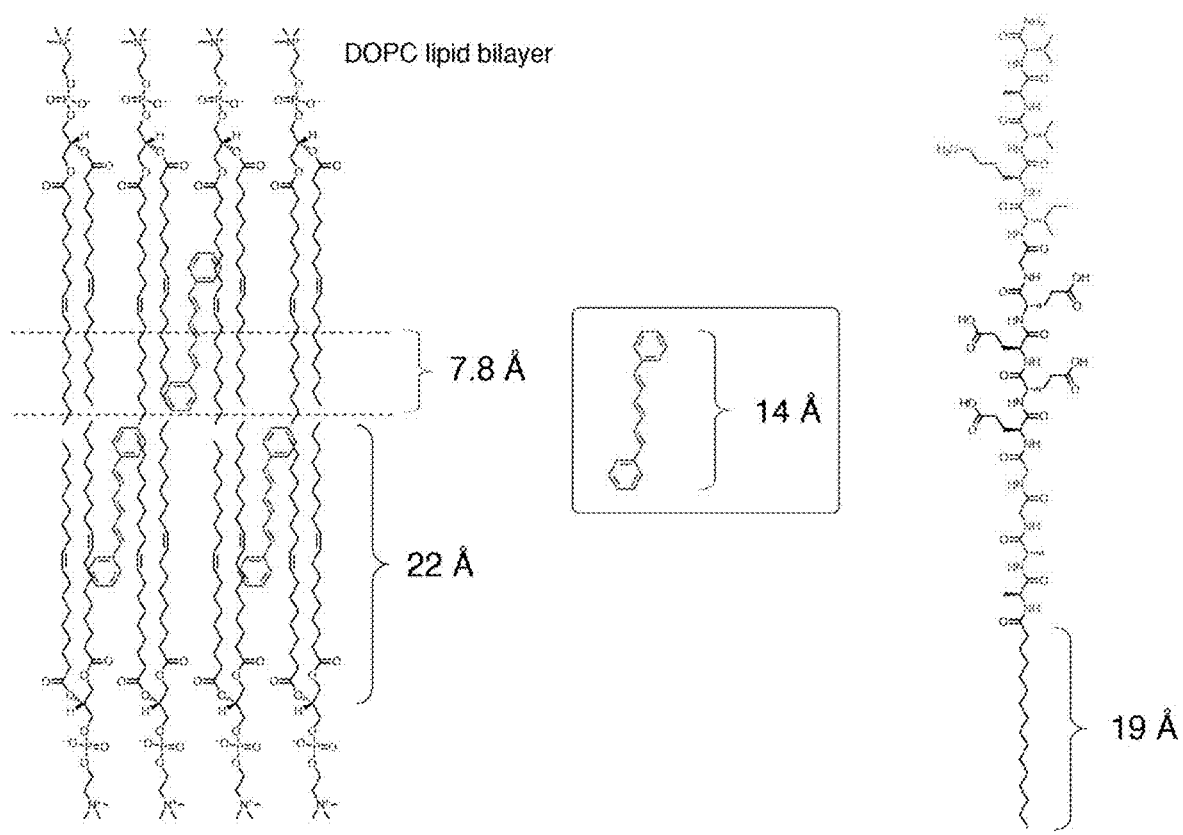
FIG. 10. DPH position into the hydrocarbon tails within the lipid bilayer.
Figure 11A:
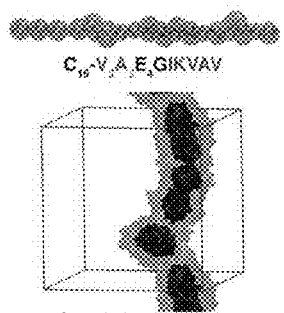
FIGS. 11A-11F. Simulations results of IKVAV PA nanofibers.
Figure 11B:
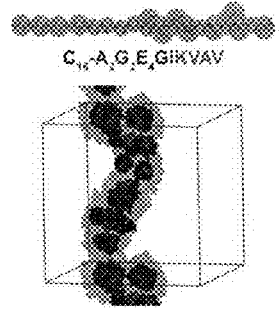
Figure 11C:
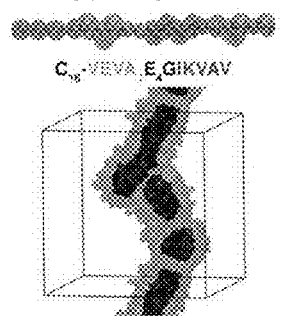
Figure 11D:
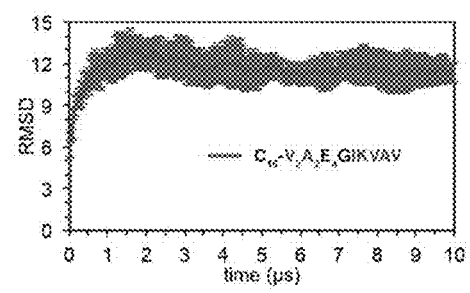
Figure 11E:
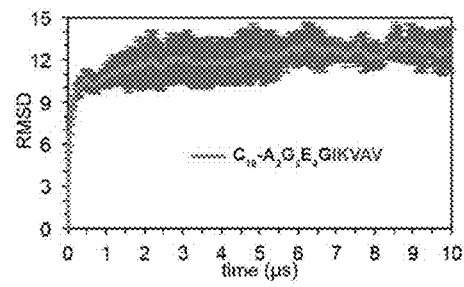
Figure 11F:
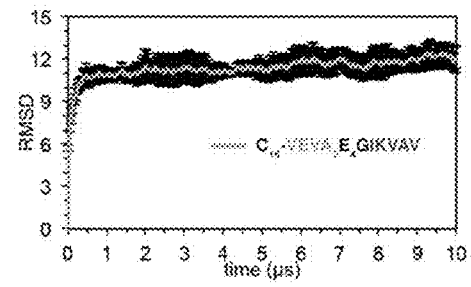
Figure 13A:
FIGS. 13A-13F. Liquid chromatography-mass spectrometry of scramble VKIVA PAs.
Figure 13B:
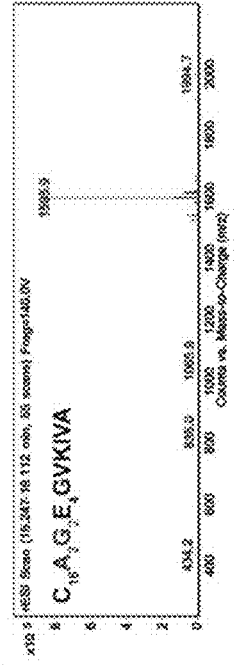
Figure 13C:
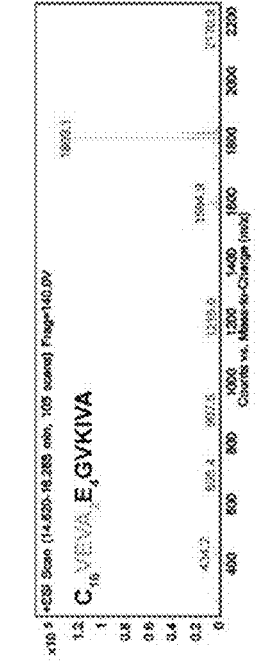
Figure 13D:
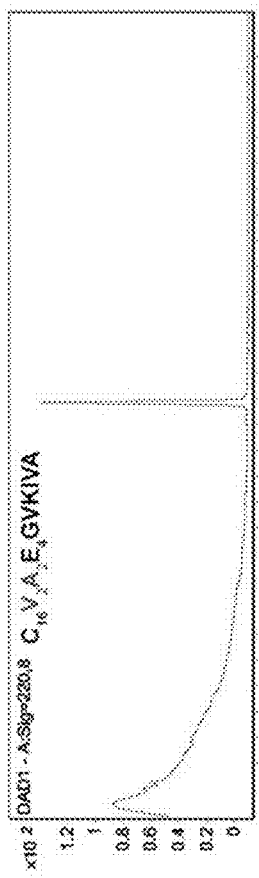
Figure 13E:
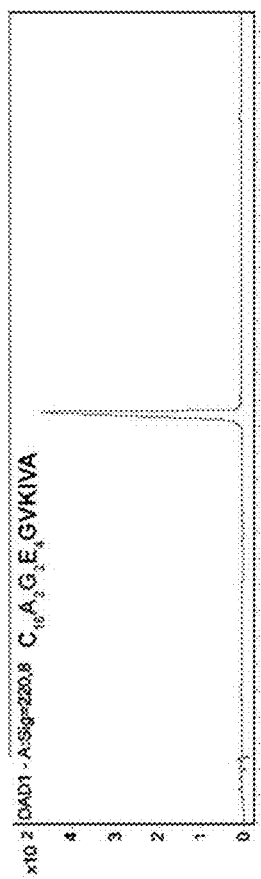
Figure 13F:
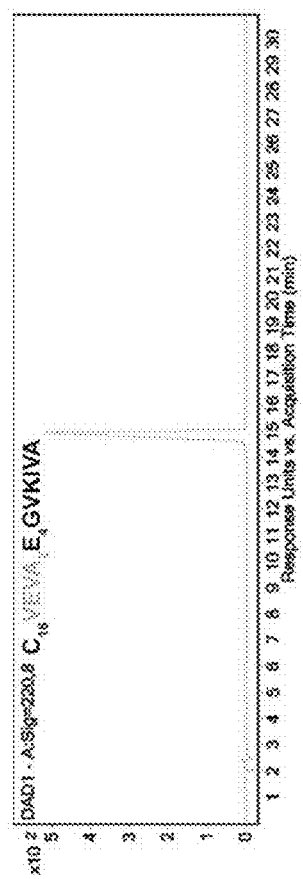
Figure 16A:
(FIGS. 16A-16C) Analytical high-performance liquid chromatography (analytical HPLC) traces of purified (FIG. 16A) $C_{16}V_2A_2E_4$ (SEQ ID NO: 9), (FIG. 16B) $C_{16}A_2G_2E_4$ (SEQ ID NO: 10) (FIG. 16C) $C_{16}$VEVA$_2$E$_4$ (SEQ ID NO: 11).
Figure 16B:
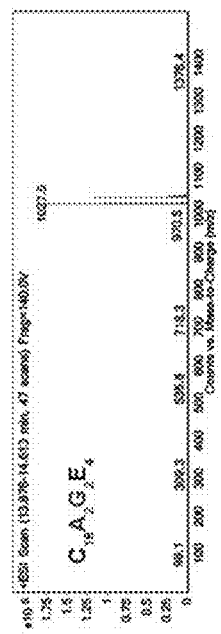
Figure 16C:
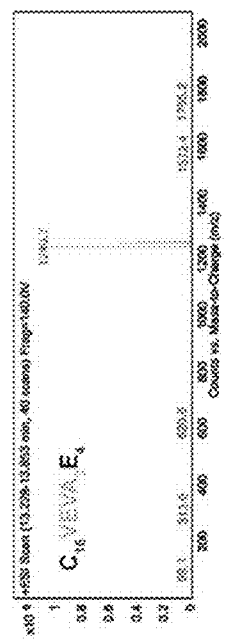
Figure 16D:
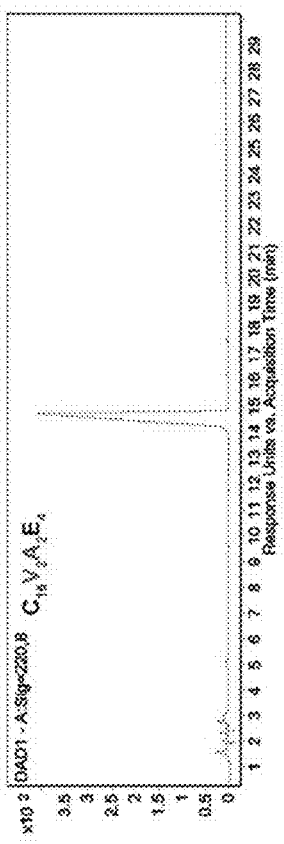
(FIGS. 16D-16F) Electrospray ionization mass spectrometry (ESI-MS) of (FIG. 16D) $C_{16}V_2A_2E_4$ (SEQ ID NO: 9), (FIG. 16E) $C_{16}A_2G_2E_4$ (SEQ ID NO: 10), and (FIG. 16F) $C_{16}$VEVA$_2$E$_4$ (SEQ ID NO: 11).
Figure 16E:
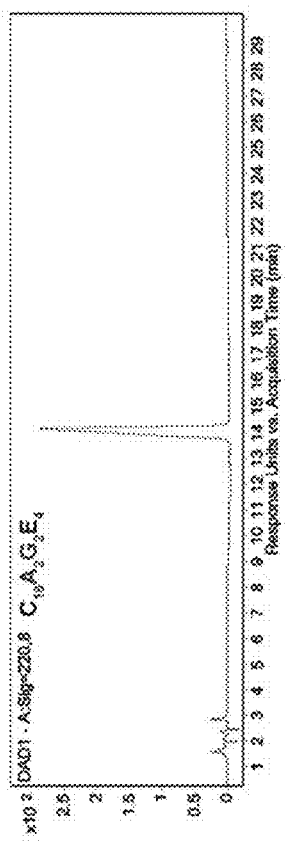
Figure 16F:
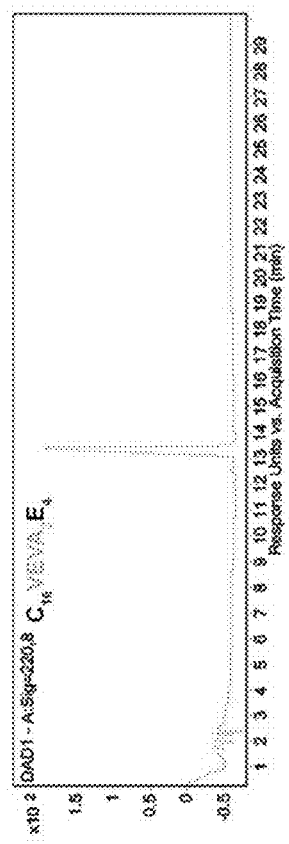
Figures 28A, 28B, 28C, 28D, 28E, 28F:
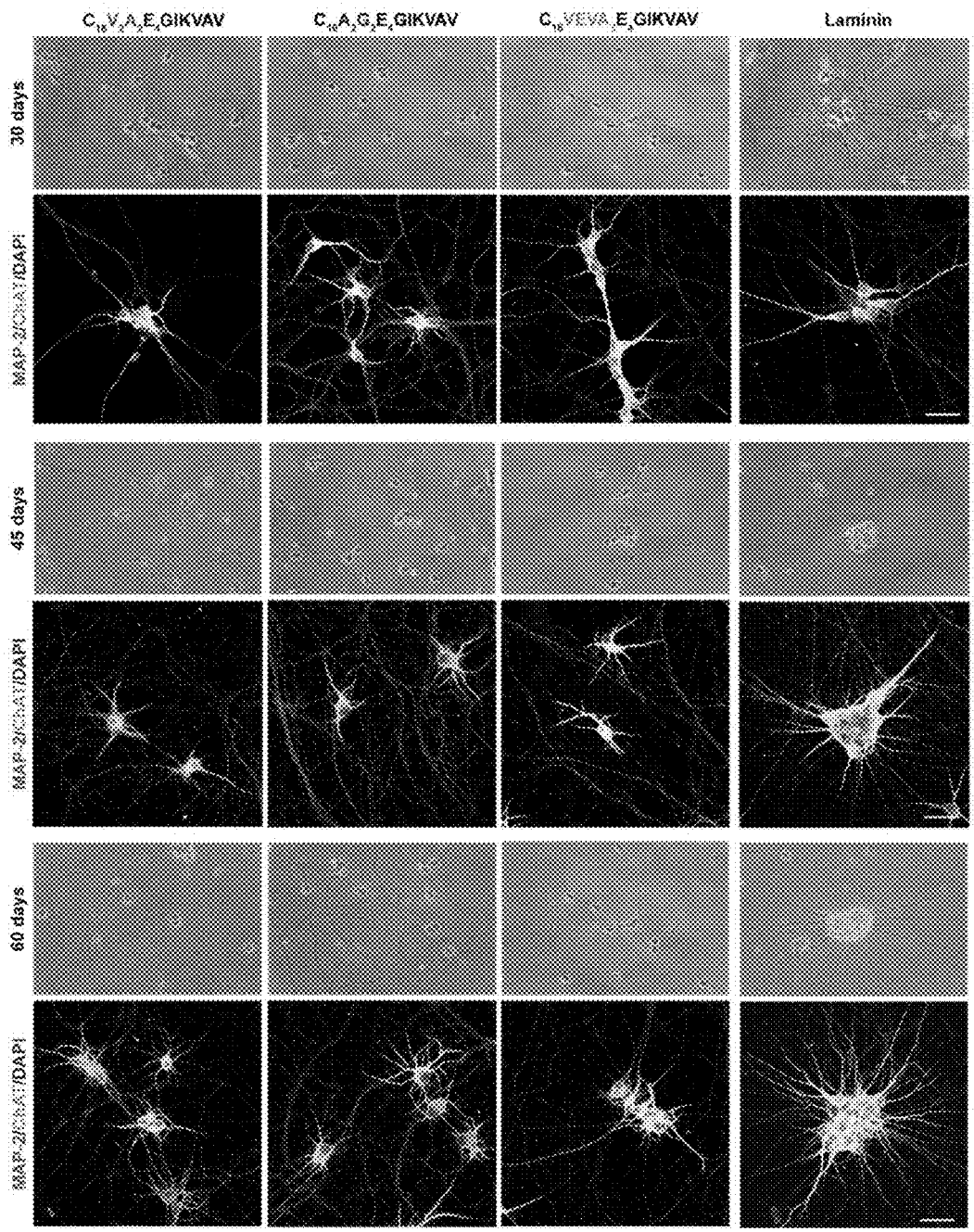
FIGS. 28A-28F. Long-term cultures of human MNs on IKVAV PA matrices.
Figure 31A:
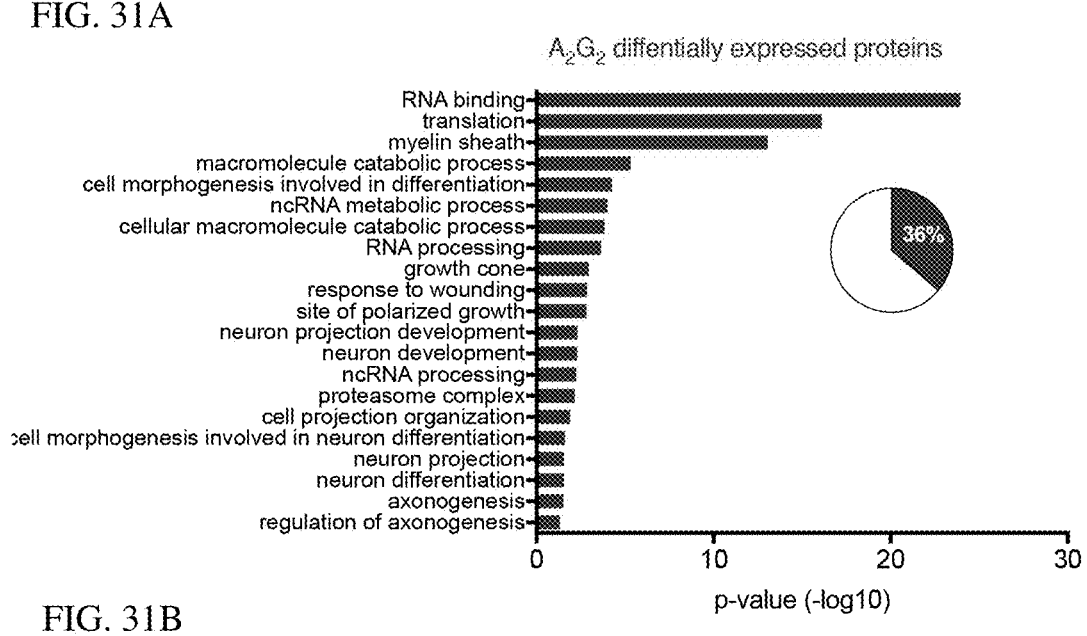
FIGS. 31A-31C Assessment of MN maturation through gene ontology (GO) analysis of proteins differentially expressed in MNs cultured on $A_2G_2$ IKVAV PA and laminin coated surfaces. Tandem mass spectrometry analysis uncovered differentially expressed proteins between MNs plated on or laminin-coated surfaces, that are associated with GO terms that have been directly linked to human MN maturation (Ho et al., 2016).
Figure 31B:
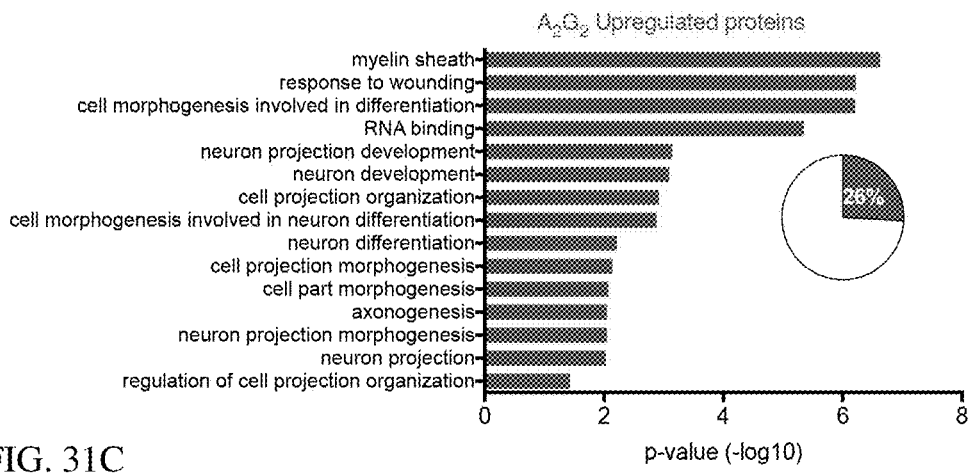
Figure 31C:
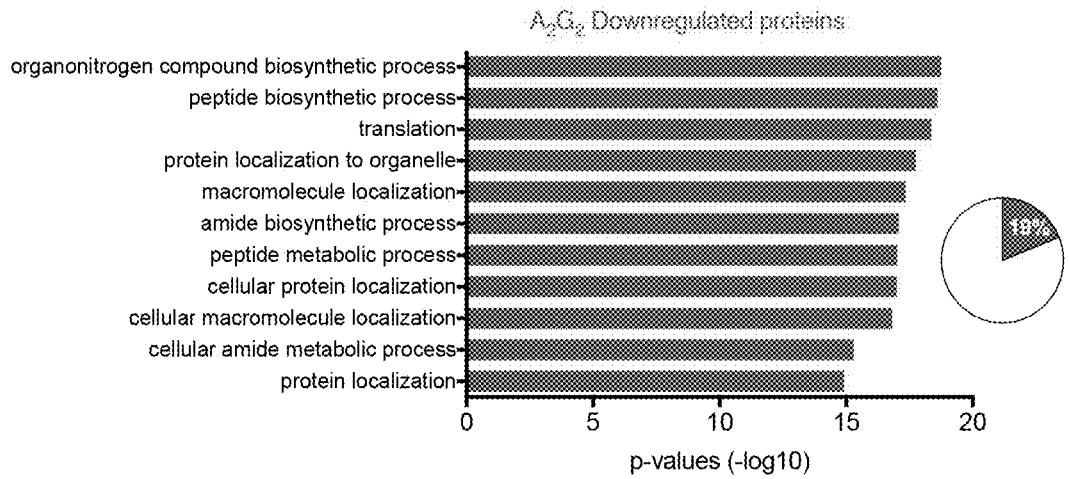
Figure 41A:
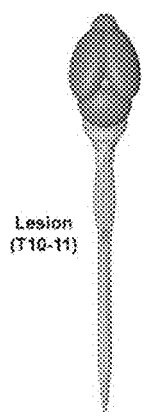
FIGS. 41A-41C. Spinal cord injury studies on mice.
Figure 41B:
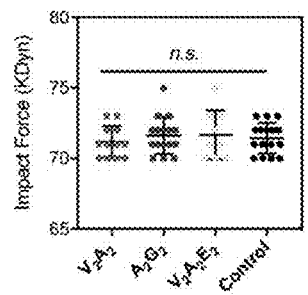
Figure 41C:
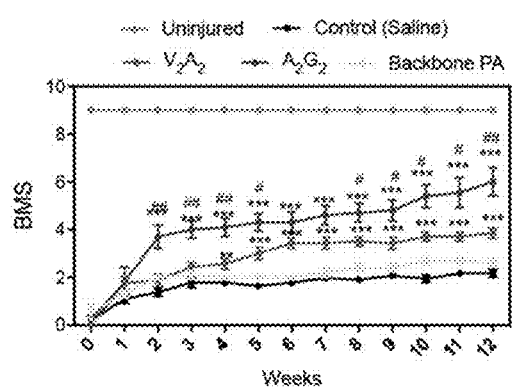

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a peptide amphiphile" is a reference to one or more peptide amphiphiles and equivalents thereof known to those skilled in the art, and so forth.

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

The term "amino acid" refers to natural amino acids, unnatural amino acids, and amino acid analogs, all in their D and L stereoisomers, unless otherwise indicated, if their structures allow such stereoisomeric forms.

Natural amino acids include alanine (Ala or A), arginine (Arg or R), asparagine (Asn or N), aspartic acid (Asp or D), cysteine (Cys or C), glutamine (Gln or Q), glutamic acid (Glu or E), glycine (Gly or G), histidine (His or H), isoleucine (Ile or I), leucine (Leu or L), Lysine (Lys or K), methionine (Met or M), phenylalanine (Phe or F), proline (Pro or P), serine (Ser or S), threonine (Thr or T), tryptophan (Trp or W), tyrosine (Tyr or Y) and valine (Val or V).

Unnatural amino acids include, but are not limited to, azetidinecarboxylic acid, 2-aminoadipic acid, 3-aminoadipic acid, beta-alanine, naphthylalanine ("naph"), aminopropionic acid, 2-aminobutyric acid, 4-aminobutyric acid, 6-aminocaproic acid, 2-aminoheptanoic acid, 2-aminoisobutyric acid, 3-aminoisobutyric acid, 2-aminopimelic acid, tertiary-butylglycine ("tBuG"), 2,4-diaminoisobutyric acid, desmosine, 2,2'-diaminopimelic acid, 2,3-diaminopropionic acid, N-ethylglycine, N-ethylasparagine, homoproline ("hPro" or "homoP"), hydroxylysine, allo-hydroxylysine, 3-hydroxyproline ("3Hyp"), 4-hydroxyproline ("4Hyp"), isodesmosine, allo-isoleucine, N-methylalanine ("MeAla" or "Nime"), N-alkylglycine ("NAG") including N-methylglycine, N-methylisoleucine, N-alkylpentylglycine ("NAPG") including N-methylpentylglycine. N-methylvaline, naphthylalanine, norvaline ("Norval"), norleucine ("Norleu"), octylglycine ("OctG"), ornithine ("Orn"), pentylglycine ("pG" or "PGly"), pipecolic acid, thioproline ("ThioP" or "tPro"), homoLysine ("hLys"), and homoArginine ("hArg").

The term "amino acid analog" refers to a natural or unnatural amino acid where one or more of the C-terminal carboxy group, the N-terminal amino group and side-chain bioactive group has been chemically blocked, reversibly or irreversibly, or otherwise modified to another bioactive group. For example, aspartic acid-(beta-methyl ester) is an amino acid analog of aspartic acid; N-ethylglycine is an amino acid analog of glycine; or alanine carboxamide is an amino acid analog of alanine. Other amino acid analogs include methionine sulfoxide, methionine sulfone, S-(carboxymethyl)-cysteine, S-(carboxymethyl)-cysteine sulfoxide and S-(carboxymethyl)-cysteine sulfone.

As used herein, the term "peptide" refers an oligomer to short polymer of amino acids linked together by peptide bonds. In contrast to other amino acid polymers (e.g., proteins, polypeptides, etc.), peptides are of about 50 amino acids or less in length. A peptide may comprise natural amino acids, non-natural amino acids, amino acid analogs, and/or modified amino acids. A peptide may be a subsequence of naturally occurring protein or a non-natural (artificial) sequence.

As used herein, the term "artificial" refers to compositions and systems that are designed or prepared by man, and are not naturally occurring. For example, an artificial peptide, peptoid, or nucleic acid is one comprising a non-natural sequence (e.g., a peptide without 100% identity with a naturally-occurring protein or a fragment thereof).

As used herein, a "conservative" amino acid substitution refers to the substitution of an amino acid in a peptide or polypeptide with another amino acid having similar chemical properties, such as size or charge. For purposes of the present disclosure, each of the following eight groups contains amino acids that are conservative substitutions for one another:

1) Alanine (A) and Glycine (G);
2) Aspartic acid (D) and Glutamic acid (E);
3) Asparagine (N) and Glutamine (Q);
4) Arginine (R) and Lysine (K);
5) Isoleucine (I), Leucine (L), Methionine (M), and Valine (V);
6) Phenylalanine (F), Tyrosine (Y), and Tryptophan (W);
7) Serine (S) and Threonine (T); and
8) Cysteine (C) and Methionine (M).

Naturally occurring residues may be divided into classes based on common side chain properties, for example: polar positive (or basic) (histidine (H), lysine (K), and arginine (R)); polar negative (or acidic) (aspartic acid (D), glutamic acid (E)); polar neutral (serine (S), threonine (T), asparagine (N), glutamine (Q)); non-polar aliphatic (alanine (A), valine (V), leucine (L), isoleucine (I), methionine (M)); non-polar aromatic (phenylalanine (F), tyrosine (Y), tryptophan (W)); proline and glycine; and cysteine. As used herein, a "semi-conservative" amino acid substitution refers to the substitution of an amino acid in a peptide or polypeptide with another amino acid within the same class.

In some embodiments, unless otherwise specified, a conservative or semi-conservative amino acid substitution may also encompass non-naturally occurring amino acid residues that have similar chemical properties to the natural residue. These non-natural residues are typically incorporated by chemical peptide synthesis rather than by synthesis in biological systems. These include, but are not limited to, peptidomimetics and other reversed or inverted forms of amino acid moieties. Embodiments herein may, in some embodiments, be limited to natural amino acids, non-natural amino acids, and/or amino acid analogs.

Non-conservative substitutions may involve the exchange of a member of one class for a member from another class.

As used herein, the term "sequence identity" refers to the degree of which two polymer sequences (e.g., peptide, polypeptide, nucleic acid, etc.) have the same sequential composition of monomer subunits. The term "sequence similarity" refers to the degree with which two polymer sequences (e.g., peptide, polypeptide, nucleic acid, etc.) differ only by conservative and/or semi-conservative amino acid substitutions. The "percent sequence identity" (or "percent sequence similarity") is calculated by: (1) comparing two optimally aligned sequences over a window of comparison (e.g., the length of the longer sequence, the length of the shorter sequence, a specified window, etc.), (2) determining the number of positions containing identical (or similar) monomers (e.g., same amino acids occurs in both sequences, similar amino acid occurs in both sequences) to yield the number of matched positions, (3) dividing the number of matched positions by the total number of positions in the comparison window (e.g., the length of the longer sequence, the length of the shorter sequence, a specified window), and (4) multiplying the result by 100 to yield the percent sequence identity or percent sequence similarity. For example, if peptides A and B are both 20 amino acids in length and have identical amino acids at all but 1 position, then peptide A and peptide B have 95% sequence identity. If the amino acids at the non-identical position shared the same biophysical characteristics (e.g., both were acidic), then peptide A and peptide B would have 100% sequence similarity. As another example, if peptide C is 20 amino acids in length and peptide D is 15 amino acids in length, and 14 out of 15 amino acids in peptide D are identical to those of a portion of peptide C, then peptides C and D have 70% sequence identity, but peptide D has 93.3% sequence identity to an optimal comparison window of peptide C. For the purpose of calculating "percent sequence identity" (or "percent sequence similarity") herein, any gaps in aligned sequences are treated as mismatches at that position.

Any polypeptides described herein as having a particular percent sequence identity or similarity (e.g., at least 70%) with a reference sequence ID number, may also be expressed as having a maximum number of substitutions (or terminal deletions) with respect to that reference sequence. For example, a sequence having at least Y % sequence identity (e.g., 90%) with SEQ ID NO:Z (e.g., 100 amino acids) may have up to X substitutions (e.g., 10) relative to SEQ ID NO:Z, and may therefore also be expressed as "having X (e.g., 10) or fewer substitutions relative to SEQ ID NO:Z."

As used herein, the term "nanofiber" refers to an elongated or threadlike filament (e.g., having a significantly greater length dimension that width or diameter) with a diameter typically less than 100 nanometers.

As used herein, the term "scaffold" refers to a material capable of supporting growth and differentiation of a cell.

As used herein, the term "supramolecular" (e.g., "supramolecular complex," "supramolecular interactions," "supramolecular fiber," "supramolecular polymer," etc.) refers to the non-covalent interactions between molecules (e.g., polymers, macromolecules, etc.) and the multicomponent assemblies, complexes, systems, and/or fibers that form as a result.

As used herein, the terms "self-assemble" and "self-assembly" refer to formation of a discrete, non-random, aggregate structure from component parts; said assembly occurring spontaneously through random movements of the components (e.g. molecules) due only to the inherent chemical or structural properties and attractive forces of those components.

As used herein, the term "peptide amphiphile" refers to a molecule that, at a minimum, includes a non-peptide lipophilic (hydrophobic) segment, a structural peptide segment and/or charged peptide segment (often both), and optionally a bioactive segment (e.g., linker segment, bioactive segment, etc.). The peptide amphiphile may express a net charge at physiological pH, either a net positive or negative net charge, or may be zwitterionic (i.e., carrying both positive and negative charges). Certain peptide amphiphiles consist of or comprise: (1) a hydrophobic, non-peptide segment (e.g., comprising an acyl group of six or more carbons), (2) a structural peptide segment; (3) a charged peptide segment, and (4) a bioactive segment (e.g., linker segment).

As used herein and in the appended claims, the term "lipophilic moiety" or "hydrophobic moiety" refers to the moiety (e.g., an acyl, ether, sulfonamide, or phosphodiester moiety) disposed on one terminus (e.g., C-terminus, N-terminus) of the peptide amphiphile, and may be herein and elsewhere referred to as the lipophilic or hydrophobic segment or component. The hydrophobic segment should be of a sufficient length to provide amphiphilic behavior and aggregate (or nanosphere or nanofiber) formation in water or another polar solvent system. Accordingly, in the context of the embodiments described herein, the hydrophobic component preferably comprises a single, linear acyl chain of the formula: $C_{n-1}H_{2n-1}C(O)$— where n=2-25. In some embodiments, a linear acyl chain is the lipophilic group (saturated or unsaturated carbons), palmitic acid. However, other lipophilic groups may be used in place of the acyl chain such as steroids, phospholipids and fluorocarbons.

As used interchangeably herein, the terms "structural peptide" or "structural peptide segment" refer to a portion of a peptide amphiphile, typically disposed between the hydrophobic segment and the charged peptide segment. The structural peptide is generally composed of three to ten amino acid residues with non-polar, uncharged side chains (e.g., His (H), Val (V), Ile (I), Leu (L), Ala (A), Phe (F)) selected for their propensity to form hydrogen bonds or other stabilizing interactions (e.g., hydrophobic interactions, van der Waals' interactions, etc.) with structural peptide segments of adjacent structural peptide segments. In some embodiments, nanofibers of peptide amphiphiles having structural peptide segments display linear or 2D structure when examined by microscopy and/or α-helix and/or β-sheet character when examined by circular dichroism (CD). In some embodiments, nanofibers of peptide amphiphiles having structural peptide segments with a total propensity for forming β-sheet conformations of 4 or less display a less ordered character (e.g. less ordered secondary structure, such as less rigid β-sheet conformations). In some embodiments, nanofibers of peptide amphiphiles having structural peptide segments with a total propensity for forming β-sheet conformations of 4 or less (e.g. $A_2G_2$) display a propensity to form random coil structures.

As used herein, the term "beta (β)-sheet-forming peptide segment" refers to a structural peptide segment that has a propensity to display β-sheet-like character (e.g., when analyzed by CD). In some embodiments, amino acids in a beta (β)-sheet-forming peptide segment are selected for their propensity to form a beta-sheet secondary structure. Examples of suitable amino acid residues selected from the twenty naturally occurring amino acids include Met (M), Val (V), Ile (I), Cys (C), Tyr (Y), Phe (F), Gln (Q), Leu (L), Thr (T), Ala (A), and Gly (G) (listed in order of their propensity to form beta sheets). However, non-naturally occurring amino acids of similar beta-sheet forming propensity may also be used. Peptide segments capable of interacting to form beta sheets and/or with a propensity to form beta sheets are understood (See, e.g., Mayo et al. Protein Science (1996), 5:1301-1315; herein incorporated by reference in its entirety).

As used herein, the term "charged peptide segment" refers to a portion of a peptide amphiphile that is rich (e.g., >50%, >75%, etc.) in charged amino acid residues, or amino acid residue that have a net positive or negative charge under physiologic conditions. A charged peptide segment may be acidic (e.g., negatively charged), basic (e.g., positively charged), or zwitterionic (e.g., having both acidic and basic residues).

As used herein, the terms "carboxy-rich peptide segment," "acidic peptide segment," and "negatively-charged peptide segment" refer to a peptide sequence of a peptide amphiphile that comprises one or more amino acid residues that have side chains displaying carboxylic acid side chains (e.g., Glu (E), Asp (D), or non-natural amino acids). A carboxy-rich peptide segment may optionally contain one or more additional (e.g., non-acidic) amino acid residues. Non-natural amino acid residues, or peptidomimetics with acidic side chains could be used, as will be evident to one ordinarily skilled in the art. There may be from about 2 to about 7 amino acids, and or about 3 or 4 amino acids in this segment.

As used herein, the terms "amino-rich peptide segment", "basic peptide segment," and "positively-charged peptide segment" refer to a peptide sequence of a peptide amphiphile that comprises one or more amino acid residues that have side chains displaying positively-charged acid side chains (e.g., Arg (R), Lys (K), His (H), or non-natural amino acids, or peptidomimetics). A basic peptide segment may optionally contain one or more additional (e.g., non-basic) amino acid residues. Non-natural amino acid residues with basic side chains could be used, as will be evident to one ordinarily skilled in the art. There may be from about 2 to about 7 amino acids, and or about 3 or 4 amino acids in this segment.

As used herein, the term "bioactive peptide" refers to amino acid sequences that mediate the action of sequences, molecules, or supramolecular complexes associated therewith. Peptide amphiphiles and structures (e.g., nanofibers) bearing bioactive peptides (e.g., an IKVAV peptide) exhibit the functionality of the bioactive peptide.

As used herein, the term "biocompatible" refers to materials and agents that are not toxic to cells or organisms. In some embodiments, a substance is considered to be "biocompatible" if its addition to cells in vitro results in less than or equal to approximately 10% cell death, usually less than 5%, more usually less than 1%.

As used herein, "biodegradable" as used to describe the polymers, hydrogels, and/or wound dressings herein refers to compositions degraded or otherwise "broken down" under exposure to physiological conditions. In some embodiments, a biodegradable substance is a broken down by cellular machinery, enzymatic degradation, chemical processes, hydrolysis, etc. In some embodiments, a wound dressing or coating comprises hydrolyzable ester linkages that provide the biodegradability.

As used herein, the phrase "physiological conditions" relates to the range of chemical (e.g., pH, ionic strength) and biochemical (e.g., enzyme concentrations) conditions likely to be encountered in the intracellular and extracellular fluids of tissues. For most tissues, the physiological pH ranges from about 7.0 to 7.4.

As used herein, the terms "treat," "treatment," and "treating" refer to reducing the amount or severity of a particular condition, disease state (e.g., CNS injury), or symptoms thereof, in a subject presently experiencing or afflicted with the condition or disease state. The terms do not necessarily indicate complete treatment (e.g., total elimination of the condition, disease, or symptoms thereof). "Treatment," encompasses any administration or application of a therapeutic or technique for a disease (e.g., in a mammal, including a human), and includes inhibiting the disease, arresting its development, relieving the disease, causing regression, or restoring or repairing a lost, missing, or defective function; or stimulating an inefficient process.

As used herein, the terms "prevent," "prevention," and "preventing" refer to reducing the likelihood of a particular condition or disease state (e.g., CNS injury) from occurring in a subject not presently experiencing or afflicted with the condition or disease state. The terms do not necessarily indicate complete or absolute prevention. For example "preventing CNS injury" refers to reducing the likelihood of CNS injury occurring in a subject not presently experiencing or diagnosed with a CNS injury. In order to "prevent CNS injury" a composition or method need only reduce the likelihood of CNS injury, not completely block any possibility thereof. "Prevention," encompasses any administration or application of a therapeutic or technique to reduce the likelihood of a disease developing (e.g., in a mammal, including a human). Such a likelihood may be assessed for a population or for an individual.

As used herein, the terms "co-administration" and "co-administering" refer to the administration of at least two agent(s) or therapies to a subject (e.g., an IKVAV PA nanofiber and one or more therapeutic agents). In some embodiments, the co-administration of two or more agents or therapies is concurrent. In other embodiments, a first agent/therapy is administered prior to a second agent/therapy. Those of skill in the art understand that the formulations and/or routes of administration of the various agents or therapies used may vary. The appropriate dosage for co-administration can be readily determined by one skilled in the art. In some embodiments, when agents or therapies are co-administered, the respective agents or therapies are administered at lower dosages than appropriate for their administration alone. Thus, co-administration is especially desirable in embodiments where the co-administration of the agents or therapies lowers the requisite dosage of a potentially harmful (e.g., toxic) agent(s), and/or when co-administration of two or more agents results in sensitization of a subject to beneficial effects of one of the agents via co-administration of the other agent.

DETAILED DESCRIPTION

Provided herein are peptide amphiphiles (PAs) comprising a bioactive peptide, nanofibers displaying the bioactive PAs, and methods of use thereof.

In some embodiments, the peptide amphiphile molecules and compositions of the embodiments described herein are synthesized using preparatory techniques well-known to those skilled in the art, preferably, by standard solid-phase peptide synthesis, with the addition of a fatty acid in place of a standard amino acid at the N-terminus (or C-terminus) of the peptide, in order to create the lipophilic segment (although in some embodiments, alignment of nanofibers is performed via techniques not previously disclosed or used in the art (e.g., extrusion through a mesh screen). Synthesis typically starts from the C-terminus, to which amino acids are sequentially added using either a Rink amide resin (resulting in an —NH2 group at the C-terminus of the peptide after cleavage from the resin), or a Wang resin (resulting in an —OH group at the C-terminus). Accordingly, some embodiments described herein encompass peptide amphiphiles having a C-terminal moiety that may be selected from the group consisting of —H, —OH, —COOH, —CONH2, and —NH2.

In some embodiments, peptide amphiphiles comprise a hydrophobic segment (i.e. a hydrophobic tail) linked to a peptide. In some embodiments, the peptide comprises a structural peptide segment. In some embodiments, the structural peptide segment is a hydrogen-bond-forming segment, or beta-sheet-forming segment. In some embodiments, the structural peptide segment has the propensity to form random coil structures (e.g. a total propensity for forming β-sheet conformations of 4 or less). In some embodiments, the peptide comprises a charged segment (e.g., acidic segment, basic segment, zwitterionic segment, etc.). In some embodiments, the peptide further comprises linker or spacer segments for adding solubility, flexibility, distance between segments, etc. In some embodiments, peptide amphiphiles comprise a spacer segment (e.g., peptide and/or non-peptide spacer) at the opposite terminus of the peptide from the hydrophobic segment. In some embodiments, the spacer segment comprises peptide and/or non-peptide elements. In some embodiments, the spacer segment comprises one or more bioactive groups (e.g., alkene, alkyne, azide, thiol, etc.). In some embodiments, various segments may be connected by linker segments (e.g., peptide (e.g., GG) or non-peptide (e.g., alkyl, OEG, PEG, etc.) linkers).

The lipophilic or hydrophobic segment is typically incorporated at the N- or C-terminus of the peptide after the last amino acid coupling, and is composed of a fatty acid or other acid that is linked to the N- or C-terminal amino acid through an acyl bond. In aqueous solutions, PA molecules self-assemble (e.g., into cylindrical micelles (a.k.a., nanofibers)) to bury the lipophilic segment in their core and display the bioactive peptide on the surface. In some embodiments, the structural peptide undergoes intermolecular hydrogen bonding to form beta sheets that orient parallel to the long axis of the micelle. In some embodiments, the structural peptide displays weak intermolecular hydrogen bonding, resulting in a less rigid beta-sheet conformation within the nanofibers.

In some embodiments, compositions described herein comprise PA building blocks that in turn comprise a hydrophobic segment and a peptide segment. In certain embodiments, a hydrophobic (e.g., hydrocarbon and/or alkyl/alkenyl/alkynyl tail, or steroid such as cholesterol) segment of sufficient length (e.g., 2 carbons, 3 carbons, 4 carbons, 5 carbons, 6 carbons, 7 carbons, 8 carbons, 9 carbons, 10 carbons, 11 carbons, 12 carbons, 13 carbons, 14 carbons, 15 carbons, 16 carbons, 17 carbons, 18 carbons, 19 carbons, 20 carbons, 21 carbons, 22 carbons, 23 carbons, 24 carbons, 25 carbons, 26 carbons, 27 carbons, 28 carbons, 29 carbons, 30 carbons or more, or any ranges there between.) is covalently coupled to peptide segment (e.g., a peptide comprising a segment having a preference for beta-strand conformations or other supramolecular interactions) to yield a peptide amphiphile molecule. In some embodiments, a plurality of such PAs will self-assemble in water (or aqueous solution) into a nanostructure (e.g., nanofiber). In various embodiments, the relative lengths of the peptide segment and hydrophobic segment result in differing PA molecular shape and nanostructural architecture. For example, a broader peptide segment and narrower hydrophobic segment results in a generally conical molecular shape that has an effect on the assembly of PAs (See, e.g., J. N. Israelachvili Intermolecular and surface forces; 2nd ed.; Academic: London San Diego, 1992; herein incorporated by reference in its entirety). Other molecular shapes have similar effects on assembly and nanostructural architecture.

In some embodiments, to induce self-assembly of an aqueous solution of peptide amphiphiles, the pH of the solution may be changed (raised or lowered) or multivalent ions, such as calcium, or charged polymers or other macromolecules may be added to the solution.

In some embodiments, the hydrophobic segment is a non-peptide segment (e.g., alkyl/alkenyl/alkynyl group). In some embodiments, the hydrophobic segment comprises an alkyl chain (e.g., saturated) of 4-25 carbons (e.g., 4, 5, 6, 7, 8, 9, 10, 11, 12, 13, 14, 15, 16, 17, 18, 19, 20, 21, 22, 23, 24, 25), fluorinated segments, fluorinated alkyl tails, heterocyclic rings, aromatic segments, pi-conjugated segments, cycloalkyls, oligothiophenes etc. In some embodiments, the hydrophobic segment comprises an acyl/ether chain (e.g., saturated) of 2-30 carbons (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30).

In some embodiments, PAs comprise one or more peptide segments. Peptide segment may comprise natural amino acids, modified amino acids, unnatural amino acids, amino acid analogs, peptidomimetics, or combinations thereof. In some embodiments, peptide segment comprise at least 50% sequence identity or similarity (e.g., conservative or semi-conservative) to one or more of the peptide sequences described herein.

In some embodiments, peptide amphiphiles comprise a charged peptide segment. The charged segment may be acidic, basic, or zwitterionic.

In some embodiments, peptide amphiphiles comprise an acidic peptide segment. For example, in some embodiments, the acidic peptide comprises one or more (e.g., 1, 2, 3, 4, 5, 6, 7, or more) acidic residues (D and/or E) in sequence. In some embodiments, the acidic peptide segment comprises up to 7 residues in length and comprises at least 50% acidic residues. In some embodiments, an acidic peptide segment comprises $(Xa)_{1-7}$, wherein each Xa is independently D or E. In some embodiments, an acidic peptide segment comprises $E_{2-4}$. For example, in some embodiments an acidic peptide segment comprises EE. In some embodiments, an acidic peptide segment comprises EEE. In other embodiments, an acidic peptide segment comprises EEEE (SEQ ID NO: 5).

In some embodiments, peptide amphiphiles comprise a basic peptide segment. For example, in some embodiments, the acidic peptide comprises one or more (e.g., 1, 2, 3, 4, 5, 6, 7, or more) basic residues (R, H, and/or K) in sequence. In some embodiments, the basic peptide segment comprises up to 7 residues in length and comprises at least 50% basic residues. In some embodiments, an acidic peptide segment comprises $(Xb)_{1-7}$, wherein each Xb is independently R, H, and/or K.

In some embodiments, peptide amphiphiles comprises a structural peptide segment. In some embodiments, the structural peptide segment is a beta-sheet-forming segment. In some embodiments, the structural peptide segment displays weak hydrogen bonding and has the propensity to form random coil structures rather than rigid beta-sheet conformations. In some embodiments, the structural peptide segment is rich in one or more of H, I, L, F, V, G, and A residues. In some embodiments, the structural peptide segment comprises an alanine- and valine-rich peptide segment (e.g., VVAA (SEQ ID NO: 3), VVVAAA (SEQ ID NO: 21), AAVV (SEQ ID NO: 22), AAAVVV (SEQ ID NO: 23), or other combinations of V and A residues, etc.). In some embodiments, the structural peptide segment comprises 4 or more consecutive A and/or V residues, or conservative or semi-conservative substitutions thereto. In some embodiments, the structural peptide segment comprises $V_2A_2$. In some embodiments, the structural peptide segment comprises an alanine and glycine-rich peptide segment (e.g. AAGG (SEQ ID NO: 1), AAAGGG (SEQ ID NO: 24), or other combinations of A and G residues, etc.). In some embodiments, the structural peptide segment comprises $A_2G_2$ (SEQ ID NO: 1).

In some embodiments, the structural peptide segment comprises 4 or more consecutive non-polar aliphatic residues (e.g., alanine (A), valine (V), leucine (L), isoleucine (I), methionine (M)). In some embodiments, the structural peptide segment comprises 2-16 amino acids in length and comprises 4 or more (e.g., 2, 3, 4, 5, 6, 7, 8, 9, 10, 11, 12, 13, 14, 15, 16, or ranges there between) non-polar aliphatic residues. In some embodiments, the structural peptide segment comprises $VEVA_2$ (SEQ ID NO: 4).

In some embodiments, the structural peptide segment has a total propensity for forming β-sheet conformations of 4 or less (e.g. less than 4, less than 3.9, less than 3.8, less than 3.7, less than 3.6, less than 3.5, less than 3.4, less than 3.3, less than 3.2, less than 3.1, less than 3.0, less than 2.9. less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, less than 1.1, or less than 1.)

The total propensity for forming β-sheet conformations may be calculated as the sum of the propensity for forming β-sheet conformations of each amino acid in the structural peptide segment. The propensity of each amino acid for forming β-sheet conformations and methods for calculating the same are described in, for example, Fujiwara, K., Toda, H. & Ikeguchi, M. Dependence of α-helical and β-sheet amino acid propensities on the overall protein fold type. *BMC Struct Biol* 12, 18 (2012), the entire contents of which are incorporated herein by reference. Exemplary values are shown in Table 1, below. For the purposes of calculating the total propensity for forming β-sheet conformations of the structural peptide segment, the value shown in the "total residues" column from table 1 for each amino acid is added together. For example, for an A2G2 structural peptide segment, the total propensity for forming β-sheet conformations is 0.75+0.75+0.67+0.67=2.84. The structural peptide segment may comprise any suitable number and combination of amino acids to achieve a total propensity for forming β-sheet conformations of 4 or less.

TABLE 1

| Amino acid Propensities for β-sheet conformations | | | |
|---|---|---|---|
| Amino Acid | Exposed Residues | Buried Residues | Total Residues |
| V | 2.31 | 1.57 | 2.00 |
| I | 2.02 | 1.39 | 1.79 |
| L | 1.18 | 0.93 | 1.15 |
| M | 1.01 | 0.84 | 1.01 |
| P | 0.49 | 0.42 | 0.40 |
| A | 0.48 | 0.72 | 0.75 |
| C | 1.24 | 1.07 | 1.36 |
| F | 1.50 | 1.10 | 1.4 |
| Y | 1.71 | 1.12 | 1.37 |
| W | 1.90 | 0.91 | 1.23 |
| Q | 0.96 | 0.82 | 0.72 |
| S | 0.86 | 0.85 | .081 |
| T | 1.58 | 1.08 | 1.21 |
| N | 0.71 | 0.76 | 0.63 |
| H | 1.15 | 0.98 | 0.99 |
| D | 0.61 | 0.76 | 0.55 |
| K | 1.14 | 0.98 | 0.76 |
| E | 0.89 | 0.86 | 0.65 |
| R | 1.27 | 0.82 | 0.85 |
| G | 0/41 | 0.81 | 0.67 |

In some embodiments, a structural peptide segment having a total propensity for forming β-sheet conformations of 4 or less indicates that the amino acids within the structural peptide segment have weaker interactions with neighboring molecules. For example, the structural peptide segment may display weak hydrogen-bonding abilities. Accordingly, such structural peptide segments and the peptide amphiphiles comprising the same may create more dynamic nanofiber structures. For example, an $A_2G_2$ (SEQ ID NO: 1) structural peptide segment may display random coil structures rather than rigid beta-sheet conformations.

In some embodiments, peptide amphiphiles comprise a non-peptide spacer or linker segment. In some embodiments, the non-peptide spacer or linker segment is located at the opposite terminus of the peptide from the hydrophobic segment. In some embodiments, the spacer or linker segment provides the attachment site for a bioactive group. In some embodiments, the spacer or linker segment provides a reactive group (e.g., alkene, alkyne, azide, thiol, maleimide etc.) for functionalization of the PA. In some embodiments, the spacer or linker is a substantially linear chain of $CH_2$, O, $(CH_2)_2O$, $O(CH_2)_2$, NH, and C═O groups (e.g., $CH2(O(CH_2)_2)_2NH$, $CH2(O(CH_2)_2)_2NHCO(CH_2)_2CCH$, etc.). In some embodiments, a spacer or linker further comprises additional bioactive groups, substituents, branches, etc. In some embodiments, the linker segment is a single glycine (G) residue.

Suitable peptide amphiphiles for use in the materials herein, as well as methods of preparation of PAs and related materials, amino acid sequences for use in PAs, and materials that find use with PAs, are described in the following patents: U.S. Pat. Nos. 9,044,514; 9,040,626; 9,011,914; 8,772,228; 8,748,569 8,580,923; 8,546,338; 8,512,693; 8,450,271; 8,236,800; 8,138,140; 8,124,583; 8,114,835; 8,114,834; 8,080,262; 8,076,295; 8,063,014; 7,851,445; 7,838,491; 7,745,708; 7,683,025; 7,554,021; 7,544,661; 7,534,761; 7,491,690; 7,452,679; 7,371,719; 7,030,167; all of which are herein incorporated by reference in their entireties.

The characteristics (e.g., shape, rigidity, hydrophilicity, etc.) of a PA supramolecular structure depend upon the identity of the components of a peptide amphiphile (e.g., lipophilic segment, acidic segment, structural peptide segment, bioactive segment, etc.). For example, nanofibers, nanospheres, intermediate shapes, and other supramolecular structures are achieved by adjusting the identity of the PA component parts. In some embodiments, characteristics of supramolecular nanostructures of PAs are altered by post-assembly manipulation (e.g., heating/cooling, stretching, etc.).

In some embodiments, a peptide amphiphile comprises: (a) a hydrophobic tail comprising an alkyl chain of 8-24 carbons; (b) a structural peptide segment (e.g., comprising VVAA (SEQ ID NO: 3), AAGG (SEQ ID NO: 1), or $VEVA_2$ (SEQ ID NO: 4)); and (c) a charged segment (e.g., comprising EE, EEE, EEEE (SEQ ID NO: 5), etc.). In some embodiments, any PAs within the scope described herein, comprising the components described herein, or within the skill of one in the field, may find use herein.

In some embodiments, peptide amphiphiles comprise a bioactive moiety (e.g., IKVAV peptide). In particular embodiments, a bioactive moiety is the most C-terminal or N-terminal segment of the PA. In some embodiments, the bioactive moiety is attached to the end of the charged segment. In some embodiments, the bioactive moiety is exposed on the surface of an assembled PA structure (e.g., nanofiber). A bioactive moiety is typically a peptide, but is not limited thereto.

In some embodiments, the bioactive moiety is a peptide identified in the extracellular matrix (ECM). For example, the bioactive moiety may be a peptide sequence found in collagens, elastins, fibronectins, or laminins. In some embodiments, the bioactive moiety is a peptide sequence found in laminins. For example, the bioactive moiety may be found in laminin-1, laminin-2, laminin-3, laminin-4, laminin-5, laminin-6, laminin-7, laminin-8, laminin-9, laminin-10, laminin-11, laminin-12, laminin-13, laminin-14, or laminin-15. In some embodiments, the bioactive moiety is a peptide sequence found in laminin-1. In particular embodiments, the bioactive moiety is IKVAV (SEQ ID NO: 25). In some embodiments, the bioactive moiety is a recombinant peptide. In some embodiments, a bioactive moiety is a peptide sequence that binds a peptide or polypeptide of interests, for example, an ECM protein.

In some embodiments, a peptide amphiphile comprises (e.g., from C-terminus to N-terminus or from N-terminus to C-terminus): bioactive peptide (e.g., IKVAV peptide)—charged segment (e.g., comprising $E_{24}$, etc.)—structural peptide segment (e.g., comprising $V_2A_2$ (SEQ ID NO: 3), $A_2G_2$ (SEQ ID NO: 1), $VEVA_2$ (SEQ ID NO: 4), etc.)—hydrophobic tail (e.g., comprising an alkyl chain of 8-24 carbons).

In some embodiments, a peptide amphiphile comprises (e.g., from C-terminus to N-terminus or from N-terminus to C-terminus): bioactive peptide (e.g., IKVAV peptide)—flexible linker (e.g. comprising G, etc.)—charged segment (e.g., comprising $E_{2-4}$, etc.)—structural peptide segment (e.g., comprising $V_2A_2$ (SEQ ID NO: 3), $A_2G_2$ (SEQ ID NO: 1), $VEVA_2$ (SEQ ID NO: 4), etc.)—hydrophobic tail (e.g., comprising an alkyl chain of 8-24 carbons).

In some embodiments, a PA further comprises an attachment segment or residue (e.g., K) for attachment of the hydrophobic tail to the peptide portion of the PA. In some embodiments, the hydrophobic tail is attached to a lysine side chain.

In some embodiments, provided herein are nanofibers and nanostructures assembled from the peptide amphiphiles described herein. In some embodiments, a nanofiber is prepared by the self-assembly of the PAs described herein. In some embodiments, a nanofiber comprises or consists of PAs displaying an IKVAV peptide. In some embodiments, the IKVAV peptides are displayed on the surface of the nanofiber. In some embodiments, in addition to PAs displaying IKVAV peptides, filler PAs are included in the nanofibers. In some embodiments, filler PAs are peptide amphiphiles, as described herein (e.g., structural peptide segment, charged segment, hydrophobic segment, etc.), but lacking a bioactive moiety. In some embodiments, filler peptides are basic or acidic peptides lacking a bioactive moiety. In some embodiments, the filler PAs and IKVAV PAs self-assemble into a nanofiber comprising both types of PAs. In some embodiments, nanostructures (e.g., nanofibers) assembled from the peptide amphiphiles described herein are provided.

In some embodiments, filler peptides (e.g., basic peptide, acidic peptides, etc.) impart mechanical characteristics to a material comprising the PA nanofibers described herein. In some embodiments, a nanofiber assembled from 0-75% (mass %) bioactive IKVAV PA and 25-100% (mass %) basic filler PA becomes a gel at basic pH conditions (e.g., pH 8.5-11). In some embodiments, a nanofiber assembled from 75-100% (mass %) bioactive IKVAV PA and 0-25% (mass %) basic filler PA is a liquid at basic pH conditions (e.g., pH 8.5-11). In some embodiments, a nanofiber assembled from 0-20% (mass %) bioactive IKVAV PA and 80-100% (mass %) acidic filler PA becomes a gel at acidic pH conditions (e.g., pH 1-5). In some embodiments, a nanofiber assembled from 20-80% (mass %) bioactive IKVAV PA and 20-80% (mass %) acidic filler PA becomes a gel at neutral pH conditions (e.g., pH 5-8.5). In some embodiments, a nanofiber assembled from 80-100% (mass %) bioactive IKVAV PA and 0-20% (mass %) acidic filler PA is a liquid at acidic pH conditions (e.g., pH 1-5).

In some embodiments, nanostructures are assembled from (1) PAs bearing a bioactive moiety (e.g., IKVAV peptide) and (2) filler PAs (e.g., acidic or basic PAs not-labeled or not displaying a bioactive moiety, etc.). In some embodiments, nanostructures (e.g., nanofibers) comprise 95%, 90%, 85%, 80%, 75%, 70%, 65%, 60%, 55%, 50% 45%, 40%, 35%, 30%, 25%, 20%, 15%, 10%, 5%, 4%, 3%, 2%, or 1% (or any ranges there between) VEGF PAs. In some embodiments, nanostructures (e.g., nanofibers) comprise 95%, 90%, 85%, 80%, 75%, 70%, 65%, 60%, 55%, 50% 45%, 40%, 35%, 30%, 25%, 20%, 15%, 10%, 5%, 4%, 3%, 2%, or 1% (or any ranges there between) acidic filler PAs. In some embodiments, nanostructures (e.g., nanofibers) comprise 95%, 90%, 85%, 80%, 75%, 70%, 65%, 60%, 55%, 50% 45%, 40%, 35%, 30%, 25%, 20%, 15%, 10%, 5%, 4%, 3%, 2%, or 1% (or any ranges there between) basic filler PAs. In some embodiments, the ratio of IKVAV PA to acidic and/or basic PAs in a nanofiber determines the mechanical characteristics (e.g., liquid or gel) of the nanofiber material and under what conditions the material will adopt various characteristics (e.g., gelling upon exposure to physiologic conditions, liquifying upon exposure to physiologic conditions, etc.).

Peptide amphiphile (PA) nanofiber solutions may comprise any suitable combination of PAs. In some embodiments, at least 0.05 mg/mL (e.g., 0.10 mg/ml, 0.15 mg/ml, 0.20 mg/ml, 0.25 mg/ml, 0.30 mg/ml, 0.35 mg/ml, 0.40 mg/ml, 0.45 mg/ml, 0.50 mg/ml, 0.60 mg/ml, 0.70 mg/ml, 0.80 mg/ml, 0.90 mg/ml, 1.0 mg/ml, or more, or ranges therebetween), of the solution is a filler PA (e.g., without a bioactive moiety). In some embodiments, at least 0.25 mg/mL of the solution is a filler PA. In some embodiments, a filler PA is a non-bioactive PA molecule having highly charged glutamic acid residues on the terminal end of the molecule (e.g., surface-displayed end). These negatively charged PAs allow for the gelation to take place between nanofibers via ionic crosslinks. In some embodiments, a filler PA is a non-bioactive PA molecule having highly charged lysine residues on the terminal end of the molecule (e.g., surface-displayed end). These positively charged PAs allow for the gelation to take place under basic conditions. The filler PAs provide the ability to incorporate other bio-active PAs molecules into the nanofiber matrix while still ensuring the ability of the nanofibers solution to gel. In some embodiments, the solutions are annealed for increased viscosity and stronger gel mechanics. These filler PAs have sequences are described in, for example, U.S. Pat. No. 8,772,228 (e.g., $C_{16}$-VVVAAAEEE), which is herein incorporated by reference in its entirety.

In some embodiments, the PA nanofiber described herein exhibit a small cross-sectional diameter (e.g., <25 nm, <20 nm, <15 nm, about 10 nm, etc.). In some embodiments, the small cross-section of the nanofibers (~10 nm diameter) allows the fibers to permeate the brain parenchyma.

In some embodiments, the PAs and nanofibers described herein may be incorporated into pharmaceutical compositions for use in methods of treating disease. For example, the PAs and nanofibers described herein may be used for methods of treatment or prevention of nervous system injury in a subject. For example, the PAs and nanofibers described herein may be used in methods for treatment of prevention of injury to the central nervous system (CNS), including the brain and the spinal cord, or the peripheral nervous system (PNS), including the nerves and ganglia outside of the brain and spinal cord. In some embodiments, the PAs and nanofibers described herein may be used for treatment or prevention of injury to the CNS or PNS in a subject. In some embodiments, the injury is a spinal cord injury. The spinal cord injury may be cervical, lumbar, thoracic, sacral, or any combination thereof.

The injury may be a traumatic injury. A traumatic injury refers to an injury caused by trauma, for example trauma such as that caused by an automobile accident, a fall, violence, sports injury, surgical injury, and the like.) For example, the PAs and nanofibers described herein may be used for the treatment of traumatic spinal cord injury. As another example, the PAs and nanofibers described herein may be used for the treatment of traumatic brain injury (TBI). Alternatively, the injury may be a non-traumatic injury. For example, the injury may be a non-traumatic injury to the CNS (e.g., the brain and/or the spinal cord) or the PNS caused by, for example, cancer, multiple sclerosis, inflammation, arthritis, spinal stenosis, tumors, blood loss, and the like.

In some embodiments, the composition comprising PAs and/or nanofibers as described herein is provided to a subject suspected of having a traumatic spinal cord injury. For example, the composition may be provided to the subject exhibiting one or more symptoms including loss of sensation and/or loss of motor control in one or more areas of the body (e.g. hands, arms, legs, feet, etc.), low blood pressure, inability to regulate blood pressure, inability to regulate body temperature, inability to sweat below the area of injury, chronic pain, and/or swelling of the spinal cord. The composition may be provided to the subject to treat the injury. In some embodiments, treating the injury may prevent worsening of one or more symptoms associated with the injury. In some embodiments, treating the injury may reduce the severity of and/or eliminate one or more symptoms associated with the injury.

A composition comprising PAs and/or nanofibers described herein may be provided to a subject at any suitable point following injury (e.g. traumatic spinal cord injury) to treat the injury. For example, the composition may be provided to the subject within 24 hours of the injury (e.g. within 24 hours, within 12 hours, within 10 hours, within 9 hours, within 8 hours, within 7 hours, within 6 hours, within 5 hours, within 4 hours, within 3 hours, within 2 hours, or within 1 hour from injury. In some embodiments, the composition may be provided to the subject after a duration longer than 24 hours has passed following injury or diagnosis of injury.

The composition may be administered in any suitable amount, depending on factors including the age of the subject, weight of the subject, severity of the injury, and the like. The composition may be administered in combination with other suitable treatments for injury or preventative measures to prevent the severity of the injury from worsening.

In some embodiments, the PA and nanofiber compositions herein are formulated for delivery to a subject. Suitable routes of administrating the pharmaceutical composition described herein include, without limitation: topical, subcutaneous, transdermal, intradermal, intralesional, intraarticular, intraperitoneal, intravesical, transmucosal, gingival, intradental, intracochlear, transtympanic, intraorgan, epidural, intrathecal, intramuscular, intravenous, intravascular, intraosseus, periocular, intratumoral, intracerebral, and intracerebroventricular administration. In some embodiments, the PA compositions are administered parenterally. In some embodiments, parenteral administration is by intrathecal administration, intracerebroventricular administration, or intraparenchymal administration. The PA compositions herein can be administered as the sole active agent or in combination with other pharmaceutical agents such as other agents used in the treatment of nervous system injury in a subject.

In some embodiments, the PAs and nanofibers described herein (e.g., nano-IKVAV) find use in cell culture methods. For example, further disclosed herein are scaffolds comprising the peptide amphiphiles described herein. The scaffolds may comprise a nanofiber of self-assembled peptide amphiphiles, at least a portion of the peptide amphiphiles comprising: a hydrophobic tail, a structural peptide segment, a charged peptide segment, and an IKVAV bioactive peptide. The scaffold may further comprise one or more filler peptide amphiphiles. The scaffolds described herein are capable of supporting growth and differentiation of a cell. Accordingly, the scaffolds may be in methods for culturing cells. The methods for culturing cells comprise contacting the cells with a scaffold as described here. In some embodiments, the scaffold may be used as a coating for any desired cell culture tool (tissue culture plate, petri dish, glass slide, etc.).

Cells cultured on the scaffolds disclosed herein may demonstrate improved characteristics compared to cells cultured in the absence of the disclosed scaffolds. For example, cells may demonstrate improved differentiation, improved maturation and/or improved long term viability compared to cells cultured in the absence of the disclosed scaffolds.

In some embodiments, the scaffolds may be used in methods of culturing neuronal cells. For example, the scaffolds may be used in methods of culturing hiPSC-derived neuronal cells, such as hiPSC-derived motor neurons. For example, hiPSCs may be differentiated using any standard cocktail known to stimulate neural induction and promote ventral/caudal patterning. Following this initial differentiation into neurons, the neurons may be cultured on various IKVAV scaffolds. Culture on the disclosed IKVAV scaffolds may enable efficient generation and functional maturation of hiPSC derived motor neurons.

EXPERIMENTAL

Materials and Methods

Material Synthesis and Preparation and Characterization

PA synthesis and preparation: IKVAV PA molecules ($C_{16}V_2A_2E_4$GIKVAV (SEQ ID NO: 6), $C_{16}A_2G_2E_4$GIKVAV (SEQ ID NO: 7), $C_{16}$VEVA$_2$GIKVAV (SEQ ID NO: 8)), VKIVA scramble PA molecules ($C_{16}V_2A_2E_4$GVKIVA (SEQ ID NO: 13), $C_{16}A_2G_2E_4$GVKIVA (SEQ ID NO: 14), $C_{16}$VEVA$_2$GVKIVA (SEQ ID NO: 15)) and backbone sequences ($C_{16}V_2A_2E_4$ (SEQ ID NO: 9), $C_{16}A_2G_2E_4$ (SEQ ID NO: 10), $C_{16}$VEVA$_2$ (SEQ ID NO: 11) were synthesized by standard fluorenylmethoxycarbonyl (Fmoc) solid-phase peptide synthesis using a CEM model Liberty Blue Microwave Assisted Peptide Synthesizer. The PAs were purified by reverse-phase high-performance liquid chromatography (HPLC) using a Phenomenex Kinetex column ($C_{18}$ stationary phase, 5 µm, 100 Å pore size, 30.0×150 mm) on a Shimadzu model prominence modular HPLC system equipped with a DGU-20A$_{5R}$ degassing unit, two LC-20AP solvent delivery units, a SPD-M20A diode array detector and a FRC-10A fraction collector, using $H_2O/CH_3CN$ gradient containing 0.1% $NH_4OH$ (v/v) as an eluent at a flow rate of 25.0 mL/min. The purity of lyophilized PAs was analyzed by liquid chromatography-mass spectrometry (LC-MS) using a Phenomenex Jupiter 4 µm Proteo 90 Å column ($C_{12}$ stationary phase, 4 µm, 90 Å pore size, 1×150 mm) on an Agilent model 1200 Infinity Series binary LC gradient system, using $H_2O/CH_3CN$ gradient containing 0.1% $NH_4OH$ (v/v) as an eluent at a flow rate of 50 µL/min. Electrospray ionization mass (ESI-mass) spectrometry was performed in positive scan mode on an Agilent model 6510 Quadrupole Time-of-Flight LC/MS spectrometer. After lyophilization, PA powder was reconstituted in 125 mM NaCl and 3 mM KCl solution and adjusted to a pH of 7.4 using 1 µL additions of 1N NaOH to ensure cell compatibility and material consistency. PA solutions were annealed at 80° C. for 30 min and then slowly cooled down at 1° C. per minute to reach a final temperature of 27° C. using a thermocycler (Eppendorf Mastercycler) for even and controlled heating and cooling of all samples. To prepare PAs coated substrate, 24, 12, 6-well polystyrene cell culture plate or/and 12 mm and 18 mm glass coverslips were coated with poly-$_D$-lysine (0.01 mg/mL) overnight at 37° C. On the following day, the plates were rinsed with MilliQ water three times, followed by a coating with 30 µL of annealed PAs (1 wt %) solution for 3 hours. The excessive PA solution was removed, and plates were gently rinsed with gelling solution (150 mM NaCl, 3 mM KCl, 25 mM $CaCl_2$) before further use.

Immobilization of IKVAV peptide on glass surface: Borosilicate glass coverslips (12 mm in diameter; Fisher Scientific) were modified with synthetic IKVAV (SEQ ID NO: 25) peptide following previously described techniques (Olbrich, K. C. et al *Biomaterials* 17, 759-764 (1996) and Kam, L. et al *Biomaterials* 23, 511-515 (2002)). Borosilicate glass coverslips were cleaned with 2% (v/v) micro-90 detergent (Sigma Aldrich) for 30 min at 60° C., rinsed six times with distilled water, rinsed with ethanol and then dried. Coverslips were plasma-etched (Harrick Plasma PDC-001-HP) with $O_2$ for 30 sec, then immediately incubated in a 2% (v/v) solution of (3-aminopropyl) triethoxysilane (Sigma Aldrich) in ethanol for 15 min. Coverslips were then rinsed twice with ethanol and twice with water and then dried in the oven. IKVAV peptide (see FIG. 34) was then prepared at 50 nmol/mL in a 1.25 mg/mL solution of 1-ethyl-3-(dimethylaminopropyl)carbodiimide (Arcos Organics) with 2% DMF (Dimethylformamide (Sigma Aldrich)). Coverslips were incubated with this solution for 3.5 hours at 40° C. After incubation, coverslips were washed with 100% acetic anhydride (Fisher Chemical), 2 M hydrochloric acid (Fisher Chemical), and 0.2 M sodium bicarbonate in succession. After rinsing with excess amount of water, samples were sonicated in 4 M urea for 10 min followed by 1 M NaCl for 10 min and then rinsed with excess amount of water and dried at 100° C. for 1 h.

Transmission electron microscopy (TEM): 5 µL of sample solution ([PA]=0.01 wt % in $H_2O$) was deposited on a copper TEM grid with carbon support film (Electron Microscopy Science), and held in place with tweezers for 5 min. The sample solution was removed by capillary action using a filter paper, and the grid was dried for 10 min. The sample was then stained with 10 µL of aqueous uranyl acetate (2 wt %, Sigma Aldrich) for 3 min and the solution was removed by capillary action using a filter paper. The grid was dried for at least 2 hours before imaging. TEM images were obtained using a Hitachi model HT-7700 electron microscope operating at 120 kV, equipped with an Orius SC 1000A camera.

Cryogenic transmission electron microscope (cryo-TEM): Plunge-freezing for cryo-TEM samples were prepared using a FEI model Vitrobot Mark III. 6.5 µL of sample solution ([PA]=0.01 wt % in $H_2O$) was deposited on a plasma-cleaned copper TEM grid with holey carbon support film (Electron Microscopy Science), and held in place with tweezers mounted on the Vitrobot. The specimen was blotted in an environment with 100% humidity at 22° C. (blot offset: 0.5 mm, blot total: 1, wait time: 0 sec, blot time: 5 sec, drain time: 0 sec), and plunged into a liquid ethane reservoir cooled by liquid nitrogen. The vitrified samples were stored in liquid nitrogen and then transferred to a Gatan cryo-TEM holder. Cryo-TEM images were obtained using a Hitachi model HT-7700 electron microscope operating with an accelerating voltage of 120 kV, equipped with an Orius SC 1000A camera.

Scanning electron microscopy (SEM): PA samples were fixed in a mixture of paraformaldehyde (2.0%, Electron Microscopy Sciences), glutaraldehyde (2.5%, Electron Microscopy Sciences) in phosphate buffered saline (1×, Gibco) for 20 min. The fixative was removed, and the water was exchanged with ethanol by incubating the samples in a gradation of ethanol solutions with increasing concentration (30-100%) of 200 proof ethanol (Decon Laboratories, Inc). Critical drying point (Tousimis Samdri-795) was used to remove the excess water. A purge cycle of 15 min was used.

The resulting dehydrated sample coverslips were mounted on stubs using 12 mm carbon adhesive tape (Electron Microscopy Sciences) and coated with approximately 6 nm of osmium (Filgen, OPC-60A) in order to make the sample surface conductive for imaging. All images were taken with an accelerating voltage of 2 kV with a Hitachi SU8030 SEM instrument.

Atomic force microscopy (AFM): AFM imaging and force measurements were performed at room temperature on a Bioscope Resolve BioAFM/Nanoscope V system (Bruker, Santa Barbara), integrated onto an Axio Oberver.D1m inverted optical microscope (Carl Zeiss, Inc.). Silicon nitride triangular probes (ScanAsyst Fluid, Bruker) having nominal tip radius ~20 nm and spring constant of ~0.7 N/m were used for imaging and indentations of thin fibers. $SiO_2$ beads with a diameter of 1 µm attached to silicon nitride triangular cantilevers with 30 nm gold coating (Novascan Technologies, Inc.) were used for indentation experiments on thick gels.

The deflection sensitivity of each probe was calibrated by repeated indentation on a clean glass slide in MilliQ water and the spring constant of the cantilever was estimated by thermal noise method. The effective tip radius of conical (sharp) probes was estimated before each measurement as a function of the indentation depth, using polycrystalline titanium tip characterizer sample (RS-15M, Bruker) using a tip estimation function (NanoScope Analysis software, Bruker).

Indentations were performed in MilliQ water by bringing the AFM probe in contact with the sample surface at a controlled load force and recording force-displacement curves during the loading-unloading cycles. During indentations a maximum load of <10 nN was applied at each data point to avoid plastic deformation and to keep the indentations within the elastic range. Measurements were performed by acquiring ~250 force curves per sample. To fit the force curves the Protein Unfolding and Nano-indentation Analysis Software (PUNIAS) was used.

The elastic modulus of the thick gels (several m-thick) was obtained by fitting the loading force curves through the Hertz model:

$$F_{Hertz} = \frac{4}{3} \frac{E}{(1-v^2)} \sqrt{R} \, \delta^{3/2}$$

being F the force, δ the sample deformation, E the Young's modulus, v the Poisson ratio, R the radius of the indenting probe. To fit the force curves, the indentation depth was controlled to 200 nm, i.e. within 10% of the total film thickness, in order to minimize rigid substrate effect. Force curves performed with sharp probes on thin fibers were analyzed through the DMT (Derjaguin, Muller and Toporov) model. The DMT model, which is based on the Hertz model yet includes a description of adhesion, is the standard model employed in mechanical studies on fibrils [see B. R. Neugirg et al. Nanoscale 2016, 8, 8414-8426]. Force curves are described in the DMT model by the following equation:

$$F_{DMT} = \frac{4}{3} \frac{E}{(1-v^2)} \sqrt{R} \, \delta^{3/2} - F_0$$

with $F_0$ the adhesion force. The fitting of the force curves was performed by controlling the indentation depth to 4-5 nm, i.e. within 10% of the total film thickness in order to minimize rigid substrate effect. All the samples were considered incompressible, with a Poisson ratio of 0.5.

Profilometry Analysis of Coated Coverslips: Sample coverslips were prepared as previously described in. A Zygo Nexview 3D Optical Profilometer was used to image the surface of the coverslips. $C_{16}V_2A_2E_4GIKVAV$ ($V_2A_2$), $C_{16}A_2G_2E_4GIKVAV$ ($A_2G_2$), $C_{16}VEVA_2GIKVAV$ ($VEVA_2$), laminin-coated coverslips, and blank coverslips were tested at 72 h and 60 days in vitro. A 10× objective lens with a 2× Zoom and 10-μm-scan length was used to obtain the images. Samples were allowed to dry for ten minutes before imaging. Each coverslip was scratched using a surgical blade and at least 9 images were taken per sample condition. The surface thickness was analyzed using the Region tool in Zygo's Mx software. The scratch surface was set as the reference plane, and the measured coating thickness was calculated as the average depth of the coating with respect to the reference plane. For visual comparison, all images were normalized to a standardized scale with a −0.5 μm minimum and 2.4 μm maximum.

Wide-angle X-ray scattering (WAXS): The measurements were performed at 5ID in the Advanced Photon Source (APS) at the Argonne National Laboratory with a fiber-coupled device (CCD) detector. The wavelength of the incident X-ray was 0.729 Å at an incident energy of 13 keV. 150 μL of sample solution ([PA]=5.3 mM in aqueous NaCl and KCl ([NaCl]=150 mM and [KCl]=3 mM)) was introduced into a glass capillary with a fixed diameter, and X-ray was irradiated over 3 sec. During the irradiation, the sample solution was continuously oscillated using a flow-cell system with a flow-rate of 10 μL/sec.

Infrared (IR) spectroscopy: IR spectra of PA samples were recorded on a Bruker model Tensor 37 spectrometer. 100 μL of sample solution ([PA]=1 wt % in aqueous NaCl and KCl ([NaCl]=150 mM and [KCl]=3 mM)) was lyophilized and the lyophilized powder was placed on an ATR sample stage equipped with germanium crystal. IR spectra were scanned for 32 times and then averaged.

DPH-embedded PA samples for fluorescent studies: THF solution (2 μL) of 1,6-diphenyl-1,3,5-hexatriene (DPH; 2.8 mM was added to an aqueous solution of 100 μL of PA ([PA]=2 mM, [KCl]=3 mM, [NaCl]=150 mM) a), and the mixture was incubated for 30 min at 25° C. Then, the mixture was diluted with aqueous KCl and NaCl (1900 μL, [KCl]=3 mM, [NaCl]=150 mM), incubated for 10 min at 25° C. to afford a solution of DPH (2.8 μM)-embedded PA (100 μM). Fluorescent spectra were recorded on an ISS model PC1 spectrofluorimeter using a quartz cell of 1 cm optical path length. Polarized fluorescence upon photoexcitation with 336 nm plane-polarized light was measured and fluorescent anisotropy r was calculated as follows:

$$r = (I_{VV} - G\ I_{VH})/(I_{VV} + 2G\ I_{VH})$$

Where I represents fluorescence intensity, subscripts V and H denote vertical and horizontal orientations od the excitation and emission polarizers, respectively, and G is given by $I_{HV}/I_{HH}$, which accounts for a relative sensitivity toward vertically and horizontally polarized light (J. R. Lakowicz, in *Principles of Fluorescence Spectroscopy*, Springer Science+Business Media, New York, ed. 3, 2006, pp. 353-382.).

TMA-DPH-embedded PA samples for fluorescent studies: To an aqueous solution of 100 μL of PA ([PA]=2 mM, [KCl]=3 mM, [NaCl]=150 mM) was added an ethanol solution (4 μL) of 1-(4-trimethylammoniumphenyl)-6-phenyl-1,3,5-hexatriene p-toluenesulfonate (TMA-DPH; 1.4 mM), and the mixture was incubated for 30 min at 25° C. Then, the mixture was diluted with aqueous KCl and NaCl (1900 μL, [KCl]=3 mM, [NaCl]=150 mM), incubated for 10 min at 25° C. to afford a solution of TMA-DPH (2.8 μM)-embedded PA (100 μM). Fluorescent spectra were recorded on an ISS model PC1 spectrofluorimeter using a quartz cell of 1 cm optical path length.

Rheology: PA materials were prepared using methods described above. An MCR302 Rheometer (Anton Paar) was used for all rheological studies. PA liquid was placed on the sample stage (150 μL) and 150 mM $CaCl_2$ solution (30 μL, for a final concentration of 25 mM) was pipetted onto the underside of a 25 mm cone plate above the material. The instrument stage was set to 37° C. to simulate in vitro culture conditions. The plate was slowly lowered to the measuring position and a humidity collar was used to enclose the sample plunger and prevent sample evaporation during each 45 min experimental run. During the first interval of each experiment, the sample was equilibrated for 30 minutes with a constant angular frequency of 10 [rad/s] and 0.1% strain. The storage and loss modulus (G' and G") were recorded at the end of the interval, after a plateau occurred. The angular frequency was incremented from 100 rad/s to 1 rad/s over 21 points. G' and G" were recorded for all frequencies. Lastly, the % strain was increased incrementally from 0.1 to 100% over 31 points and G' and G" were recorded.

Simulation Procedures

The PAs for the simulations were created in Avogadro and transformed to MARTINI force field CG representation using a modified version of martinize.py to include the aliphatic tail, and using coiled coil as choice for secondary structure. The last two E's (furthest from aliphatic tail) and the K are charged while the two first E's are treated as protonated as this was found to be ideal for fiber formation in preliminary simulations. This difference in protonation state between assembled and free peptides has been previously reported. Therefore, final charge is (−2+1=)−1, except for the VE (−) $VA_2$ control that is −2 (FIG. 12). Initial structures consist on 300 molecules disposed randomly and spaced a minimum of 3 Å, solvated with CG water and enough ions were added to neutralize the system in a cubic box 21.5×21.5×21.5 $nm^3$.

This corresponds to a concentration of 50 mM (7.8, 7.4 and 8.3 wt % for $C_{16}V_2A_2E_4GIKVAV$ ($V_2A_2$), $C_{16}A_2G_2E_4GIKVAV$ ($A_2G_2$), $C_{16}VEVA_2GIKVAV$ ($VEVA_2$), respectively). This is within the range of concentrations commonly used to speed up self-assembly simulations, which can be up to 10 times higher than the experimental systems. All visualizations were rendered using Visual molecular dynamics (VMD).

Coarse grained Molecular Dynamic (CG-MD) simulations were performed in GROMACS 5.0.4, which was also used for the analysis of the simulations. A cut-off of 1.1 nm was used for intermolecular interactions using reaction field with a relative dielectric constant of 15 for electrostatics and potential-shift for Lennard-Jones interactions. All systems were minimized for 5000 steps or until the forces in atoms converged below 2000 pN. Self-assembly simulations were run using a 25 fs time step in NPT ensemble using V-rescale algorithm for the temperature (303 K, $\tau_T$=1 ps) and Berendsen for the pressure (1 bar, $\tau_P$=3 ps). Simulations were run for 100,000,000 steps corresponding to 10 μs effective time.

The water contacts of the PAs were calculated using the integration of the radial distribution function for the first solvation sphere of each backbone and aliphatic tail bead (FIG. 5f), and applying the 4× factor to convert CG water to water molecules. Dynamism is measured as the fluctuations in the root mean square deviation (RMSD) through the last 5 μs of simulation (as fibers are equilibrated after 5 μs).

Cell Cultures and Analysis

Human induced pluripotent stem cells (iPSC) culture condition: Induced pluripotent stem cells lines were derived by retroviral transduction of skin fibroblasts from healthy control individuals (11a: male, 36 years old; 18a: female, 51 years old) (Boulting et al., 2011 Nat Biotech). iPSCs were cultured on Matrigel (BD Biosciences) coated plated with mTeSR1 media (Stem Cell Technologies) and passaged on a weekly basis using 1 mM EDTA or Accutase (Sigma). All cell cultures were maintained at 37° C. and 5% $CO_2$ and tested on a monthly basis for *mycoplasma*.

Motor neurons (MN) differentiation: At 70% confluency, iPSC cultures were dissociated using Accutase and plated at a density of $10^5$ cells/$cm^2$ with 10 μM ROCK inhibitor (Y-27632, DNSK International) in mTeSR1. Next day (day 0), media was replaced with N2B27 medium (50% DMEM: F12, 50% Neurobasal, supplemented with NEAA, Glutamax, N2 and B27; Gibco, Life Technologies) containing 10 μM SB431542 (DNSK International), 100 nM LDN-193189 (DNSK International), 1 μM Retinoic Acid (RA, Sigma) and 1 μM of Smoothened-Agonist (SAG, DNSK International). Culture medium was daily changed until day 6, then was switched to N2B27 medium supplemented with 1 μM RA, 1 μM SAG, 5 μM DAPT (DNSK International) and 4 μM SU5402 (DNSK International). Cells were fed daily until day 14, when MNs were dissociated using TrypLE Express (Gibco, Life Technologies) supplemented with DNase I (Worthington) and plated onto pre-coated poly-D-Lysine/laminin or the distinct IKVAV-coated surfaces. MNs were feed 3 times a week with neurobasal medium (NBM: NEAA, Glutamax, N2 and B27) supplemented with Ascorbic acid (0.2 μg/ml; Sigma-Aldrich), BDNF, CNTF and GDNF (10 ng/mL, R&D systems) and 1% fetal bovine serum (FBS).

Cortical neurons differentiation: Cortical neuron differentiation from iPSCs was generated based on protocol described by Zhang et al., 2015. iPSCs were dissociated using Accutase, and when still in suspension with mTESR1+ 10 μM ROCK inhibitor, cells were simultaneously transduced with 3 lentiviral distinct constructs: 1, express a constitutive expressed rtTA; 2, coexpresses a puromycin resistance gene with Ngn2 in a tetracycline-inducible manner; 3, express GFP also in the presence or tetracycline. Cells were plated on matrigel-coated plates ($9\times10^5$ cells/$cm^2$) for 24 hours. Next day (day 1) expression of the distinct constructs was induced by adding doxycycline (Sigma-Aldrich) in knockout serum replacement media (KOSR, Life Technologies) supplemented with SB431542, LDN-193189 and XAV939 (DNSK International). On day 2, supplemented KOSR media is diluted 1:1 with neural induction medium (NIM: DMEM/F12 (Life Technologies)+Glutamax (Life Technologies)+Non-essential amino acids (Corning)+N2 (Life Technologies)+Heparan Sulphate (Sigma-Aldrich). doxycycline and Puromycin was added to select Ngn2 infected cells. Next day (day 3), cells are fed with NIM, doxycycline and puromycin. On day 4, cells are dissociated with accutase and plate on the different coated surfaces with NBM+Doxycycline+BDNF. Media was changed 3 times a week until analysis.

Cell viability assay: To assess cell viability, CytoTox 96® Non-Radioactive Cytotoxicity Assay (Promega) was used, a colorimetric assay that quantitatively measures lactate dehydrogenase (LDH), a stable cytosolic enzyme that is released upon cell lysis. Cell media from cells cultured in the distinct coated surfaces were collected at different cultured time points and the extracellular levels of LDH enzyme were measured by quantifying the conversion of a tetrazolium salt into a red formazan product, read at a 490-492 nm absorbance. The analyses were done in at least 3 independent differentiations with a minimum of 3 technical replicates per condition. To exert the β-integrin study, motor neurons were treated with 01-integrin (1:1000) or 04-integrin (1:1000, Abcam, UK) antibodies for 72 h and LDH viability and cell attachment were analyzed for each condition.

The invention claimed is:

1. A peptide amphiphile comprising a hydrophobic tail comprising an 8-24 carbon alkyl chain ($C_{8-24}$), a structural peptide segment comprising SEQ ID NO: 1, a charged peptide segment comprising EE, EEE, or SEQ ID NO: 5, and a bioactive peptide.

2. The peptide amphiphile of claim 1, wherein the bioactive peptide comprises SEQ ID NO: 25.

3. The peptide amphiphile of claim 1, wherein the bioactive peptide is attached to the charged peptide segment by a linker.

4. The peptide amphiphile of claim 1, wherein the peptide amphiphile comprises $C_{8-24}$ SEQ ID NO: 7.

5. A nanofiber comprising the peptide amphiphile of claim 1.

6. The nanofiber of claim 5, further comprising one or more filler peptide amphiphiles, wherein each of the one or more filler peptide amphiphiles comprise a hydrophobic tail, a structural peptide segment, and a charged peptide segment, and do not comprise a bioactive moiety.

7. A pharmaceutical composition comprising the nanofiber of claim 5.

* * * * *

SEQUENCE LISTING

<160> NUMBER OF SEQ ID NOS: 25

<210> SEQ ID NO 1
<211> LENGTH: 4
<212> TYPE: PRT
<213> ORGANISM: Artificial Sequence
<220> FEATURE:
<223> OTHER INFORMATION: synthetic

<400> SEQUENCE: 1

Ala Ala Gly Gly
1

<210> SEQ ID NO 2
<211> LENGTH: 4
<212> TYPE: PRT
<213> ORGANISM: artificial sequence
<220> FEATURE:
<223> OTHER INFORMATION: synthetic

<400> SEQUENCE: 2

Gly Gly Gly Gly
1

<210> SEQ ID NO 3
<211> LENGTH: 4

```
<212> TYPE: PRT
<213> ORGANISM: artificial sequence
<220> FEATURE:
<223> OTHER INFORMATION: synthetic

<400> SEQUENCE: 3

Val Val Ala Ala
1

<210> SEQ ID NO 4
<211> LENGTH: 5
<212> TYPE: PRT
<213> ORGANISM: artificial sequence
<220> FEATURE:
<223> OTHER INFORMATION: synthetic

<400> SEQUENCE: 4

Val Glu Val Ala Ala
1               5

<210> SEQ ID NO 5
<211> LENGTH: 4
<212> TYPE: PRT
<213> ORGANISM: artificial sequence
<220> FEATURE:
<223> OTHER INFORMATION: synthetic

<400> SEQUENCE: 5

Glu Glu Glu Glu
1

<210> SEQ ID NO 6
<211> LENGTH: 14
<212> TYPE: PRT
<213> ORGANISM: artificial sequence
<220> FEATURE:
<223> OTHER INFORMATION: synthetic

<400> SEQUENCE: 6

Val Val Ala Ala Glu Glu Glu Glu Gly Ile Lys Val Ala Val
1               5                   10

<210> SEQ ID NO 7
<211> LENGTH: 14
<212> TYPE: PRT
<213> ORGANISM: artificial sequence
<220> FEATURE:
<223> OTHER INFORMATION: synthetic

<400> SEQUENCE: 7

Ala Ala Gly Gly Glu Glu Glu Glu Gly Ile Lys Val Ala Val
1               5                   10

<210> SEQ ID NO 8
<211> LENGTH: 15
<212> TYPE: PRT
<213> ORGANISM: artificial sequence
<220> FEATURE:
<223> OTHER INFORMATION: synthetic

<400> SEQUENCE: 8

Val Glu Val Ala Ala Glu Glu Glu Glu Gly Ile Lys Val Ala Val
1               5                   10                  15

<210> SEQ ID NO 9
<211> LENGTH: 8
<212> TYPE: PRT
```

```
<213> ORGANISM: artificial sequence
<220> FEATURE:
<223> OTHER INFORMATION: synthetic

<400> SEQUENCE: 9

Val Val Ala Ala Glu Glu Glu Glu
1               5

<210> SEQ ID NO 10
<211> LENGTH: 8
<212> TYPE: PRT
<213> ORGANISM: artificial sequence
<220> FEATURE:
<223> OTHER INFORMATION: synthetic

<400> SEQUENCE: 10

Ala Ala Gly Gly Glu Glu Glu Glu
1               5

<210> SEQ ID NO 11
<211> LENGTH: 9
<212> TYPE: PRT
<213> ORGANISM: artificial sequence
<220> FEATURE:
<223> OTHER INFORMATION: synthetic

<400> SEQUENCE: 11

Val Glu Val Ala Ala Glu Glu Glu Glu
1               5

<210> SEQ ID NO 12
<211> LENGTH: 14
<212> TYPE: PRT
<213> ORGANISM: artificial sequence
<220> FEATURE:
<223> OTHER INFORMATION: synthetic

<400> SEQUENCE: 12

Gly Gly Gly Gly Glu Glu Glu Glu Gly Ile Lys Val Ala Val
1               5                   10

<210> SEQ ID NO 13
<211> LENGTH: 14
<212> TYPE: PRT
<213> ORGANISM: artificial sequence
<220> FEATURE:
<223> OTHER INFORMATION: synthetic

<400> SEQUENCE: 13

Val Val Ala Ala Glu Glu Glu Glu Gly Val Lys Ile Val Ala
1               5                   10

<210> SEQ ID NO 14
<211> LENGTH: 14
<212> TYPE: PRT
<213> ORGANISM: artificial sequence
<220> FEATURE:
<223> OTHER INFORMATION: synthetic

<400> SEQUENCE: 14

Ala Ala Gly Gly Glu Glu Glu Glu Gly Val Lys Ile Val Ala
1               5                   10

<210> SEQ ID NO 15
<211> LENGTH: 15
<212> TYPE: PRT
<213> ORGANISM: artificial sequence
```

```
<220> FEATURE:
<223> OTHER INFORMATION: synthetic

<400> SEQUENCE: 15

Val Glu Val Ala Ala Glu Glu Glu Gly Val Lys Ile Val Ala
1               5                   10                  15

<210> SEQ ID NO 16
<211> LENGTH: 9
<212> TYPE: PRT
<213> ORGANISM: artificial sequence
<220> FEATURE:
<223> OTHER INFORMATION: synthetic

<400> SEQUENCE: 16

Ala Ala Gly Gly Glu Glu Glu Glu Gly
1               5

<210> SEQ ID NO 17
<211> LENGTH: 6
<212> TYPE: PRT
<213> ORGANISM: artificial sequence
<220> FEATURE:
<223> OTHER INFORMATION: synthetic

<400> SEQUENCE: 17

Leu Gly Thr Ile Pro Gly
1               5

<210> SEQ ID NO 18
<211> LENGTH: 5
<212> TYPE: PRT
<213> ORGANISM: artificial sequence
<220> FEATURE:
<223> OTHER INFORMATION: synthetic

<400> SEQUENCE: 18

Leu Arg Gly Asp Asn
1               5

<210> SEQ ID NO 19
<211> LENGTH: 5
<212> TYPE: PRT
<213> ORGANISM: artificial sequence
<220> FEATURE:
<223> OTHER INFORMATION: synthetic

<400> SEQUENCE: 19

Pro Asp Gly Ser Arg
1               5

<210> SEQ ID NO 20
<211> LENGTH: 5
<212> TYPE: PRT
<213> ORGANISM: artificial sequence
<220> FEATURE:
<223> OTHER INFORMATION: synthetic

<400> SEQUENCE: 20

Tyr Ile Gly Ser Arg
1               5

<210> SEQ ID NO 21
<211> LENGTH: 6
<212> TYPE: PRT
<213> ORGANISM: artificial sequence
<220> FEATURE:
```

```
<223> OTHER INFORMATION: synthetic

<400> SEQUENCE: 21

Val Val Val Ala Ala Ala
1               5

<210> SEQ ID NO 22
<211> LENGTH: 4
<212> TYPE: PRT
<213> ORGANISM: artificial sequence
<220> FEATURE:
<223> OTHER INFORMATION: synthetic

<400> SEQUENCE: 22

Ala Ala Val Val
1

<210> SEQ ID NO 23
<211> LENGTH: 6
<212> TYPE: PRT
<213> ORGANISM: artificial sequence
<220> FEATURE:
<223> OTHER INFORMATION: synthetic

<400> SEQUENCE: 23

Ala Ala Ala Val Val Val
1               5

<210> SEQ ID NO 24
<211> LENGTH: 6
<212> TYPE: PRT
<213> ORGANISM: artificial sequence
<220> FEATURE:
<223> OTHER INFORMATION: synthetic

<400> SEQUENCE: 24

Ala Ala Ala Gly Gly Gly
1               5

<210> SEQ ID NO 25
<211> LENGTH: 5
<212> TYPE: PRT
<213> ORGANISM: artificial sequence
<220> FEATURE:
<223> OTHER INFORMATION: synthetic

<400> SEQUENCE: 25

Ile Lys Val Ala Val
1               5
```